United States Patent [19]

Katagiri et al.

[11] Patent Number: 5,489,559
[45] Date of Patent: Feb. 6, 1996

[54] MICROWAVE DIELECTRIC CERAMIC COMPOSITION

[75] Inventors: Hiroshi Katagiri; Hirofumi Ozeki, both of Aichi, Japan

[73] Assignee: NGK Spark Plug Co., Ltd., Japan

[21] Appl. No.: 363,333

[22] Filed: Dec. 23, 1994

[30] Foreign Application Priority Data

| Dec. 27, 1993 | [JP] | Japan | 5-352674 |
| Apr. 14, 1994 | [JP] | Japan | 6-102171 |
| Apr. 14, 1994 | [JP] | Japan | 6-102172 |
| Sep. 27, 1994 | [JP] | Japan | 6-258915 |
| Sep. 27, 1994 | [JP] | Japan | 6-258916 |

[51] Int. Cl.$^6$ ............. C04B 35/495; C04B 35/497
[52] U.S. Cl. ................................. 501/134
[58] Field of Search ........................... 501/134

[56] References Cited

U.S. PATENT DOCUMENTS

| 3,997,457 | 12/1976 | Takahashi et al. | 501/134 X |
| 4,900,702 | 2/1990 | Tsuboi et al. | 501/134 |
| 5,004,713 | 4/1991 | Bardhaa et al. | 501/134 |
| 5,350,639 | 9/1994 | Inoue et al. | 501/134 X |

*Primary Examiner*—Karl Group
*Attorney, Agent, or Firm*—Finnegan, Henderson, Farabow, Garrett & Dunner

[57] ABSTRACT

The present invention provides a microwave dielectric ceramic composition in which $\epsilon r$, Qu and $\tau f$ are generally controlled within a practical characteristic range and each of the characteristics is maintained in a well balanced state. A ceramic composition of the present invention comprises a composition represented by $xBi_2O_3\text{-}(1\text{-}x)(yNb_2O_5\text{-}(1\text{-}y)Ta_2O_5)$ in which $0.45 \leq x \leq 0.55$ and $0.1 \leq y < 1.0$ as a main ingredient, to which not more than 0.8 parts by weight of $V_2O_5$ is added and incorporated. An another ceramic composition comprises a composition represented by $Bi(Nb_xTa_{1-x})O_4$ in which $0 < x \leq 0.96$ as a main ingredient, to which not more than 5 wt % of $V_2O_5$ and not more than 2 wt % of PbO are added and incorporated. An another ceramic composition comprises the main ingredient as described above to which not more than 5 wt % of $V_2O_5$ and not more than 2 wt % of $MnO_2$ are added and incorporated. An another ceramic composition comprises the main ingredient as described above to which not more than 2 wt % of $V_2O_5$ and not more than 1 wt % of $TiO_2$ are added and incorporated. An another ceramic composition comprises the main ingredient as described above, to which not more than 2 wt % of $V_2O_5$, not more than 2 wt % of $MnO_2$ and not more than 0.7 wt % of $TiO_2$ are added and incorporated. Instead of $TiO_2$ described above, not more than 0.5 wt % (particularly not more than 0.4 wt %) of PbO can be added and incorporated.

18 Claims, 62 Drawing Sheets

MICROWAVE DIELECTRIC CERAMIC COMPOSITION

BACKGROUND OF THE INVENTION

The present invention concerns a microwave dielectric ceramic composition and, more in particular, it relates to a microwave dielectric ceramic composition having a temperature coefficient of a resonance frequency (hereinafter simply referred to as τf) varied generally within a practical characteristic range while maintaining a practical unload Q (hereinafter simply referred to Qu) and a greatly improved specific dielectric constant (hereinafter simply referred to as εr).

The present invention also concerns a microwave dielectric ceramic composition in which each of the characteristic is balanced at a practical level.

The present invention further concerns a microwave dielectric ceramic composition in which εr and Qu are controlled generally within a practical characteristic range while maintaining τf at a practical high level and each of the characteristics is balanced at a high level.

The present invention further concerns a microwave dielectric ceramic composition in which εr, Qu and τf are controlled generally within a practical characteristic range and each of the characteristics is maintained in a well balanced state.

The present invention is utilized for impedance matching or the like of dielectric resonators, microwave integrated circuit substrate, various kinds of microwave circuits in a microwave region and it is particularly suitable to LC filter materials.

Generally, LC filter materials, dielectric resonators, dielectric substrates used in a region of high frequency waves such as microwaves or milliwaves are required to have high εr and high flu, as well as small absolute value for the temperature coefficient of the resonance frequency.

Namely, since the dielectric loss of a microwave dielectric ceramic composition (hereinafter simply referred to as dielectric ceramic composition) tends to increase as the working frequency becomes higher, a dielectric ceramic composition having large εr and Qu in a microwave region is desired.

For such a dielectric ceramic composition, a composition belonging to a composite perovskite structure such as $Ba(Zn_{1/3}Ta_{2/3})O_3$ or $Ba(Mg_{1/3}Ta_{2/3})O_3$ or $BaO-TiO_2$ system composition has been used in recent years, but any of them requires a high sintering temperature of 1300° C. or higher.

Such a high sintering temperature requires greater power electric power consumption during sintering to result in a drawback of causing a disadvantage in view of production cost or productivity.

Further, in a case of sintering together with a conductor having a low melting point as an electrode, for example, silver (melting point: 961° C.) or copper (melting point: 1083° C.) as in an LC filter or a strip line filter, it is particularly advantageous that the sintering temperature is lower than the melting point of the conductor. Accordingly, a material sinterable at a temperature as low as possible is demanded.

SUMMARY OF THE INVENTION

An object of the present invention is to provide a dielectric ceramic composition capable of having τf varying generally within a practical range and high εr while maintaining high Qu by a composition comprising a main ingredient of $Bi_2O_3-Nb_2O_5-Ta_2O_5$ system and a predetermined amount of $V_2O_5$ added and incorporated thereto.

The present inventor has made various studies on $Bi_2O_3-Nb_2O_5-Ta_2O_5$ system compositions having τf varied generally within a practical characteristic range while maintaining high Qu, having high εr and capable of being produced by sintering at a low temperature and, as a result, has accomplished the present invention based on the discovery that the foregoing object can be attained by varying the ratio between $Nb_2O_5$ in the above-mentioned composition and, further, adding a predetermined amount of $V_2O_5$ thereto.

That is, the dielectric ceramic composition according to the present invention comprises a composition represented by $xBi_2O_3-(1-x)$ $(yNb_2O_5-(1-y)Ta_2O_5)$ in which $0.45 \leq x \leq 0.55$ and $0<y<1.0$ as a main ingredient, to which not more than 0.8 parts by weight (not including 0 part by weight) of $V_2O_5$ s is added and incorporated based on 100 parts by weight of the $xBi_2O_3-(1-x)$ $(yNb_2O_5-(1-y)Ta_2O_5)$.

In the above-mentioned invention, x is defined as 0.45 to 0.55, because Qu is too small if x is less than 0.45 or exceeds 0.55. Further, y is within a range: $0<y<1.0$. If $Nb_2O_5$ is not present (y=0), the absolute value for τf tends to increase (decrease in a negative direction) and εr tends to decrease. If $N_2O_5$ is present even in a small amount, εr which is important for LC filter material tends to be improved. On the other hand if y is at 1.0, εr tends to decrease and Qu tends to decrease as y increases.

Further, the addition ratio of $V_2O_5$ is defined as not more than 0.8% by weight (not including 0% by weight), because Qu tends to decrease if it is added in excess of 0.8% by weight although the addition of $V_2O_5$ can lower the sintering temperature. Further, a case in which α is 0% by weight, that is, of $V_2O_5$ is not added is excluded, because this makes sintering insufficient and lowers each of the characteristics.

The addition amount of $V_2O_5$ at 0.4% by weight is more preferred since Qu increases much higher as compared with the case of addition of 0.8% by weight, 0.6% by weight and 0.2% by weight (Nos. 5–8 compared with Nos. 13–16, Nos. 9–12 and 1–4 in Table 1).

In particular, it is preferred that x is from 0.47 to 0.53, y is from 0.4 to 0.8 and α is from 0.4 to 0.6, since each physical property is balanced. In this case, εr is from 42.9 to 47.7, Qu is from 790 to 1490 and τf is from −46.4 to −16.2 ppm/°C.

Further, the dielectric ceramic composition of the present invention is produced as described below. Specifically, bismuth oxide (III) powder, niobium oxide (V) powder, tantalum oxide (V) powder and vanadium oxide (V) powder are mixed so as to provide a composition comprising a composition represented by $xBi_2O_3-(1-x)$ $(yNb_2O_5-(1-y)Ta_2O_5$ in which $0.45 \leq x \leq 0.55$ and $0<y<1.0$ as a main ingredient, to which not more than 0.8 parts by weight (not including 0 part by weight) of $V_2O_5$ is added and incorporated based on 100 parts by weight of the $xBi_2O_3-(1-x)$ $(yNb_2O_5-(1-y)Ta_2O_5)$ and then calcined to prepare a calcined powder, which is pulverized, molded into a predetermined shape and then sintered at 860°–950° C.

The sintering temperature is defined as within 860° to 950° C., because Qu decreases and τf increases excessively in the negative direction out of the temperature range. Further, low temperature sintering is particularly preferred in a case of sintering simultaneously with a conductor such as for an LC filter. The sintering can be carried out either in an ambient atmosphere or a reducing atmosphere.

In the dielectric ceramic composition according to the present invention, τf can be varied widely within a practical characteristic range while maintaining Qu at a level with no practical problem by setting each of the oxides a predetermined ratio in the $Bi_2O_3$—$Nb_2O_5$—$Ta_2O_5$ system, to which a predetermined amount of $V_2O_5$ is added. Further, a dielectric ceramic composition having extremely high εr and suitable to LC filter material can be obtained. Further, the dielectric ceramic composition according to the present invention can be prepared by sintering at a relatively low temperature as 860° to 950° C. Such low temperature sintering is particularly advantageous in a case of the LC filter which is sintered simultaneously with a conductor.

An object of the present invention is to provide a dielectric ceramic composition in which (Qu and τf are controlled within a wide characteristic range while maintaining εr at a high and each of the characteristics is balanced at a practical level, by with a composition comprising $Bi(NbTa)O_4$ as a main ingredient to which $V_2O_5$ and PbO is added each in a predetermined amount.

The present inventor has made various studies on $Bi(NbTa)O_4$ system compositions having Qu and τf cotroled within a wide practical characteristic range while maintaining high εr and capable of being produced by sintering at a low and wide temperature and, as a result, has accomplished the present invention based on the discovery that the foregoing object can be attained by varying the ratio between $Nb_2O_5$ and $Ta_2O_5$ in the above-mentioned composition and, further, adding a predetermined amount of $V_2O_5$ and PhO thereto.

The dielectric ceramic composition of the present invention comprises a composition represented by $Bi(Nb_xTa_{1-x})O_4$ in which $0<x\leq 0.96$ as a main ingredient to which not more than 5% by weight (not including 0% by weight) of $V_2O_5$ and not more than 2% by weight (not including 0% by weight) of PbO are added and incorporated based on 100% by weight of $Bi(Nb_xTa_{1-x})O_4$.

In the above-mentioned invention, x is defined as: $0<x\leq 0.96$, because the $Ta_2O_5$ ingredient is substantially absent if x exceeds 0.96, making it difficult to control εr and τf.

Further, the addition amount of $V_2O_5$ is defined as greater than 0 and not more than 5% by weight, because addition in excess of 5% by weight can not provide any further effect and it rather results in deterioration of other characteristics such as Qu, although the sintering temperature can be lowered by the addition of $V_2O_5$, and because sintering is insufficient to lower each of the characteristics if $V_2O_5$ is not added. The addition amount of $V_2O_5$ within a range from 0.2 to 2.0% by weight is more preferred since a practical dielectric ceramic composition showing well balanced in each of the characteristics can be obtained.

Further, the addition amount of PbO is greater than 0 and not more than 2% by weight. Addition of PbO can increase εr and Qu as compared with a case of not adding PbO at all. However, although εr is improved in proportion with the addition amount of PbO, Qu reaches a peak at the addition amount of 0.2% by weight and tends to reduce beyond the peak, τf tends to increase in the negative direction in proportion with the addition of PbO. This trend is remarkable if the addition amount is as great as 1 to 2% by weight. Accordingly, for obtaining a dielectric ceramic composition well balanced in each of the characteristics and having a high level, it is preferred that the addition amount of PbO is within a range from 0.1 to 1.0% by weight.

Further, it is preferred that x is from 0.2 to 0.9 (table 1 and 2), the addition amount of $V_2O_5$ is from 0.2 to 2.0% by weight and the addition amount of PbO is from 0.2 to 0.6% by weight (table 3). In this case, εr is from 45 to 48, Qu is from 960 to 1640 (at from 3.6 to 4.0 GHz) and τf is from −47 to −36 ppm/°C.

Further, the dielectric ceramic composition of the present invention is produced as described below. The predetermined metal oxide powders are mixed so as to provide a predetermined composition and then calcined to prepare a calcined powder, which is pulverized, molded into a predetermined shape and then sintered at 850°–950° C. The sintering temperature is defined as within 850° to 950° C., because Qu decreases and τf increases excessively in the negative direction out of the temperature range. Further, low temperature sintering is particularly preferred in a case of sintering simultaneously with a conductor such as for an LC filter. The sintering can he carried out either in an ambient atmosphere or a reducing atmosphere.

In the dielectric ceramic composition according to the present invention, a dielectric ceramic composition well balanced in each of the characteristics such as Qu and τf while maintaining practically high εr and suitable to LC filter material can be obtained by setting each of the oxides at a predetermined ratio in the $Bi(NbTa)O_4$ system, to which $V_2O_5$ and PbO are added each in a predetermined amount. Further, a composition of particularly excellent performance can he obtained in a range of relatively lower addition amount of PbO. Further, the dielectric ceramic composition according to the present invention can he prepared by sintering at a relatively low and wide temperature as 850° to 950° C. Such low temperature sintering is particularly advantageous in a case of the LC filter which is sintered simultaneously with a conductor.

An object of the present invention is to provide a dielectric ceramic composition in which εr and Qu are controlled widely within a practical characteristic range while maintaining τf at a practically high level and each of the characteristics is balanced at a high level, by a composition comprising a $Bi(NbTa)O_4$ system as a main ingredient to which $V_2O_5$ and $MnO_2$ are added and incorporated each by a predetermined amount.

The present inventor has made various studies on $Bi(NbTa)O_4$ system compositions having εr and Qu cotroled widely within a practical characteristic range while maintaining practical high τf and capable of being produced by sintering at a low and wide temperature and, as a result, has accomplished the present invention based on the discovery that the foregoing object can be attained by varying the ratio between $Nb_2O_5$ and $Ta_2O_5$ in the above-mentioned composition and, further, adding a predetermined amount of $V_2O_5$ and $MnO_2$ thereto.

The dielectric ceramic composition according to the present invention comprises a composition represented by $Bi(Nb_xTa_{1-x})O_4$ in which $0<x\leq 0.96$ as a main ingredient, to which not more than 5% by weight (not including 0% by weight) of $V_2O_5$ and not more than by weight (not including 0% by weight) of $MnO_2$ are added and incorporated based on 100% by weight of $Bi(Nb_xTa_{1-x})O_4$. Further, in the present invention, the addition amount of $MnO_2$ may be from 0.1 to 1.0% by weight based on 100% by weight of $Bi(Nb_xTa_{1-x})O_4$.

In the above-mentioned invention, x is defined as: $0<x\leq 0.96$, because the $Ta_2O_5$ ingredient is substantially absent if x exceeds 0.96, making it difficult to control εr and τf.

Further, the addition amount of $V_2O_5$ is defined as greater than 0 and not more than 5% by weight, because addition excess of 5% by weight can not provide any further effect and it rather results in deterioration of other characteristics such as Qu, although the sintering temperature can be lowered by the addition of $V_2O_5$, and because sintering is insufficient to lower each of the characteristics if $V_2O_5$ is not added. The addition amount of $V_2O_5$ within a range from 0.2 to 2.0% by weight is more preferred since a practical dielectric ceramic composition showing well balanced in each of the characteristics can be obtained.

The addition amount of $MnO_2$ is more than 0 and not more than 2% by weight and the addition of $MnO_2$ can improve all of $\tau f$, $\epsilon r$ and Qu with a certain exception as compared with a case of not adding $MnO_2$ at all. However, although $\epsilon r$ is improved linearly in proportion with the addition mount of $MnO_2$, $\tau f$ rather decreases depending on the case as the addition amount of $\tau f$ exceeds 1% by weight, particularly, as the sintering temperature goes higher, while Qu reaches a peak at the addition amount of 0.2% by weight and tends to lower beyond the peak. Accordingly, for obtaining a dielectric ceramic composition well balanced in each of the characteristics at a high level, it is preferred that the addition amount of $MnO_2$ is within a range from 0.1 to 1.0% by weight Further, it is preferred that x is from 0.2 to 0.9 (tables 1 and 2), the addition amount of $V_2O_5$ is from 0.2 to 2.0% by weight and the addition amount of $MnO_2$ is from 0.1 to 0.6% by weight (table 4). In this case, $\epsilon r$ is from 45 to 47, Qu is from 970 to 1640 (at from 3.6 to 3.9 GHz) and $\tau f$ is from −14 to −5.5 ppm/°C.

Further, the dielectric ceramic composition of the present invention is produced as described below. The predetermined metal oxide powders are mixed so as to provide a predetermined composition and then calcined to prepare a calcined powder, which is pulverized, molded into a predetermined shape and then sintered at 850°–950° C. The sintering can be carried out either in an ambient atmosphere or a reducing atmosphere.

The sintering temperature is defined as within 850° to 950° C., because Qu decreases and $\tau f$ increases excessively in the negative direction out of the temperature range. Further, low temperature sintering is particularly preferred in a case of sintering simultaneously with a conductor such as for an LC filter.

In the dielectric ceramic composition according to the present invention, a dielectric ceramic composition well balanced in each of the characteristics such as $\epsilon r$ and Qu while maintaining practically high $\tau f$ and suitable to LC filter material can be obtained by setting each of the oxides at a predetermined ratio in the $Bi(NbTa)O_4$ system, to which $V_2O_5$ and $MnO_2$ are added each in a predetermined amount. Further, a composition of particularly excellent performance can be obtained in a range of relatively lower addition amount of MnO2. Further, the dielectric ceramic composition according to the present invention can be prepared by sintering at a relatively low and wide temperature as 850° to 950° C. Such low temperature sintering is particularly advantageous in a case of the LC filter which is sintered simultaneously with a conductor.

An object of the present invention is to provide a microwave dielectric ceramic composition in which $\epsilon r$, Qu and $\tau f$ are controlled widely within a practical characteristic range and each of the characteristics is maintained in a well balanced state, by a composition comprising $Bi(NbTa)O_4$ system as a main ingredient to which $V_2O_5$ and $TiO_2$ are added each in a predetermined amount.

The present inventor has made various studies on $Bi(NbTa)O_4$ system compositions having $\epsilon r$, Qu and $\tau f$ cotroled within a wide practical characteristic range and capable of being produced by sintering at a low temperature and, as a result, has accomplished the present invention based on the discovery that the foregoing object can be attained by varying the ratio between $Nb_2O_5$ and $Ta_2O_5$ in the above-mentioned composition and, further, adding a predetermined amount of $V_2O_5$ and $TiO_2$ thereto, and in particular the discovery that the foregoing object can be attained by cotroling $\tau_f$ by an addition of $TiO_2$.

The dielectric ceramic composition according to the present invention comprises a composition represented by $Bi(Nb_xTa_{1-x})O_4$ in which $0<x\leq0.96$ as a main ingredient to which not more than 2% by weight (not including 0% by weight) of $V_2O_5$ and not more than 1% by weight (not including 0% by weight) of $TiO_2$ are added and incorporated based on 100% by weight of the $Bi(Nb_xTa_{1-x}O_4)$.

In the above-mentioned invention, x is defined as: $0<x\leq0.96$, because the $Ta_2O_5$ ingredient is substantially absent if x exceeds 0.96, making it difficult to control $\epsilon r$ and $\tau f$.

By varying the addition amount of $Ta_2O_5$, control for $\epsilon r$ and $\tau f$ is facilitated and, particularly, by increasing the addition amount of $Ta_2O_5$, $\epsilon r$ and Qu can be increased.

Further, the addition amount of $V_2O_5$ is determined as more than 0 but not more than 2% by weight, because $V_2O_5$ functions as a sintering aid and, accordingly, can lower the sintering temperature and stabilize the performance by the addition, but addition in excess of 2% by weight decreases Qu and $\tau f$, whereas no addition of $V_2O_5$ makes sintering insufficient and decreases each of the characteristics. The addition amount of $V_2O_5$, particularly, within a range from 0.3 to 0.5% by weight (particularly around 0.4% by weight) is more preferred since a practical dielectric ceramic composition well balanced in each of the characteristics is obtained.

Further, the addition amount of $TiO_2$ is defined as not more than 1% by weight, because each of the characteristics decreases remarkably if the addition amount exceeds about 1% by weight. $TiO_2$ has an effect of transferring $\tau f$ from a negative to positive direction by the addition and an addition amount within a range from 0.1 to 0.3% weight (particularly, 0.2% by weight) is more preferred since a practical dielectric ceramic composition well balanced in each of the characteristics is obtained.

Further, x is from 0.6 to 0.96, the addition amount of $V_2O_5$ may be from 0.2 to 1.0% by weight and the addition amount of $TiO_5$ may be from 0.1 to 0.6% by weight. This is because well balanced performance can be obtained for $\epsilon r$, Qu and $\tau f$ within such a range of addition. Further, a practical balanced performance such as $\tau f$ from −30 to 0 ppm/°C., Qu from 510 to 1160, $\epsilon r$ from 42 to 58 can be obtained with the above-mentioned composition.

Further, the dielectric ceramic composition of the present invention is produced as described below. The predetermined metal oxide powders are mixed so as to provide a predetermined composition and then calcined at 600°–800° C. to prepare a calcined powder, which is pulverized, molded into a predetermined shape and then sintered at 875°–950° C. The sintering can be carried out either in an ambient atmosphere or a reducing atmosphere.

The sintering temperature is defined as within 875° to 950° C., because a sintering temperature of less than 875° C. may make sintering insufficient, a sufficient sintering density is ensured by sintering within this sintering range and the performance is stabilized. Further, low temperature sintering is particularly preferred in a case of sintering simultaneously with a conductor such as for an LC filter.

In the dielectric composition according to the present invention, εr, Qu and τf are within a practical characteristic range and each of the characteristics is maintained in a well balanced state. Accordingly, it is suitable to the LC filter material.

Further, the dielectric ceramic composition according to the present invention can be prepared by sintering at a relatively low and wide temperature as 875° to 950° C. Such low temperature sintering is particularly advantageous in a case of the LC filter which is sintered simultaneously with a conductor.

An object of present invention is to provide a microwave dielectric ceramic composition in which εr, Qu and τf are controlled within a wide practical characteristic range and each of the characteristics is maintained in a well balanced state, by a composition comprising a $Bi(NbTa)O_4$ system as a main ingredient, to which $V_2O_5$ and $MnO_2$, as well as $TiO_2$ or PbO are added and incorporated each in a predetermined amount.

The present inventor has made various studies on $Bi(NbTa)O_4$ system compositions having εr, Qu and τf cotroled widely within a practical characteristic range and capable of being produced by sintering at a low temperature and, as a result, has accomplished the present invention based on the discovery that the foregoing object can he attained by varying the ratio between $Nb_2O_5$ and $Ta_2O_5$ in the above-mentioned composition and, further, adding a predetermined amount of $V_2O_5$, $MnO_2$ and $TiO_2$ (or PbO) thereto.

The dielectric ceramic composition according to the present invention comprises a composition represented by $Bi(Nb_xTa_{1-x})O_4$ in which $0<x≤0.96$ as a main ingredient, to which not more than 2% by weight (not including 0% by weight) of $V_2O_5$, not more than 2% by weight (not including 0% by weight) of $MnO_2$ and not more than 0.7% by weight (not including 0% by weight) of $TiO_2$ are added and incorporated based on 100% by weight of $Bi(Nb_xTa_{1-x})O_4$.

In the above-mentioned invention, x is defined as: $0<x≤0.96$, because the $Ta_2O_5$ ingredient is substantially absent if x exceeds 0.96, making it difficult to control εr and τf.

Since $V_2O_5$ functions as a sintering aid, addition thereof can lower the sintering temperature and stabilize the performance. If the addition amount of $V_2O_5$ exceeds 2% by weight, it decreases Qu and τf, whereas if $V_2O_5$ is not added, sintering is insufficient to decrease each of the characteristics. An addition amount of $V_2O_5$, particularly, from 0.2 to 1.0% by weight (preferably, from 0.3 to 0.5% by weight, more preferably, about 0.4% by weight) is more preferred since a practical dielectric ceramic composition well balanced in each of the characteristics can be obtained. For instance, at the addition amount: (1) from 0.2 to 1.0% by weight ($MnO_2$ and $TiO_2$: both 0.2% by weight, x: 0.8), εr is 46.6 to 47.9, Qu is 890 to 1300 as τf is −10.91 to −2.45 ppm/°C. and (2) addition amount of 0.4% by weight ($MnO_2$ and $TiO_2$: both 0.2% by weight, x: 0.8), εr is 47.1, Qu is 1325 and τf is −7.46 ppm/°C.

Further, both of Qu and τf are improved by the addition of $MnO_2$ up to 0.4% by weight. Accordingly, since $MnO_2$ has an effect of transferring τf from negative to positive direction within this addition range, it is effective to adjust τf from negative to positive direction.

On the other hand, if it is added by more than 2% by weight, it is not preferred since tends to decrease greatly. Particularly, an addition amount of not more than 1.0% by weight is more preferred since a practical dielectric ceramic composition well balanced in each of the characteristics can be obtained. For instance, at the addition amount of from 0.2 to 1.0% by weight ($V_2O_5$; 0.4% by weight, $TiO_2$; 0.2% by weight, x; 0.8), εr is 47.0 to 47.5, Qu is 900 to 1440 and τf is −6.0 to −11.1 ppm/°C.

Further, the addition amount of $TiO_2$ is defined as not more than 0.7% by weight, because Qu is decreases greatly and τf transfers in the positive direction apart from 0 if the addition amount is more than 0.7% by weight. Since $TiO_2$ has an effect of transferring τf from negative to positive direction by the addition, it is effective for adjusting τf from negative to positive direction. Particularly, a practical dielectric ceramic composition well balanced in each of the characteristics can be obtained with an addition amount of 0.1 to 0.2% by weight. For instance, at the addition amount from 0.1 to 0.2% by weight ($V_2O_5$; 0.4% by weight, $MnO_2$: 0.2% by weight and x: 0.8), εr is 46.4 to 47.1, Qu is 1320 to 1490 and τf is −8.8 to −7.5 ppm/°C.

Further, it is possible to set the addition amount of $V_2O_5$ as 0.2 to 1.0% by weight, the addition amount of $MnO_2$ of not more than 1.0% by weight and the addition amount of $TiO_2$ of not more than 0.4% by weight and x as 0.8 to 0.96, because the performance is well balanced in this case. For instance, it is possible to attain τf: −12 to +7 ppm/°C., Qu: 800 to 1600 and εr: 45 to 50.

Further, the dielectric ceramic composition of the present invention is produced as described below. The predetermined metal oxide powders are mixed so as to provide a predetermined composition and then calcined at 600°–800° C. to prepare a calcined powder, which is pulverized, molded into a predetermined shape and then sintered at 850°–950° C. The sintering can be carried out either in an ambient atmosphere or a reducing atmosphere.

The sintering temperature is defined as within 850° to 950° C., because Qu decreases and τf increases excessively in the negative direction out of the temperature range. Further, low temperature sintering is particularly preferred in a case of sintering simultaneously with a conductor such as for an LC filter.

A dielectric ceramic composition according to the present invention comprises a composition represented by $Bi(Nb_xTa_{1-x})O_4$, in which $0<x≤0.96$ as a main ingredient, to which 0.2 to 1% by weight of $V_2O_5$, not more than 1% by weight (not including 0% by weight) of $MnO_2$ and not more than 0.5% by weight (not including 0% by weight) of PbO are added and incorporated.

The reason why x is defined as $0<x≤0.96$ in this invention is identical with the reason explained for the first invention.

Further, since $V_2O_5$ functions as a sintering aid, addition thereof can lower the sintering temperature and stabilize the performance. If the addition amount exceeds 1% by weight, Qu decreases and it decreases remarkably to about 510 at the addition amount of 3% by weight. Further, if the addition amount exceeds 1% by weight, τf is not more than −24 ppm/°C., that is, increases toward the negative direction. Further, if is not added sintering is insufficient and Qu decreases, which is not desired. The addition amount of $V_2O_5$, particularly, from 0.4 to 0.8% by weight is more preferred since a practical dielectric ceramic composition well balanced in each of the characteristics can be obtained. For instance, (1) at the addition amount of from 0.4 to 0.8% by weight (x: 0.8, $MnO_2$ and PbO: both 0.2% by weight), εr is 44.9 to 46.8, Qu is 1460 to 1950 as τf is −14.5 to −1.7 ppm/°C. and (2) addition amount of 0.6% by weight (x: 0.8, $MnO_2$ and PbO: both 0.2% by weight), εr is 46.5, Qu is 1430 and τf is −1.75 ppm/°C. and τ$_f$ is nearly 0.

Further, addition of $MnO_2$ can increase εr and τf. Since the addition of this ingredient has a function of transferring particularly, τf from negative to positive direction, so that it is effective for adjusting τf from negative to positive direction. On the other hand, if addition amount is more than 1% by weight, Qu tends to decrease remarkably, which it is not preferred. Particularly, the addition amount of $MnO_2$ from 0.2 to 0.4% by weight ($V_2O_5$; 0.4% by weight, PbO; 0.2% by weight and x; 0.8) is preferred since this can provide a practical dielectric ceramic composition well balanced in each of the characteristics as εr: 46.8 to 47.9, Qu: 1351 to 1465 and τf: −6.3 to −2.1 ppm/°C.

Further, the addition amount of PbO is defined as not more than 0.5% by weight, because Qu and τf decrease greatly if the addition amount is more than 0.5% by weight. Since PbO has an effect of transferring, particularly, τf from positive to negative direction by the addition, it is effect ire for adjusting τf from positive to negative direction. Particularly, the addition amount of PbO from 0.2 to 0.4% by weight ($V_2O_5$: 0.4% by weight, $MnO_2$: 0.2% by weight and x: 0.8) is more preferred since a practical dielectric ceramic composition well balanced in each of the characteristics can be obtained as εr: 46.8 to 47.4, Qu: 1293 to 1465, τf; −13.2 to −6.3 ppm/°C.

Further, it is possible to set the addition amount of $V_2O_5$ as 0.3 to 0.8% by weight, the addition amount of $MnO_2$ as 0.1 to 1.0% by weight, the addition amount of PbO as not more than 0.4% by weight and x as from 0.8 to 0.96, because the performances are well balanced in this case. For instance, it is possible to attain τf; −15 to +4 ppm/°C., Qu: 1000 to 2000 and εr: 44–49.

Further, the dielectric ceramic composition of the present invention is produced as described below. The predetermined metal oxide powders are mixed so as to provide a predetermined composition and then calcined at 600°–800° C. to prepare a calcined powder, which is pulverized, molded into a predetermined shape and then sintered at 850°–950° C.

The sintering temperature is defined as within 850° to 950° C., because Qu decreases and τf increases excessively in the negative direction out of the temperature range. Further, low temperature sintering is particularly preferred in a case of sintering simultaneously with a conductor such as for an LC filter. The sintering can be carried out either in an ambient atmosphere or a reducing atmosphere.

In the dielectric ceramic composition according to the present invention, εr, Qu and τf are within a practical characteristic range and each of the characteristics is maintained in a well balanced state. Accordingly, it is suitable to the LC filter material.

Further, the dielectric ceramic composition according to the present invention can be prepared by sintering at a relatively low and wide temperature as 850° to 950° C. Such low temperature sintering is particularly advantageous in a case of the LC filter which is sintered simultaneously with a conductor.

BRIEF DESCRIPTION OF THE DRAWINGS

FIG. 12 is a graph showing a relation between the addition amount (δ) of PbO and Qu in (the main ingredient represented by $Bi(Nb_{0.6}Ta_{0.4})O_4$+0.4% by weight of $V_2O_5$) and in case of 900° C. of sintering temperature.

DETAILED DESCRIPTION OF THE INVENTION

EXAMPLES

Figure 1:
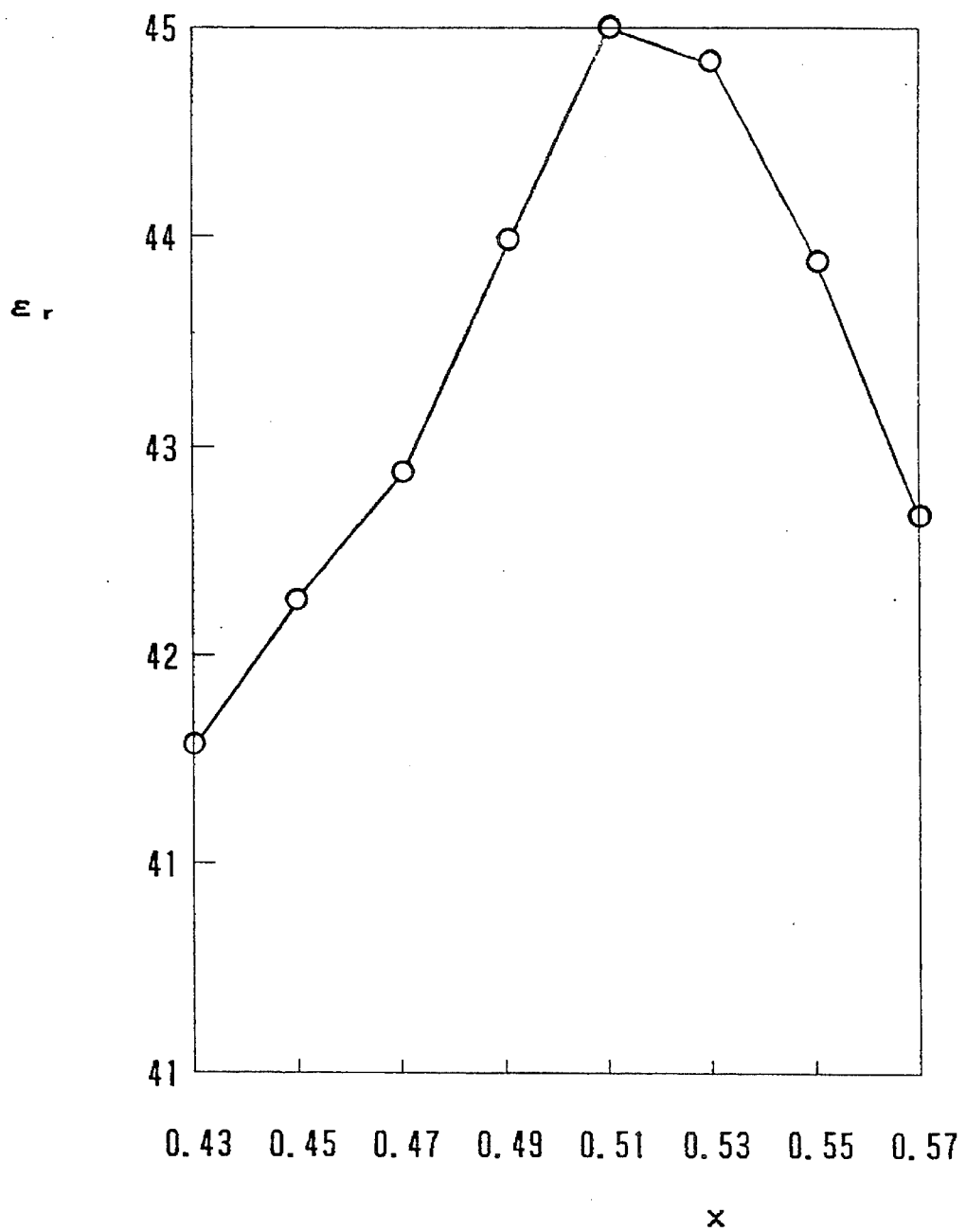
FIG. 1 is a graph showing a relation between x and εr in (the main ingredient represented by $xBi_2O_3$-(1-x) $(0.8Nb_2O_5$-$0.2Ta_2O_5)$+0.4% by weight of $V_2O_5$).

The present invention will be explained more specifically by way of examples.

Example 1

$Bi_2O_3$ a powder (purity: 98.9%), $Nb_2O_5$ powder (purity: 99.9%), $Ta_2O_5$ powder (purity: 99.9%) and $V_2O_5$ powder (purity: 99.5%) were used as the raw material, and they are weighed and mixed each by a predetermined amount (about 600 g as the entire amount in each of the cases) so as to provide compositions in which x ranges from 0.43 to 0.57 and each of y and the addition amount of $V_2O_5$ (α% by weight) varies within a range of 0 to 1.0 in $xBi_2O_3\text{-}(1\text{-}x)(yNb_2O_5\text{-}(1\text{-}y)Ta_2O_5)$ as shown in Tables 1 and 2.

Subsequently, the weighed and mixed raw material powders were applied with primary pulverization by a vibration mill (3 hours) and then calcined in an ambient atmosphere at 700° C. for 2 hours. Then, an appropriate amount of an organic binder (15 g) and water (320 g) were added to each calcined powder and applied with secondary pulverization was conducted in a ball mill using alumina balls of 20 mmφ, at 90 rpm for 23 hours. Subsequently, they were pelletized by vacuum freeze drying (pressure: about 0.4 Torr, freezing temperature: −20° to −40° C., drying temperature: 40° to 50° C., drying time: about 20 hours). The thus pelletized raw materials were molded at a pressure of 1 ton/cm² to obtain cylindrical molding products each of 19 mmφ×10 mmt (height).

TABLE 1

$[0.5Bi_2O_3 - 0.5\{yNb_2O_5 - (1-y)Ta_2O_5\} + \alpha V_2O_5]$ ceramic composition

| No. | y | α (V₂O₅) (wt %) | f₀ (GHz) | Rel. dielect. const. εr | Qu | τf (ppm/°C.) |
|---|---|---|---|---|---|---|
| 1 | 0.2 | 0.2 | 4.4 | 33.2 | 703 | −56.8 |
| 2 | 0.4 | 0.2 | 4.0 | 42.5 | 510 | −49.0 |
| 3 | 0.6 | 0.2 | 3.9 | 43.5 | 443 | −41.2 |
| 4 | 0.8 | 0.2 | 3.9 | 43.1 | 491 | −28.0 |
| 5 | 0.2 | 0.4 | 3.9 | 44.7 | 1344 | −53.1 |
| 6 | 0.4 | 0.4 | 3.9 | 45.9 | 1488 | −46.4 |
| 7 | 0.6 | 0.4 | 3.8 | 46.2 | 1305 | −32.8 |
| 8 | 0.8 | 0.4 | 3.9 | 44.6 | 1487 | −18.5 |
| 9 | 0.2 | 0.6 | 3.8 | 47.1 | 1014 | −52.1 |
| 10 | 0.4 | 0.6 | 3.8 | 47.7 | 897 | −39.8 |
| 11 | 0.6 | 0.6 | 3.8 | 46.6 | 791 | −29.6 |
| 12 | 0.8 | 0.6 | 3.9 | 45.6 | 816 | −18.5 |
| 13 | 0.2 | 0.8 | 3.7 | 49.0 | 746 | −51.1 |

TABLE 1-continued $[0.5Bi_2O_3 - 0.5\{yNb_2O_5 - (1-y)Ta_2O_5\} + \alpha V_2O_5]$ ceramic composition

| No. | y | α (V₂O₅) (wt %) | f₀ (GHz) | Rel. dielect. const. εr | Qu | τf (ppm/°C.) |
|---|---|---|---|---|---|---|
| 14 | 0.4 | 0.8 | 3.7 | 49.0 | 590 | −36.2 |
| 15 | 0.6 | 0.8 | 3.8 | 48.0 | 505 | −25.0 |
| 16 | 0.8 | 0.8 | 3.9 | 45.7 | 598 | −18.9 |

TABLE 2

$[xBi_2O_3 - (1-x)\{yNb_2O_5 - (1-y)Ta_2O_5\} + \alpha V_2O_5]$ ceramic composition

| No. | x | y | α (V₂O₅) (wt %) | f₀ (GHz) | Rel. dielect. const. εr | Qu | τf (ppm/°C.) |
|---|---|---|---|---|---|---|---|
| 17 | 0.43 | 0.8 | 0.4 | 4.0 | 41.6 | 243 | −26.5 |
| 18 | 0.45 | 0.8 | 0.4 | 4.0 | 42.2 | 610 | −18.0 |
| 19 | 0.47 | 0.8 | 0.4 | 4.0 | 42.9 | 1100 | −16.2 |
| 20 | 0.49 | 0.8 | 0.4 | 3.9 | 44.0 | 1360 | −17.3 |
| 21 | 0.51 | 0.8 | 0.4 | 3.9 | 45.0 | 1432 | −23.1 |
| 22 | 0.53 | 0.8 | 0.4 | 3.9 | 44.8 | 1190 | −27.0 |
| 23 | 0.55 | 0.8 | 0.4 | 4.0 | 43.9 | 780 | −31.5 |
| 24 | 0.57 | 0.8 | 0.4 | 4.0 | 42.7 | 370 | −38.0 |
| 25 | 0.5 | 0 | 0.2 | 4.6 | 30.8 | 829 | −57.5 |
| 26 | 0.5 | 0 | 0.4 | 4.1 | 40.4 | 1115 | −48.3 |
| 27 | 0.5 | 0 | 1.0 | 3.7 | 50.3 | 562 | −36.5 |
| 28 | 0.5 | 1.0 | 0.2 | 4.1 | 42.3 | 476 | −23.6 |
| 29 | 0.5 | 0.9 | 0.4 | 4.0 | 43.7 | 1450 | −11.5 |
| 30 | 0.5 | 1.0 | 0.4 | 4.0 | 42.9 | 1504 | −2.7 |
| 31 | 0.5 | 1.0 | 1.0 | 4.0 | 44.5 | 557 | −6.2 |
| 32 | 0.5 | 0.4 | 0 | 4.9 | 29.8 | 203 | −68.0 |

Then, the molding products were degreased in an atmospheric air at 500° C. for 3 hours and then sintered at 850° to 900° C. for 2 hours to obtain sintering products. Finally, each of the sintering products was polished at both end faces into a cylindrical shape of about 16 mmφ×8 mmt (height), further cleaned with a diluted solution comprising 5 parts of an aqueous detergent ("Eriese K–2000" manufactured by Asahi Kasei Co.) and 100 parts of water mixed together, at 23° C. for 60 min, and dried at 80° C. for 10 hours to form dielectric specimens (Nos. 1–32 in Tables 1 and 2). The temperature elevation rate was 200° C./h and the temperature lowering rate was −200° C./h in the calcining step, the temperature elevation rate was 50° C./h in the decreasing step, and the temperature elevation rate was 100° C./h and the temperature lowering rate was −100° C./h in the sintering step.

Then, εr, Qu and τf were measured for each of the specimens by a parallel conductor plate dielectric columnar resonator method (TE₀₁₁ MODE) or the like. The resonance frequency upon measurement is as shown in Table 1 (f₀). Further, τf was measured at a temperature region from 23° to 80° C. and calculated according τf=(f₈₀−f₂₃)/(f₂₃×ΔT) and ΔT=80−23=57° C. The results are shown in Tables 1 and 2 and in the graphs of FIGS. 1 to 6.

Figure 2:
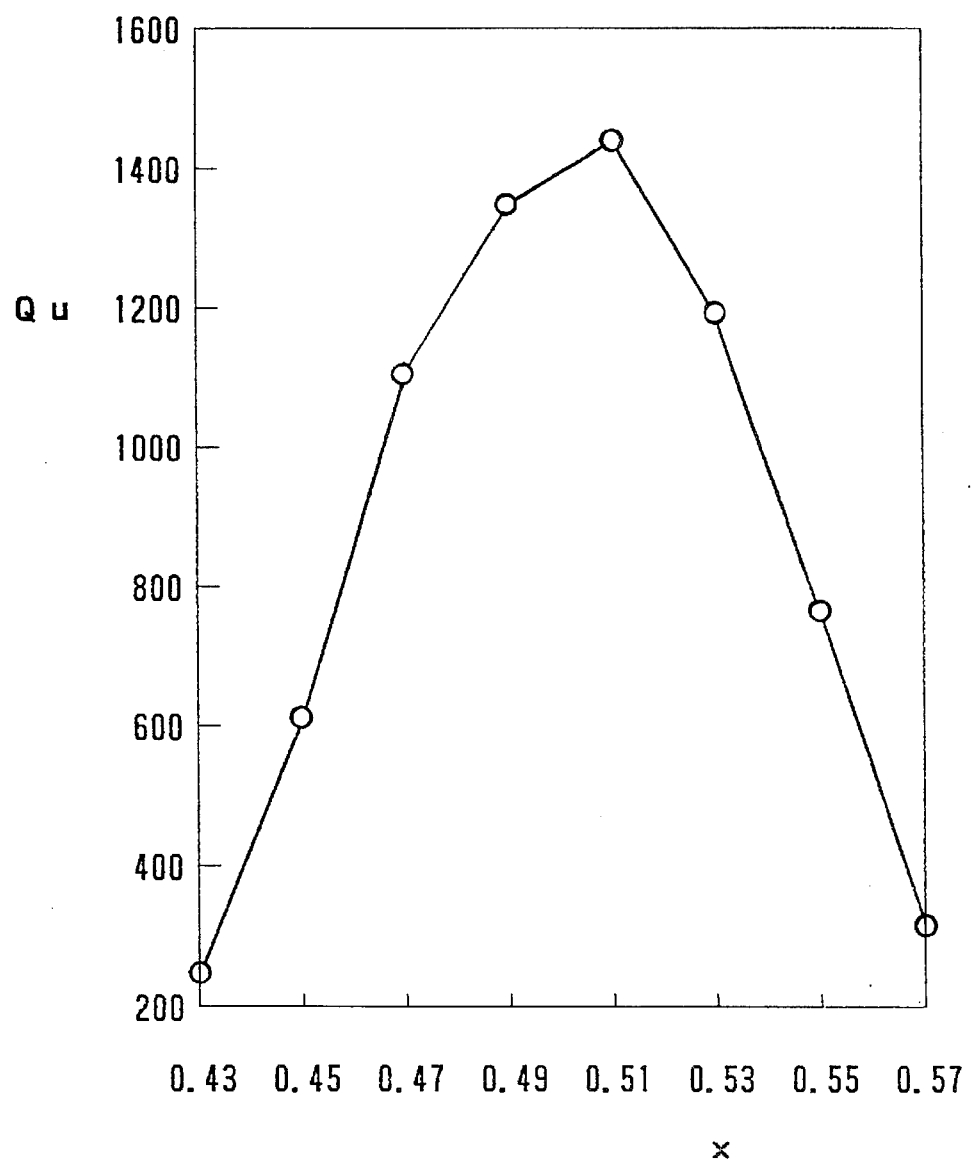
FIG. 2 is a graph showing a relation between x and Qu in (a main ingredient represented by $xBi_2O_5$-(1-x) $(0.8Nb_2O_5$-$0.2Ta_2O_5)$+0.4% by weight of $V_2O_5$).
Figure 3:
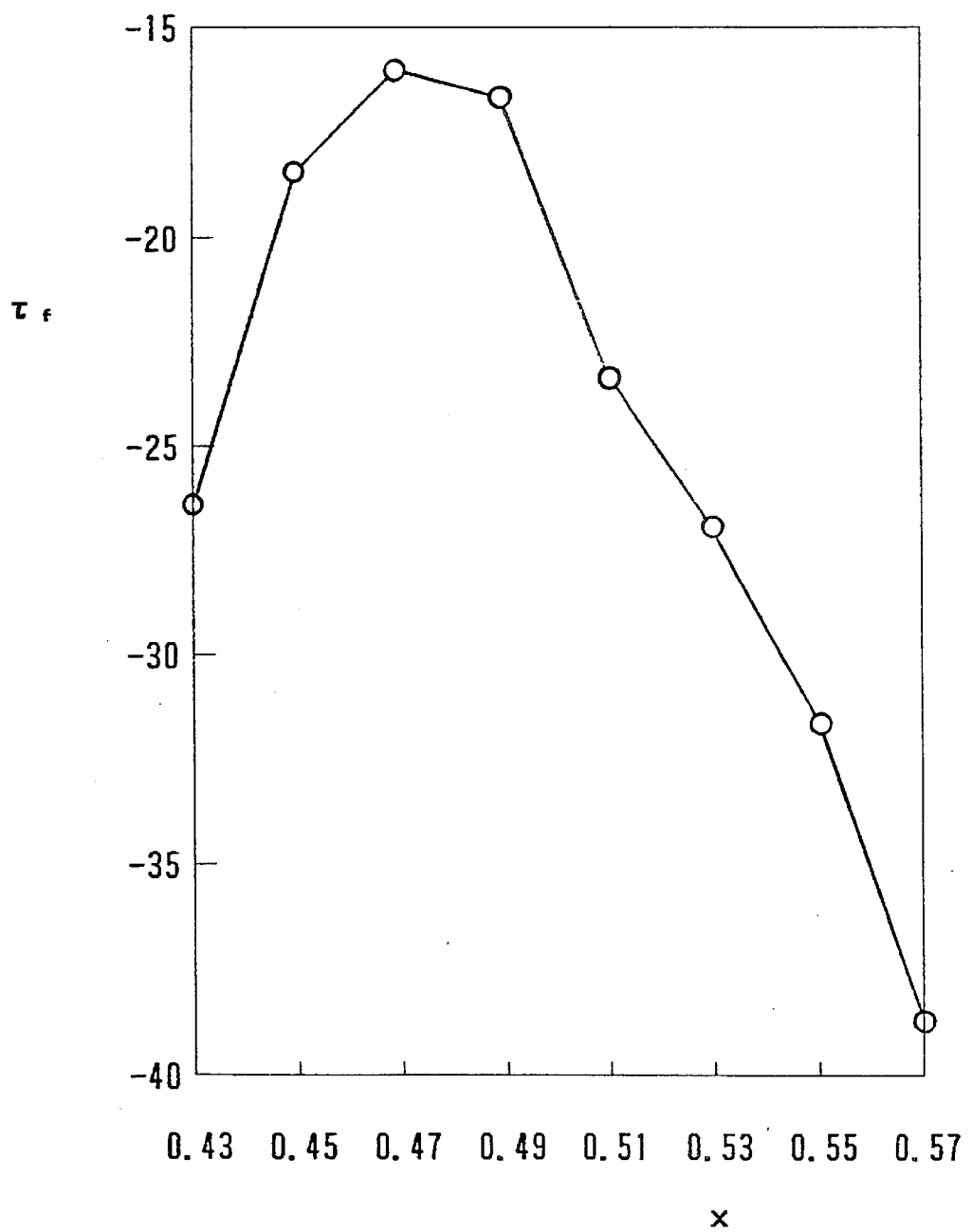
FIG. 3 is a graph showing a relation between x and τf in (the main ingredient represented by $xBi_2O_3$-(1-x) $(0.8Nb_2O_5$-$0.2Ta_2O_5)$+0.4% by weight of $V_2O_5$).

From the results, Qu decreases remarkably at x for 0.43 and 0.57 and εr also decreases considerably at x for 0.43 (No. 17 in Table 2) and τf also decreases in the negative direction at x for 0.57 (No. 24 in Table 2). On the other hand it can seen that within a range of x from 0.45 to 0.55, particularly, from 0.47 to 0.51, compositions excellent in all of εr, Qu and τf and well balanced in the characteristics is obtained (FIGS. 1–3).

Figure 4:
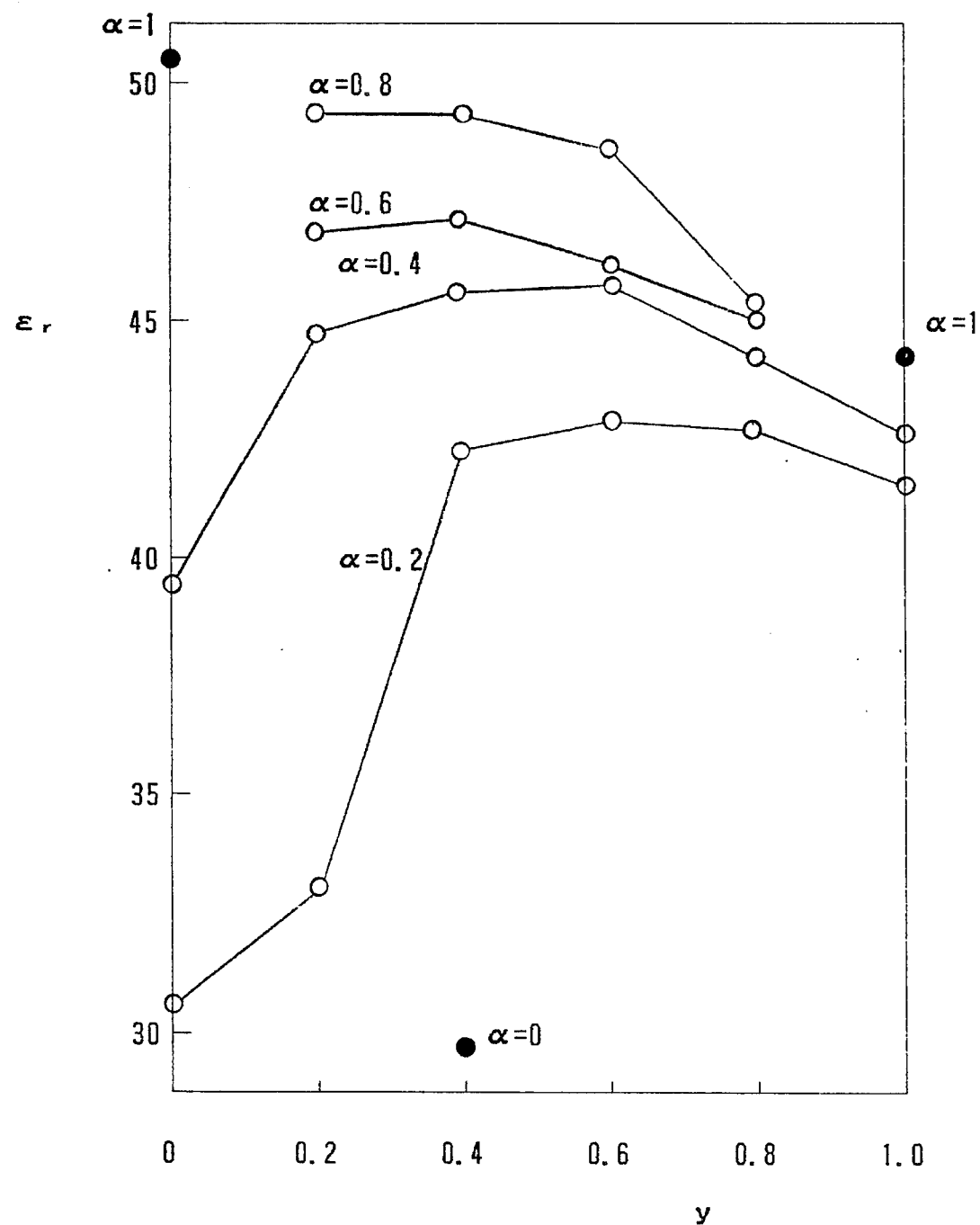
FIG. 4 is a graph showing a relation between y of the main ingredient represented by $0.5Bi_2O_3$-$0.5(yNb_2O_5$-(1-y)$Ta_2O_5)$ and the addition amount of (α) of $V_2O_5$, and εr.
Figure 5:
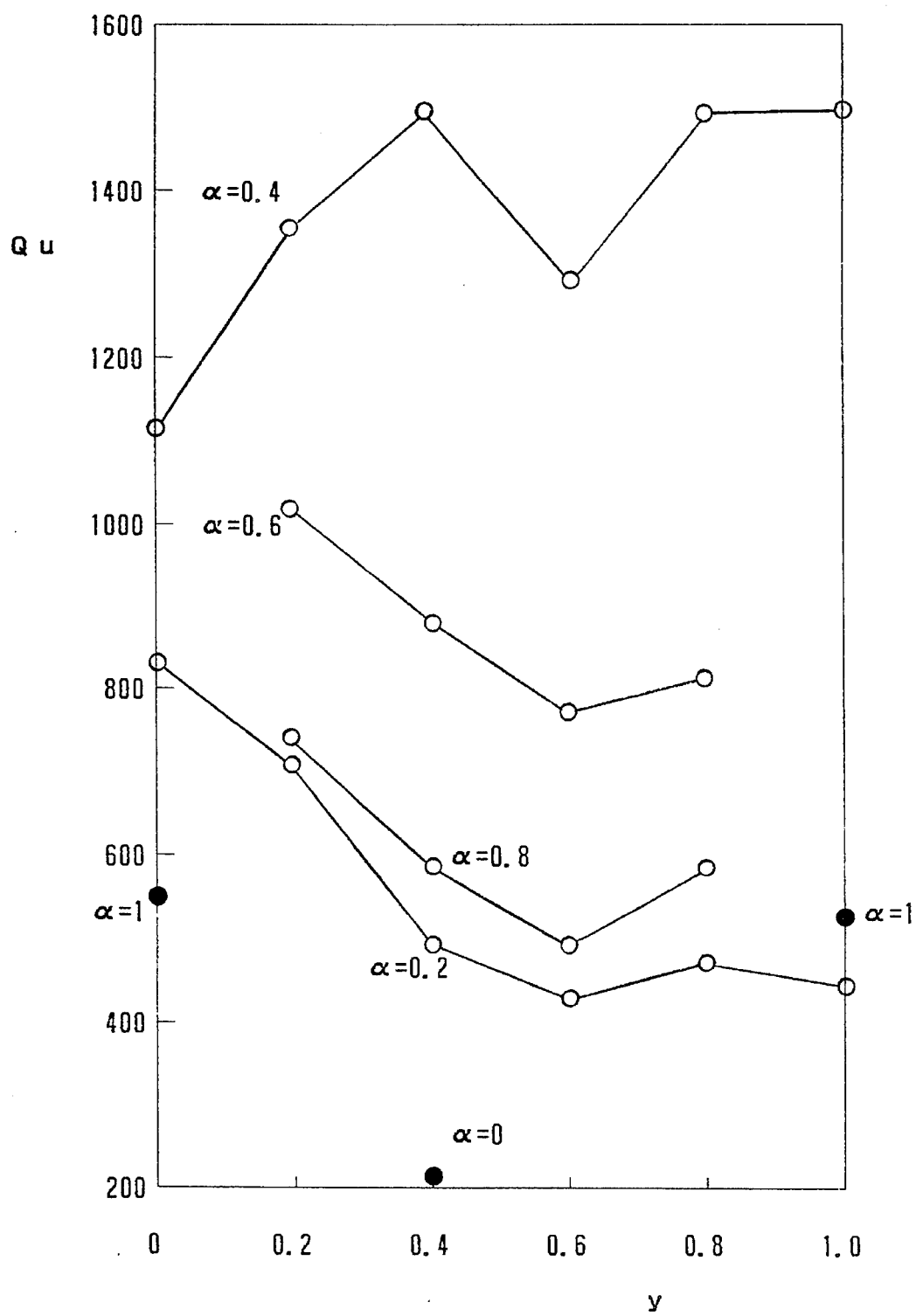
FIG. 5 is a graph showing a relation between y of the main ingredient represented by $0.5Bi_2O_3$-$0.5(yNb_2O_5$-(1-y)$Ta_2O_5$) and the addition amount (α) of $V_2O_5$, and Qu.
Figure 6:
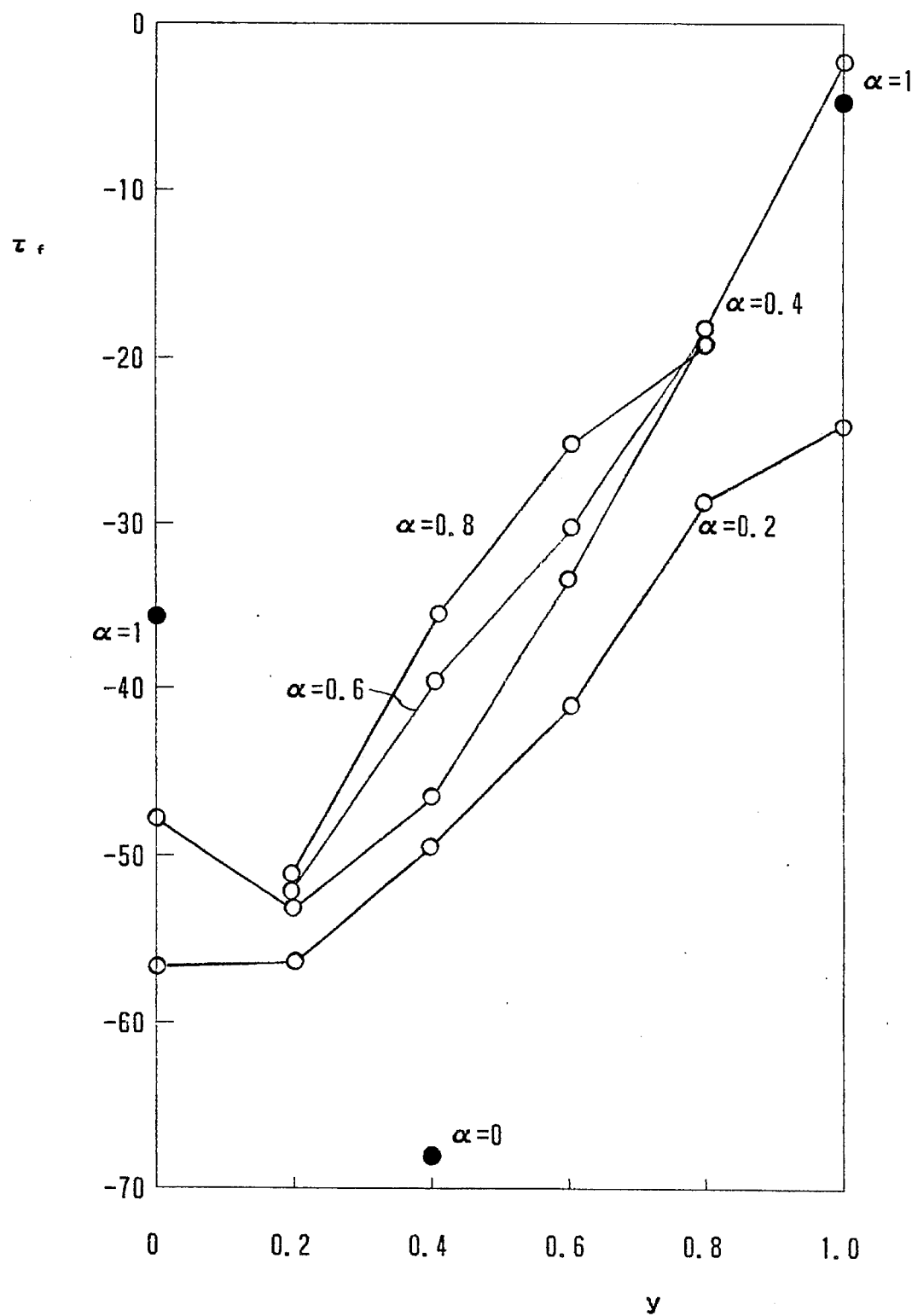
FIG. 6 is a graph showing a relation between y of the main ingredient represented by $0.5Bi_2O_5$-$0.5(yNb_2O_5$-(1-y)$Ta_2O_5)$ and the addition amount (α) of $V_2O_5$, and τf.

Further, $\epsilon r$ slightly decrease at y=1.0 and at a of 0.2% by weight (No. 28 in Table 2) and 0.4% by weight (No. 30 in Table 2) as compared with a case of y at 0.2 to 0.8. And if y is 0.9 and α is 0.4% by weight (No. 29 in Table 2), balance of $\epsilon r$, Qu and τf is excellent. If y is 0, $\epsilon r$ decreases further. Further, if y is 0, and α is 1.0 % by weight (No. 27 in Table 2), although $\epsilon r$ is excellent, Qu tends to decrease. Further, if y is 1.0, and αis 1.0% by weight (No. 31 in Table 2), although τf is excellent, Qu decreases. If y is 0.4 and α is 0 (No. 32 in Table 2), all $\epsilon r$, Qu and τf greatly decrease because sintering is insufficient (FIGS. 4–6).

In each of the examples described above, although each of the performances $\epsilon r$, Qu and τf is excellent individually, balance between each of them is somewhat poor.

On the other hand, if y is in a range of 0.2 to 0.8 and α is 0.8 % by weight (Nos. 13–16 in Table 1) and 0.6 by weight (Nos 9–12 in Table 1), $\epsilon r$ is excellent. Although Qu decreases if α is 0.8% by weight but it is within a range causing no practical problem. Further, τf also exhibits a practically sufficient performance with no problem. Further, if y is within a range from 0.2 to 0.8 and α is 0.4 % by weight (Nos. 5 to 8 in Table 1), although $\epsilon r$ tends to decrease slightly as compared with the case of α at 0.8 % and 0.6% by weight, Qu is improved greatly and τf is equivalent, to show well balanced excellent performance. Furthermore, if y is within a range from 0.2 to 0.8 and a is 0.2% by weight (Nos. 1–4 in Table 1), each of the characteristics tends to decrease as compared with the case of greater α, but they are within a practically sufficient range (FIGS. 4 to 6).

In particular, as shown in results of tables 1 and 2, it is preferred that x is from 0.47 to 0.53, y is from 0.4 to 0.8 and α is from 0.4 to 0.6, since each physical property is balanced. In this case, $\epsilon r$ may be from 42.9 to 47.7, Qu may be from 790 to 1490 and τf may be from –46.4 to –16.2 ppm/°C.

Further, it can be seen from FIGS. 4 to 6, that each of the characteristics exhibits a substantially identical trend as y increases from 0.2 to 0.8 irrespective of the value α and, particularly, the performance τf tends to be improved, and the value rf can be controlled within a practical value while maintaining high $\epsilon r$ and Qu with no practical problem, by varying the ratio of $Nb_2O_5$ and $Ta_2O_5$.

Example 2

As the raw material in this example, PbO powder (purity: 99.5%) was added further to each of the powder used in Example 1. Then, the starting materials were weighed and mixed in the same manner as in Example 1 so as to obtain a composition in which x is 0.6, the addition amount of $V_2O_5$ is 0.4% by weight and the addition amount of PbO (δ% by weight) varies within a range from 0 to 2.0 in $Bi(Nb_xTa_{1-x})O_4$ as shown in Table 3.

In Table 3, x is 0.2 in No. 13, an addition amount of $V_2O_5$ is 3.0% by weight in No. 14, and x is 0.2 and an addition amount of $V_2O_5$ is 3.0% by weight in No. 15.

Further, in the same manner as in Example 1, dielectric specimens of identical shape (Nos. 1 to 30 in Table 3) were obtained and performance evaluation ($\epsilon r$, Qu, τf and sintering density) was carried out. The results are also shown in Table 3 and shown in the graphs of FIGS. 7 to 14. The sintering products were cleaned after polishing at 80° C. for 30 min and then dried subsequently at 100° C. for 4 hours. The resonance frequency upon measurement is as shown in Table 3 ($f_0$). τf was measured within a temperature region of 25° to 80° C. and calculated according to $\tau f=(f_{80}-f_{25})/(f_{25}\times \Delta T)$, and ΔT=80–25=55° C.

TABLE 3

| No. | Sinter. temp. (°C.) | x | $V_2O_5$ (α) (wt %) | PbO (δ) (wt %) | $f_o$ (GHz) | $\epsilon_r$ | Qu | $\tau_f$ (ppm/°C.) | Sint. density (g/cm³) |
|---|---|---|---|---|---|---|---|---|---|
| 1 | 850 | 0.6 | 0.4 | 0 | Resonance wave form is very weak. | | | | 6.81 |
| 2 | | 0.6 | 0.4 | 0.2 | 3.98 | 42.05 | 1425 | –42.10 | 7.49 |
| 3 | | 0.6 | 0.4 | 0.4 | 3.83 | 46.19 | 1041 | –47.22 | 7.86 |
| 4 | | 0.6 | 0.4 | 1 | 3.83 | 46.08 | 487 | –58.78 | 7.70 |
| 5 | | 0.6 | 0.4 | 2 | 3.75 | 48.06 | 193 | –60.38 | 7.72 |
| 6 | 875 | 0.6 | 0.4 | 0 | 3.85 | 44.08 | 1607 | –35.91 | 7.70 |
| 7 | | 0.6 | 0.4 | 0.2 | 3.85 | 45.43 | 1640 | –39.18 | 7.79 |
| 8 | | 0.6 | 0.4 | 0.4 | 3.82 | 46.53 | 1213 | –47.32 | 7.89 |
| 9 | | 0.6 | 0.4 | 1 | 3.75 | 48.33 | 482 | –53.06 | 7.91 |
| 10 | | 0.6 | 0.4 | 2 | 3.67 | 50.38 | 238 | –73.80 | 7.91 |
| 11 | 900 | 0.6 | 0.4 | 0 | 3.85 | 46.19 | 1304 | –32.82 | 7.90 |
| 12 | | 0.6 | 0.4 | 0.2 | 3.83 | 46.21 | 1528 | –36.67 | 7.85 |
| 13 | | 0.2 | 0.4 | 0.2 | 3.85 | 45.01 | 1511 | –48.21 | 8.05 |
| 14 | | 0.6 | 3.0 | 0.2 | 3.80 | 46.71 | 735 | –42.33 | 7.95 |
| 15 | | 0.2 | 3.0 | 0.2 | 3.83 | 46.40 | 594 | –53.03 | 8.23 |
| 16 | | 0.6 | 0.4 | 0.4 | 3.83 | 46.94 | 1211 | –43.50 | 7.89 |
| 17 | | 0.6 | 0.4 | 0.6 | 3.81 | 47.46 | 956 | –47.80 | 7.90 |
| 18 | | 0.6 | 0.4 | 0.7 | 3.80 | 47.71 | 828 | –49.90 | 7.91 |
| 19 | | 0.6 | 0.4 | 1 | 3.76 | 48.48 | 445 | –56.27 | 7.93 |
| 20 | | 0.6 | 0.4 | 2 | 3.65 | 51.37 | 280 | –83.01 | 7.96 |
| 21 | 925 | 0.6 | 0.4 | 0 | 3.84 | 45.93 | 1255 | –31.78 | 7.67 |
| 22 | | 0.6 | 0.4 | 0.2 | 3.82 | 46.36 | 1423 | –39.76 | 7.88 |
| 23 | | 0.6 | 0.4 | 0.4 | 3.82 | 46.58 | 1192 | –45.64 | 7.87 |
| 24 | | 0.6 | 0.4 | 1 | 3.75 | 48.52 | 458 | –56.87 | 7.92 |
| 25 | | 0.6 | 0.4 | 2 | 3.64 | 51.45 | 240 | –104.80 | 7.98 |
| 26 | 950 | 0.6 | 0.4 | 0 | 3.87 | 44.87 | 1214 | –33.01 | 7.65 |
| 27 | | 0.6 | 0.4 | 0.2 | 3.81 | 46.16 | 1378 | –39.12 | 7.84 |
| 28 | | 0.6 | 0.4 | 0.4 | 3.82 | 46.46 | 1094 | –44.83 | 7.85 |
| 29 | | 0.6 | 0.4 | 1 | 3.75 | 48.53 | 407 | –62.61 | 7.91 |

TABLE 3-continued

| No. | Sinter. temp. (°C.) | x | $V_2O_5$ (α) (wt %) | PbO (δ) (wt %) | $f_o$ (GHz) | $\epsilon_r$ | Qu | $\tau_f$ (ppm/°C.) | Sint. density (g/cm³) |
|---|---|---|---|---|---|---|---|---|---|
| 30 | | 0.6 | 0.4 | 2 | 3.63 | 51.69 | 214 | 106.00 | 7.97 |

Figure 7:
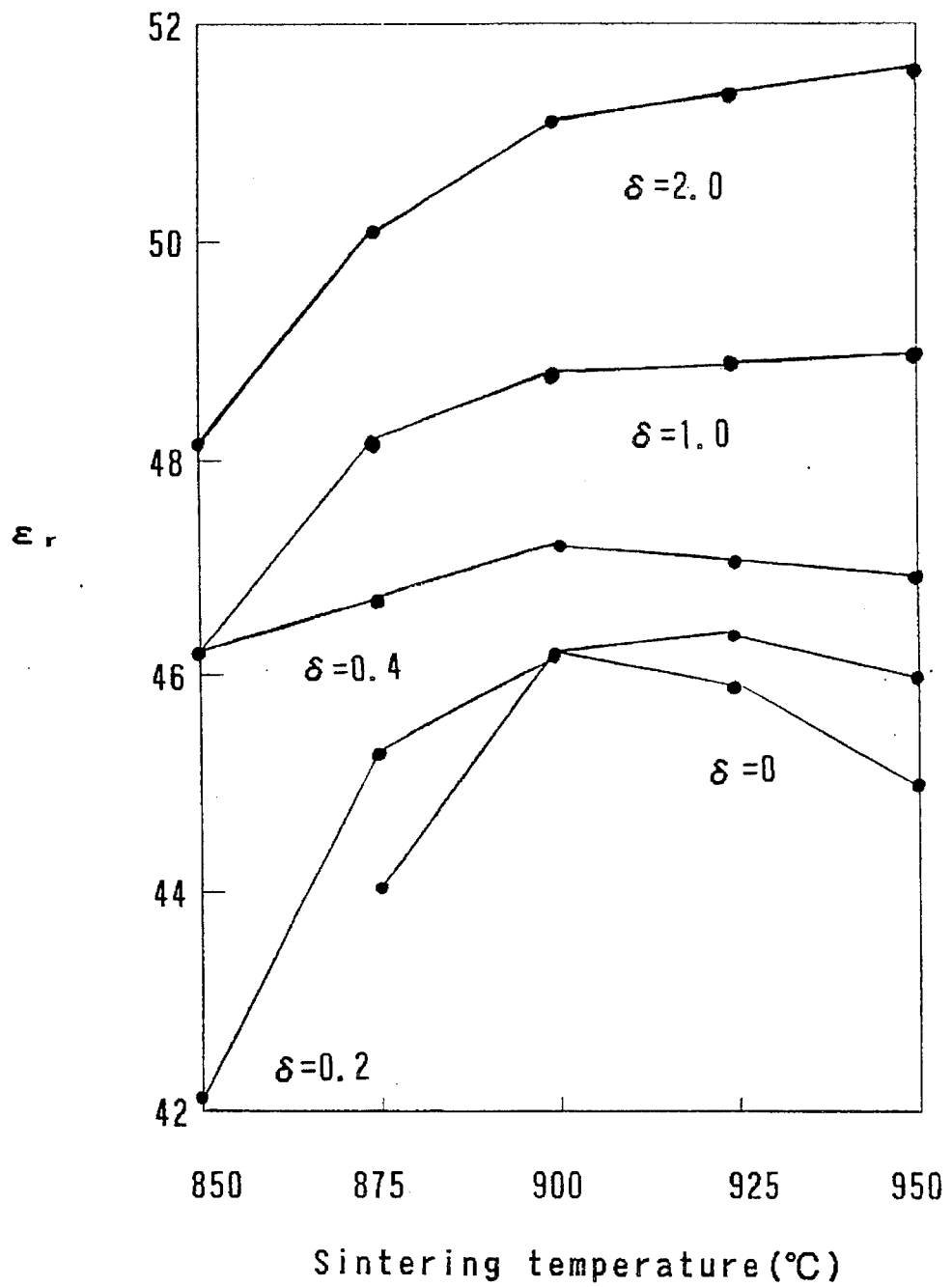
FIG. 7 is a graph showing a relation between the sintering temperature and the addition amount (δ) of PbO, and εr in (the main ingredient represented by $Bi(Nb_{0.6}Ta_{0.4})O_{0.4})O_4$+ 0.4% by weight of $V_2O_5$).
Figure 8:
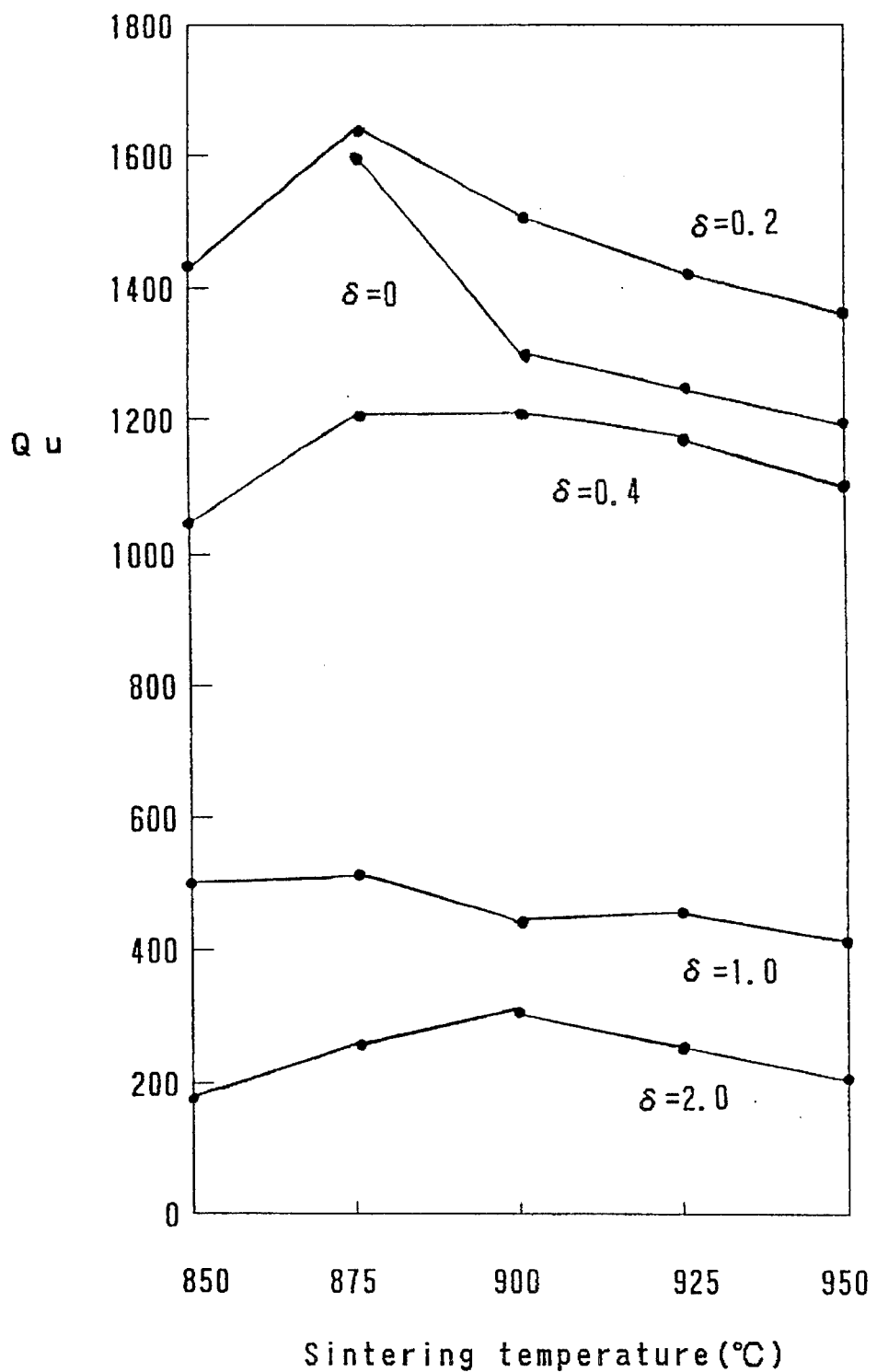
FIG. 8 is a graph showing a relation between the sintering temperature and the addition amount (δ) of PbO, and Qu in (the main ingredient represented by $Bi(Nb_{0.6}Ta_{0.4})O_4$+0.4% by weight of $V_2O_5$).
Figure 9:
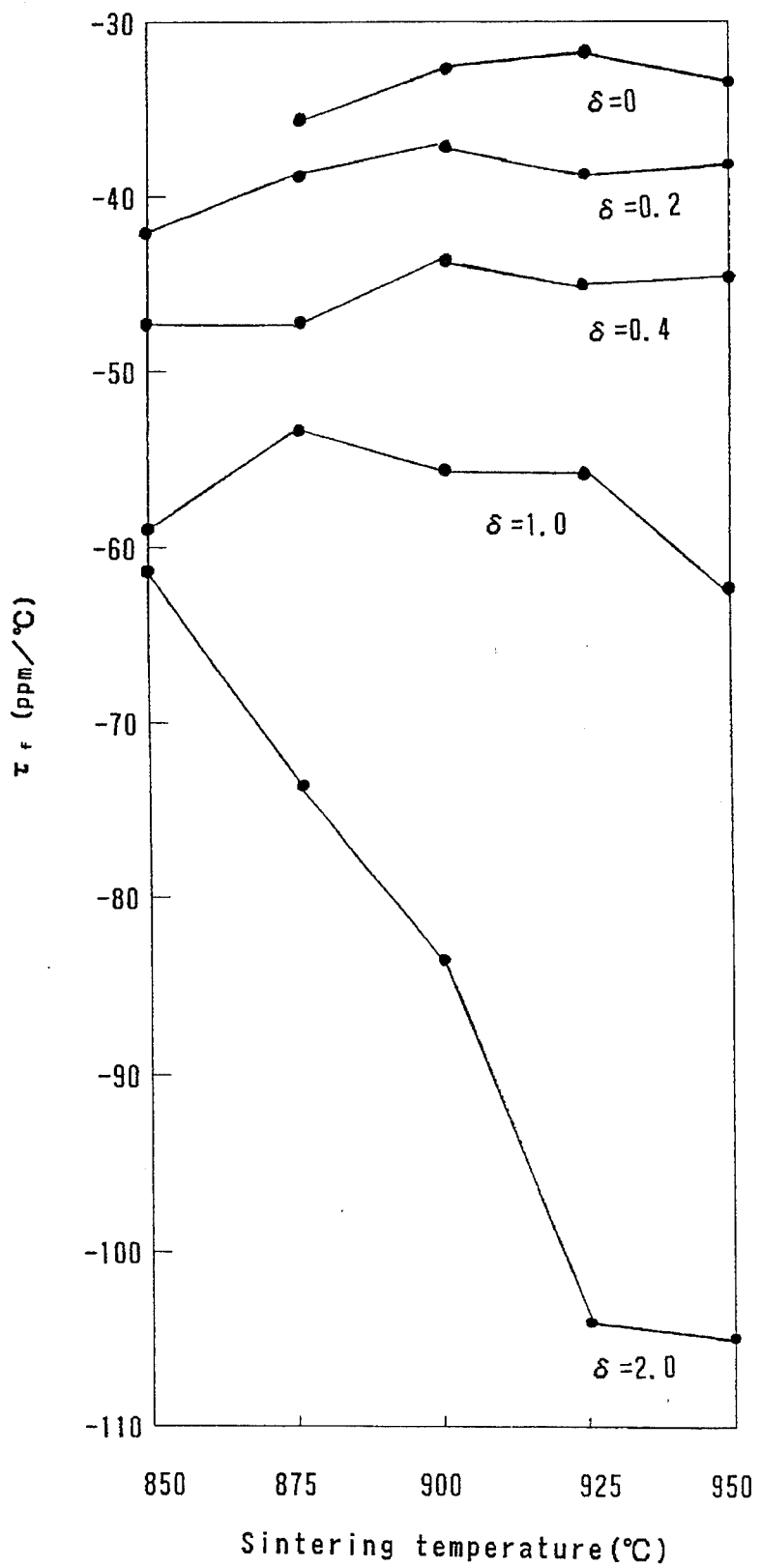
FIG. 9 is a graph showing a relation between the sintering temperature and the addition amount (δ) of PhO, and τf in (the main ingredient represented by $Bi(Nb_{0.6}Ta_{0.4})O_4$+0.4% by weight of $V_2O_5$).
Figure 10:
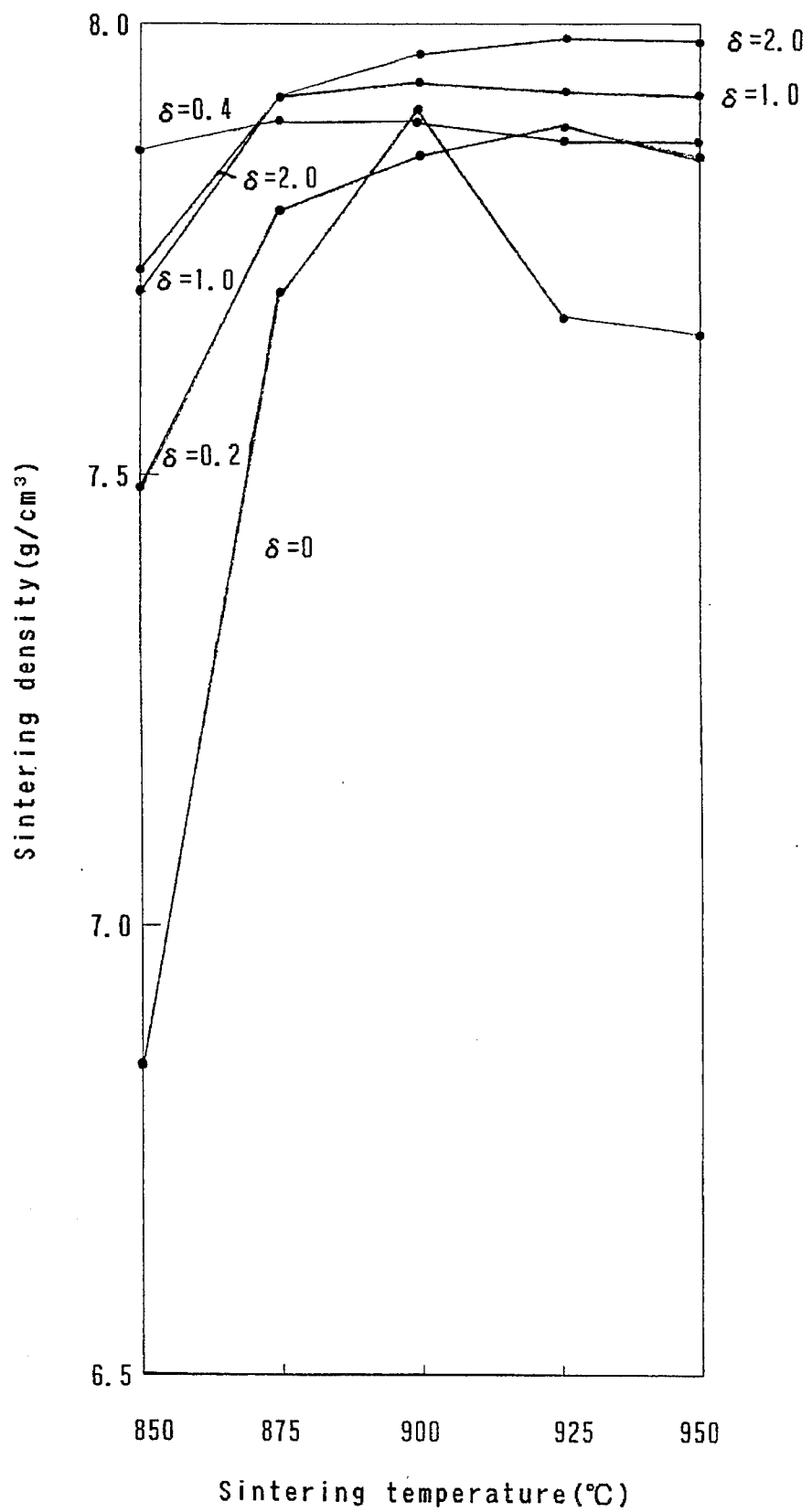
FIG. 10 is a graph showing a relation between the sintering temperature and the addition amount (δ) of PbO, and the sintering density in (the main ingredient represented by $Bi(Nb_{0.6}Ta_{0.4})O_4$+0.4% by weight of $V_2O_5$).
Figure 11:
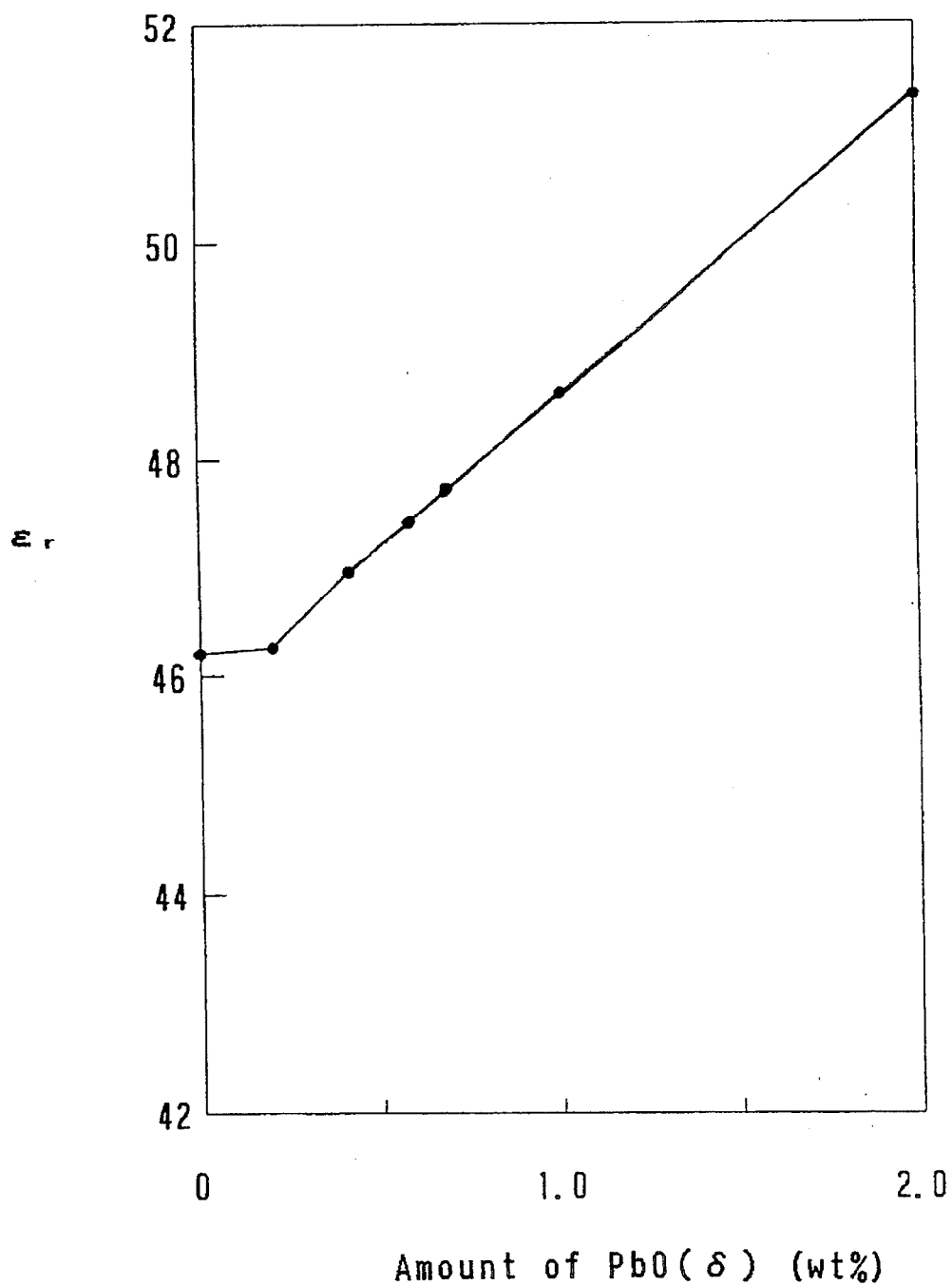
FIG. 11 is a graph showing a relation between the addition amount (δ) of PbO and εr in (the main ingredient represented by $Bi(Nb_{0.6}Ta_{0.4})O_4$+0.4% by weight of $V_2O_5$) and in case of 900° C. of sintering temperature.
Figure 1:
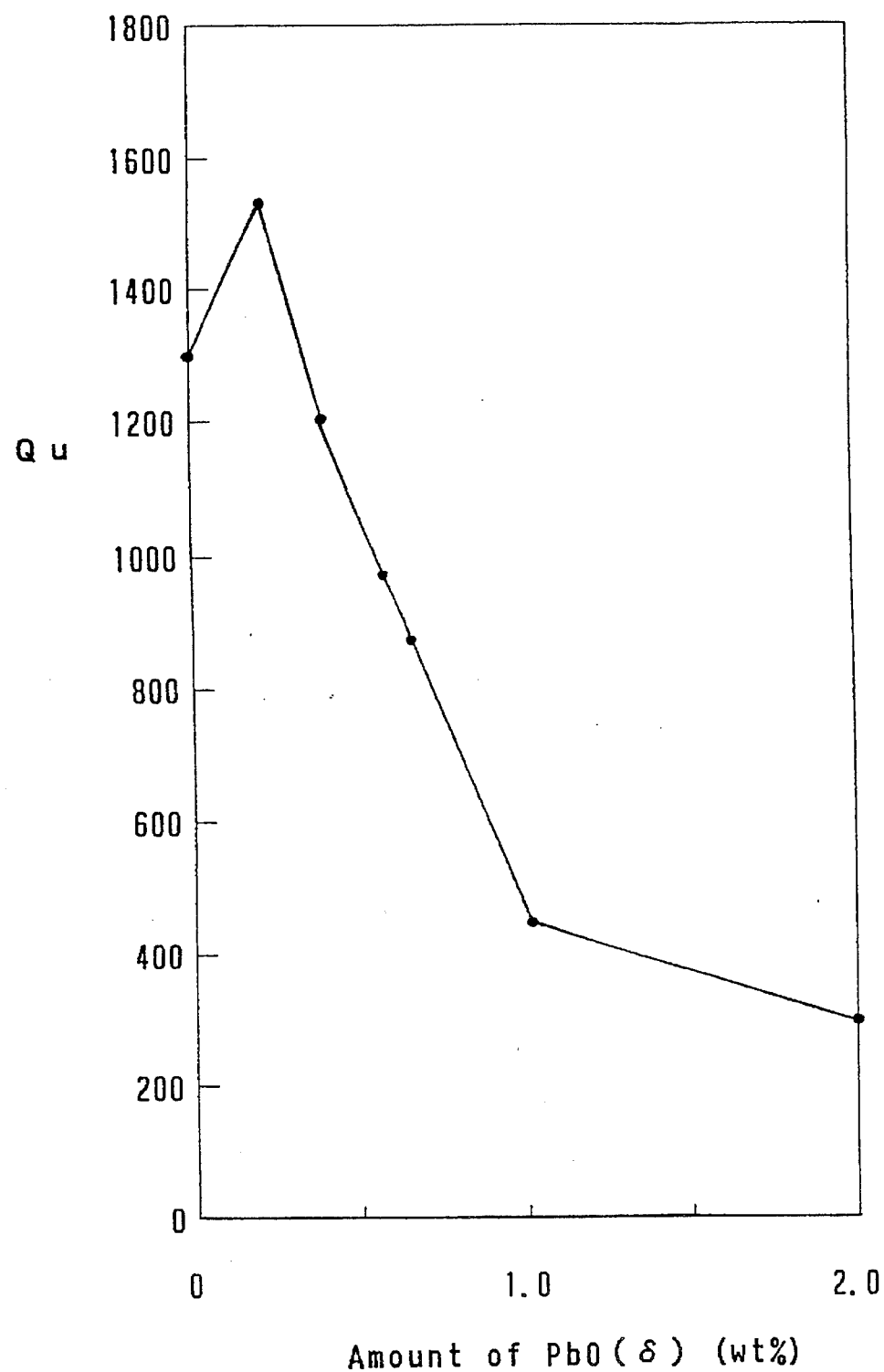
Figure 13:
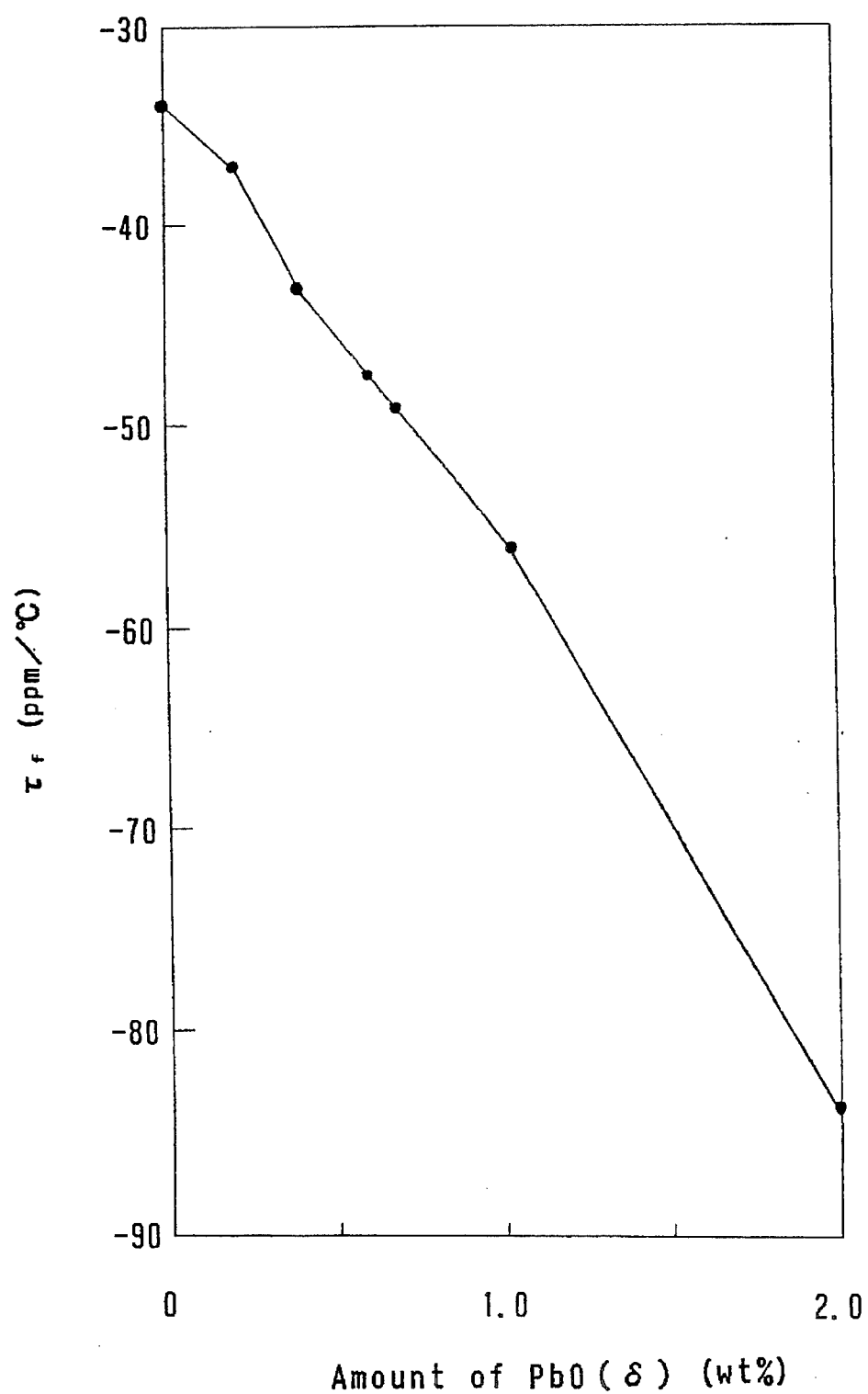
FIG. 13 is a graph showing a relation between the addition amount (δ) of PbO and τf in (the main ingredient represented by $Bi(Nb_{0.6}Ta_{0.4})O_4$+0.4% by weight of $V_2O_5$) and in case of 900° C. of sintering temperature.
Figure 14:
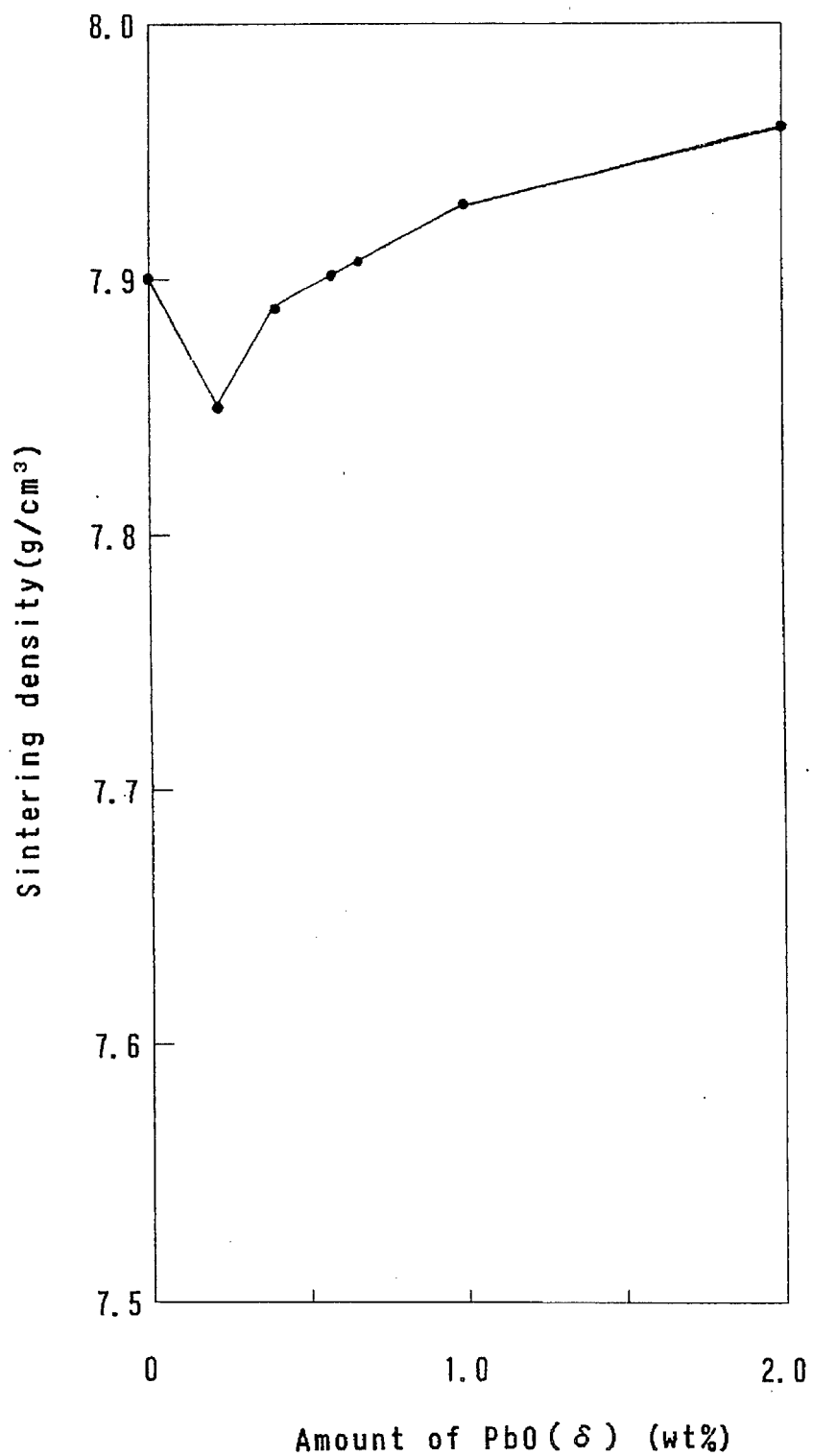
FIG. 14 is a graph showing a relation between the addition amount (δ) of PbO and the sintering density in (the main ingredient represented by $Bi(Nb_{0.6}Ta_{0.4})O_4$+0.4% by weight of $V_2O_5$) and in case of 900° C. of sintering temperature.

From the results, εr is improved from about 45 to about 51 along with increase in the addition amount of PbO irrespective of the sintering temperature except for a case of 42.05 at a sintering temperature of 850° C. and the addition amount of PbO of 0.2% by weight (FIGS. 7 and 11). Improvement of Qu is observed if PbO is added by 0.2% by weight at each of sintering temperature as compared with the case of no addition, but it tends to decrease as the addition amount increases and, particularly, Qu decreases greatly at the addition amount of 1 to 2% by weight (the trend is shown clearly in FIGS. 8 and 12). Further, τf tends to increase toward the negative direction along with increase in the addition amount of PbO and the trend is particularly remarkable at the addition amount of 2% by weight (the trend is shown clearly in FIGS. 9 and 13).

From abovementioned results, it is preferred that x is from 0.2 to 0.9 (tables 1 and 2), the addition amount of $V_2O_5$ is from 0.2 to 2.0 part by weight and the addition amount of PbO is from 0.2 to 0.6% by weight (table 3). In this case, εr may be from 45 to 48, Qu may be from 960 to 1640 (at from 3.6 to 4.0 GHz) and τf may be from −47 to −32 ppm/°C.

On the other hand, the sintering density takes a particularly small value in a case where PhO is not added and the sintering temperature is as low as 850° C. In other cases, it slightly increases at each of the sintering temperatures along with the increase in the addition amount of PbO except for a certain case but no remarkable change is observed as a whole (it can be seen also in FIGS. 10 and 14)

As described above, while each of the characteristics varies in accordance with the addition amount of PbO and the sintering temperature, each of the characteristics is within a range of causing no practical problem so long as they are within the range of the present invention. As a whole, it can he seen that most practically preferred dielectric ceramic compositions are obtained at a sintering temperature of 875° C. or 900° C., with the addition amount of PbO of 0.2 or 0.4% by weight since each of the characteristic is balanced most satisfactorily.

Further, as can be seen from the results of Nos. 13 to 15, τf tends to increase toward the negative direction if x is as small as 0.2 in the present invention, but dielectric ceramic compositions of excellent characteristics can be obtained according to the present invention within a wide range for x and the addition amount of $V_2O_5$.

Example 3

For the raw material in this example, $MnO_2$ powder (purity: 96.0%) was used instead of the PbO powder used in Example 2. Then, the raw materials were weighed and mixed in the same manner as in Example 2 so as to obtain compositions in which x Bi(NbxTa$_1$-x)O$_4$ is 0.8, the addition amount of $V_2O_5$ is 0.4% by weight and the addition amount of $MnO_2$ (β% by weight) ranges range from 0 to 2.0.

In Table x is 0.2 in 4, No. 14, addition amount of $V_2O_5$ is 3.0% by weight in No. 15, and x is 0.2 and addition amount of $V_2O_5$ is 0.3% by weight in No. 16 in Table 4.

TABLE 4

| No. | Sinter. temp. (°C.) | x | $V_2O_5$ (α) (wt %) | $MnO_2$ (β) (wt %) | $f_o$ (GHz) | $\epsilon_r$ | Qu | $\tau_f$ (ppm/°C.) | Sint. density (g/cm³) |
|---|---|---|---|---|---|---|---|---|---|
| 1 | 850 | 0.8 | 0.4 | 0 | Resonance wave form is very weak. | | | | 7.08 |
| 2 | | 0.8 | 0.4 | 0.2 | 3.84 | 45.85 | 1640 | −11.61 | 7.52 |
| 3 | | 0.8 | 0.4 | 0.4 | 3.81 | 46.83 | 1176 | −9.76 | 7.52 |
| 4 | | 0.8 | 0.4 | 1 | 3.75 | 48.62 | 715 | −7.84 | 7.51 |
| 5 | | 0.8 | 0.4 | 2 | 3.66 | 50.99 | 433 | −5.50 | 7.48 |
| 6 | 875 | 0.8 | 0.4 | 0 | 3.86 | 44.45 | 1757 | −18.73 | 7.47 |
| 7 | | 0.8 | 0.4 | 0.2 | 3.84 | 46.01 | 1684 | −11.75 | 7.52 |
| 8 | | 0.8 | 0.4 | 0.4 | 3.82 | 46.93 | 1223 | −9.91 | 7.53 |
| 9 | | 0.8 | 0.4 | 1 | 3.75 | 48.71 | 729 | −10.09 | 7.51 |
| 10 | | 0.8 | 0.4 | 2 | 3.65 | 51.25 | 449 | −8.31 | 7.48 |
| 11 | 900 | 0.8 | 0.4 | 0 | 3.92 | 44.60 | 1485 | −18.47 | 7.48 |
| 12 | | 0.8 | 0.4 | 0.1 | 3.89 | 45.17 | 1574 | −14.32 | 7.49 |
| 13 | | 0.8 | 0.4 | 0.2 | 3.86 | 45.74 | 1662 | −10.16 | 7.50 |
| 14 | | 0.2 | 0.4 | 0.2 | 3.88 | 44.72 | 1482 | −53.10 | 8.13 |
| 15 | | 0.8 | 3.0 | 0.2 | 3.82 | 46.31 | 681 | −12.13 | 7.55 |
| 16 | | 0.2 | 3.0 | 0.2 | 3.86 | 45.81 | 721 | −62.31 | 8.24 |
| 17 | | 0.8 | 0.4 | 0.4 | 3.83 | 46.85 | 1202 | −8.34 | 7.51 |
| 18 | | 0.8 | 0.4 | 0.6 | 3.80 | 47.40 | 1046 | −7.81 | 7.50 |
| 19 | | 0.8 | 0.4 | 0.7 | 3.79 | 47.68 | 968 | −7.55 | 7.50 |
| 20 | | 0.8 | 0.4 | 1 | 3.75 | 48.50 | 734 | −6.76 | 7.49 |
| 21 | | 0.8 | 0.4 | 2 | 3.65 | 51.45 | 476 | −8.53 | 7.47 |
| 22 | 925 | 0.8 | 0.4 | 0 | 3.91 | 44.78 | 1319 | −19.47 | 7.37 |
| 23 | | 0.8 | 0.4 | 0.2 | 3.88 | 45.12 | 1680 | −11.70 | 7.46 |
| 24 | | 0.8 | 0.4 | 0.4 | 3.84 | 46.37 | 1163 | −8.43 | 7.46 |
| 25 | | 0.8 | 0.4 | 1 | 3.77 | 48.18 | 721 | −9.38 | 7.44 |
| 26 | | 0.8 | 0.4 | 2 | 3.65 | 51.02 | 445 | −10.60 | 7.44 |

TABLE 4-continued

| No. | Sinter. temp. (°C.) | x | $V_2O_5$ (α) (wt %) | $MnO_2$ (β) (wt %) | $f_o$ (GHz) | $\epsilon_r$ | Qu | $\tau_f$ (ppm/°C.) | Sint. density (g/cm³) |
|---|---|---|---|---|---|---|---|---|---|
| 27 | 950 | 0.8 | 0.4 | 0 | 3.94 | 43.75 | 1245 | −19.76 | 7.25 |
| 28 |  | 0.8 | 0.4 | 0.2 | 3.91 | 44.09 | 1668 | −13.33 | 7.39 |
| 29 |  | 0.8 | 0.4 | 0.4 | 3.87 | 45.35 | 1181 | −10.37 | 7.39 |
| 30 |  | 0.8 | 0.4 | 1 | 3.80 | 46.95 | 710 | −9.26 | 7.35 |
| 31 |  | 0.8 | 0.4 | 2 | 3.67 | 50.50 | 418 | −12.50 | 7.35 |

Further, in the same manner as in Example 2, dielectric specimens of identical shape (Nos. 1 to 31 in Table 4) were obtained and performance evaluation ($\epsilon r$, Qu, τf and sintering density) was carried out. The resonance frequency upon measurement was as shown in Table 5 ($f_o$). The results are shown together in Table 4 and a 1 so shown in the graphs of FIGS. 15 to 22.

Figure 15:
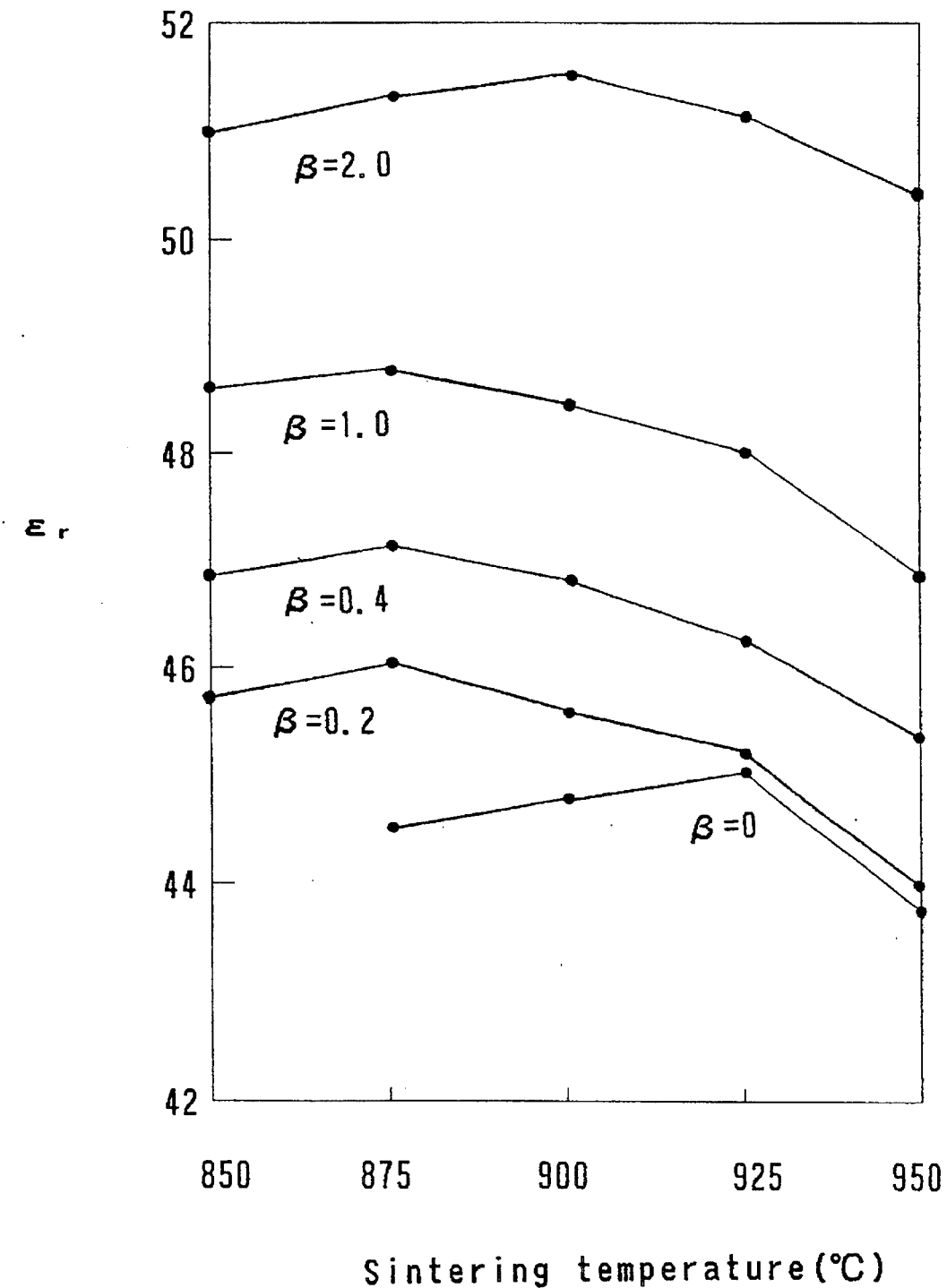
FIG. 15 is a graph showing a relation between the sintering temperature and the addition amount (β) of $MnO_2$, and εr in (the main ingredient represented by $Bi(Nb_{0.8}Ta_{0.2})O_4$+0.4% by weight of $V_2O_5$).
Figure 16:
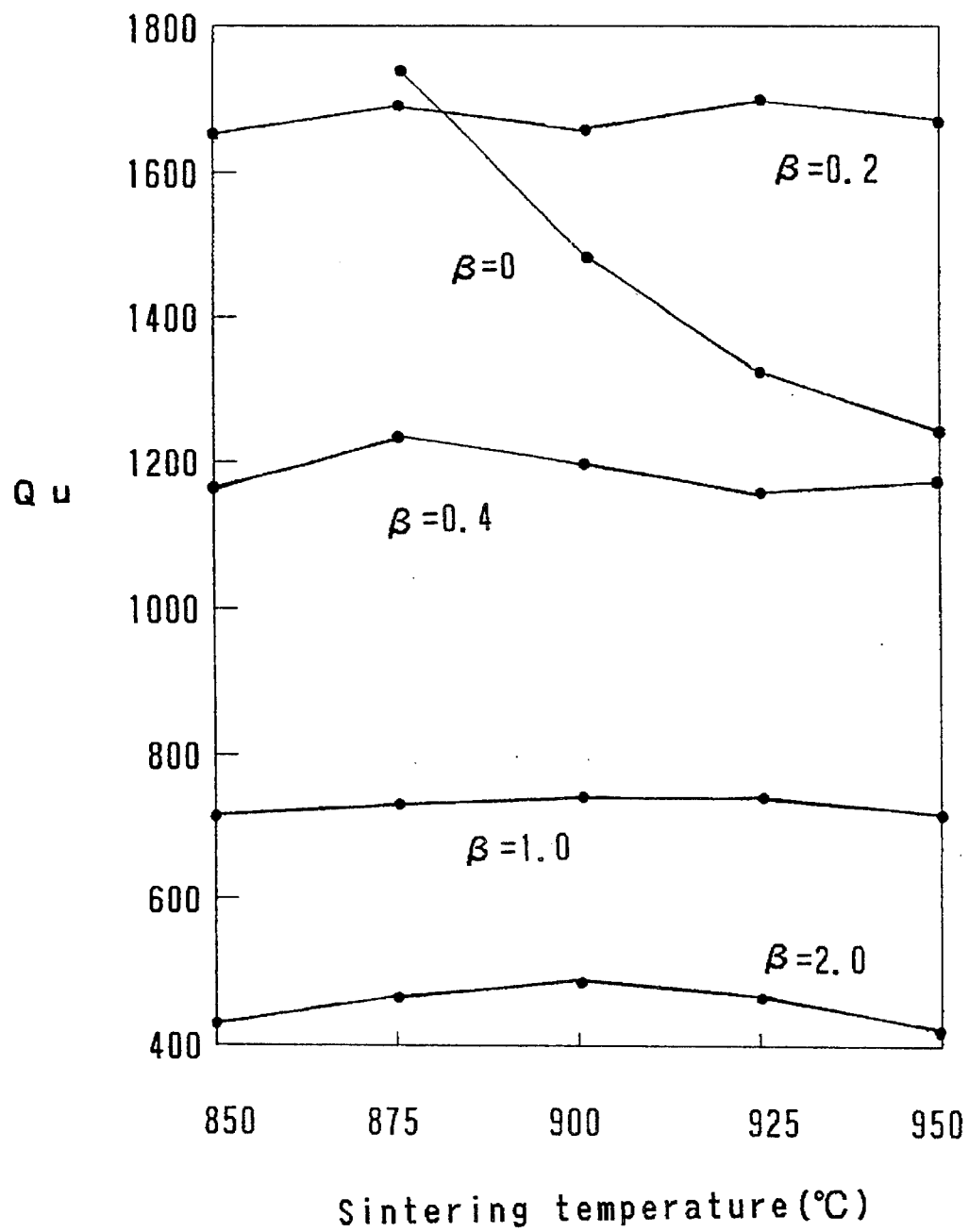
FIG. 16 is a graph showing a relation between the sintering temperature and the addition amount (β) of $MnO_2$, and Qu in (the main ingredient represented by $Bi(Nb_{0.8}Ta_{0.2})O_4$+0.4% by weight of $V_2O_5$).
Figure 17:
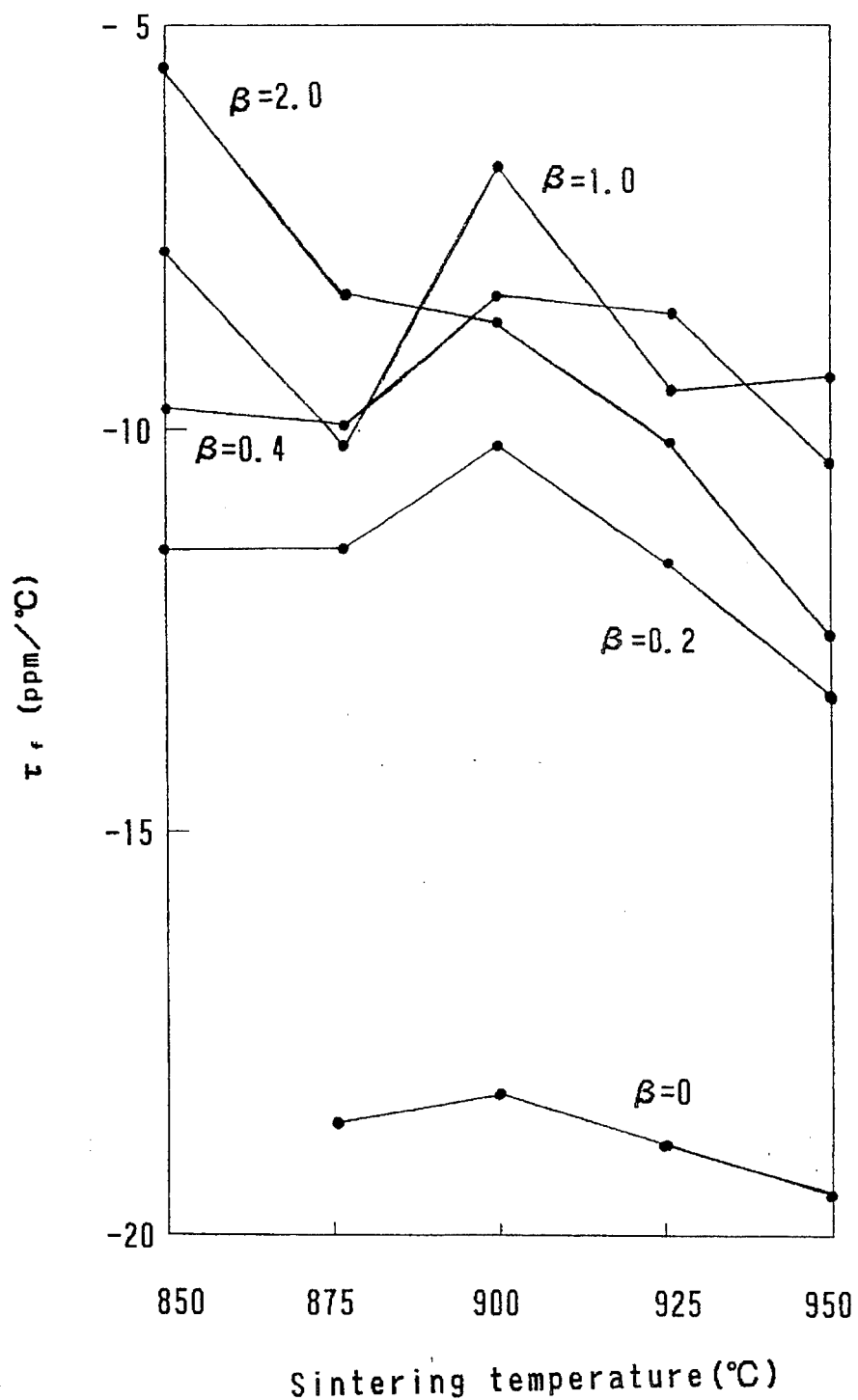
FIG. 17 is a graph showing a relation between the sintering temperature and the addition amount (β) of $MnO_2$, and τf (the main ingredient represented by $Bi(Nb_{0.8}Ta_{0.2})O_4$+0.4% by weight of V $2O_5$).
Figure 18:
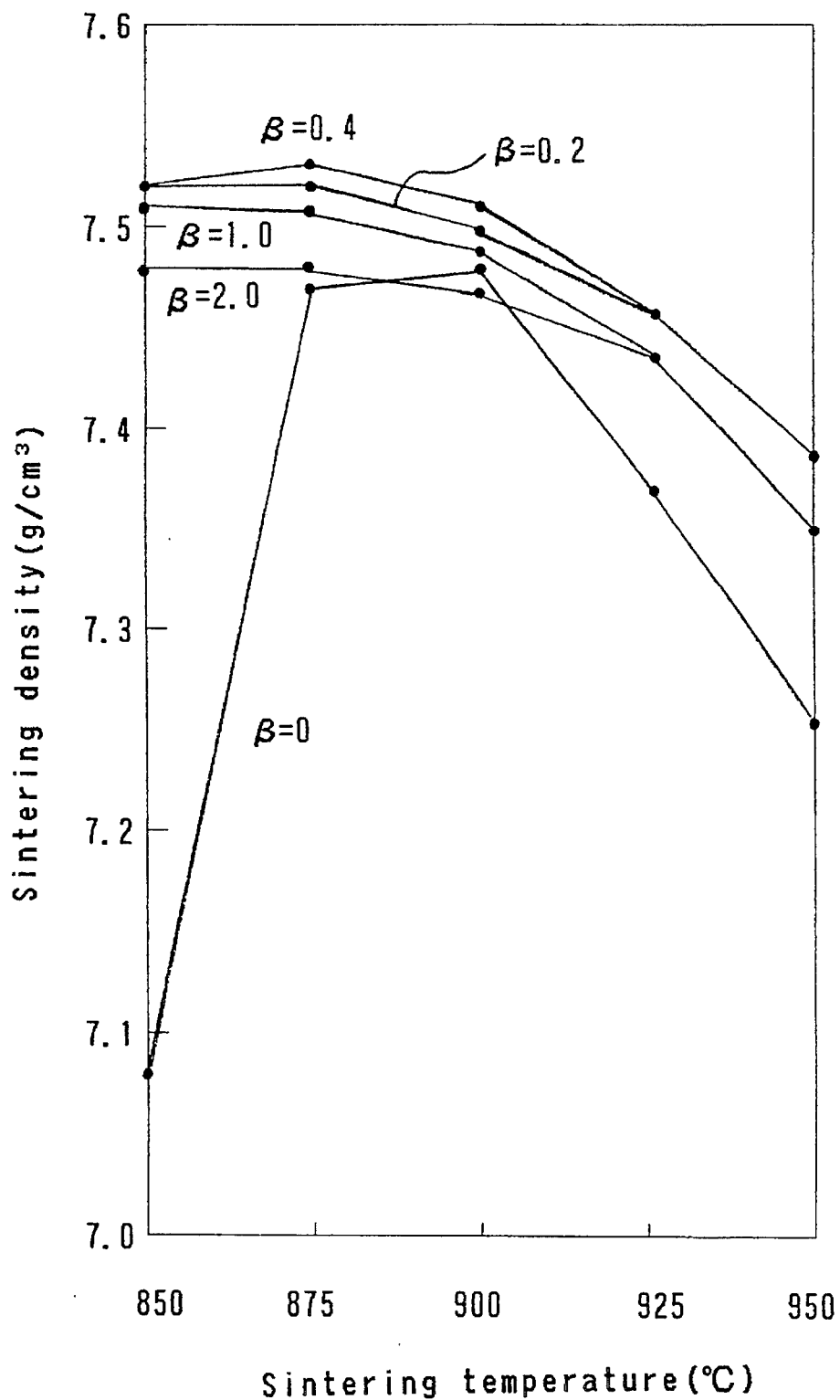
FIG. 18 is a graph showing a relation between the sintering temperature and the addition amount (β) of $MnO_2$, and the sintering density in (the main ingredient represented by $Bi(Nb_{0.8}Ta_{0.2})O_4$+0.4% by weight of $V_2O_5$).
Figure 19:
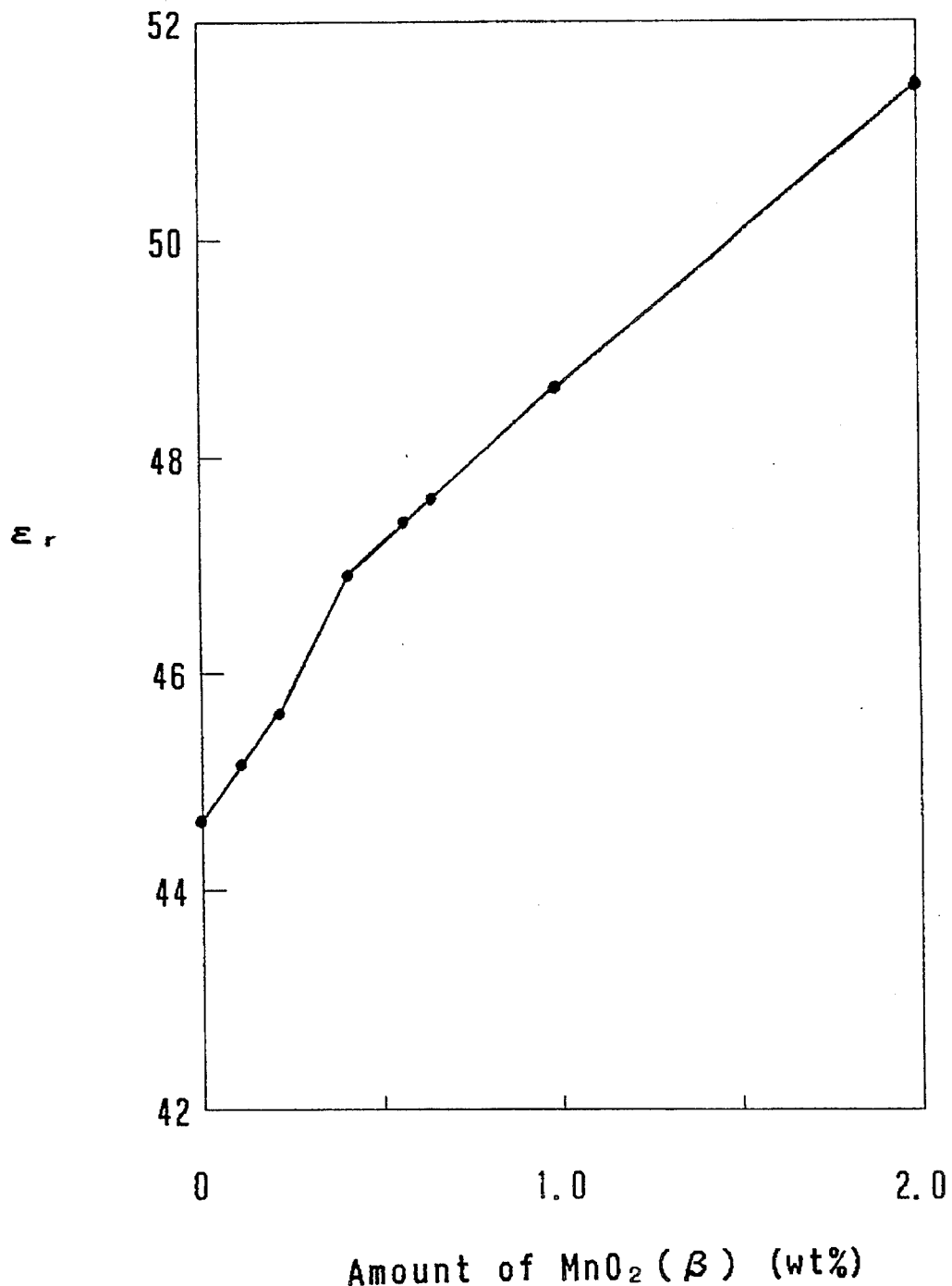
FIG. 19 is a graph showing a relation between the addition amount (β) of $MnO_2$ and εr in (the main ingredient represented by $Bi(Nb_{0.8}Ta_{0.2})O_4$+0.4% by weight of $V_2O_5$) and in case of 900° C. of sintering temperature.
Figure 20:
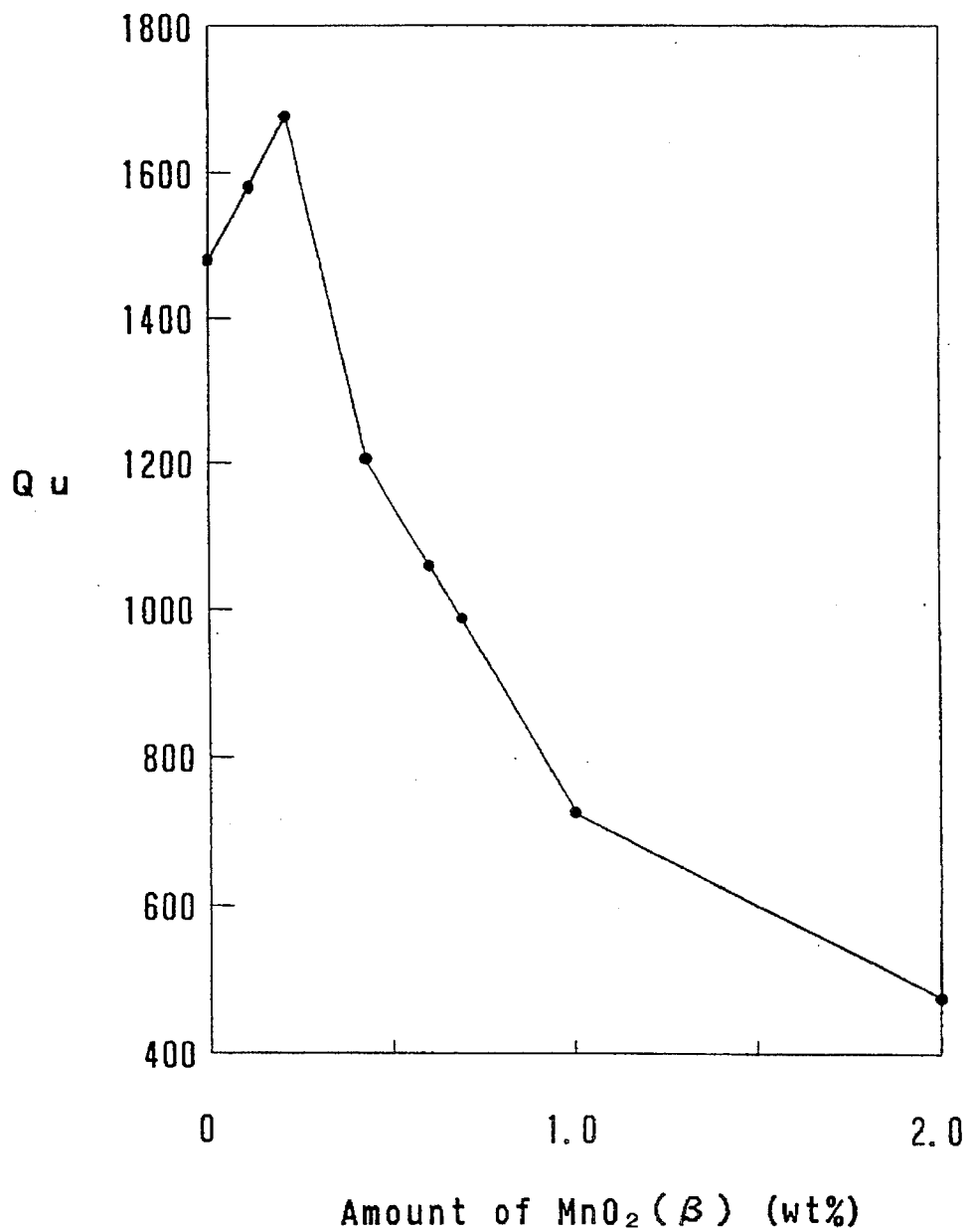
FIG. 20 is graph showing a relation between the addition amount (β) of $MnO_2$ and Qu in (the main ingredient represented by $Bi(Nb_{0.8}Ta_{0.2})O_4$+0.4% by weight of $V_2O_5$) and in case of 900° C. of sintering temperature.
Figure 21:
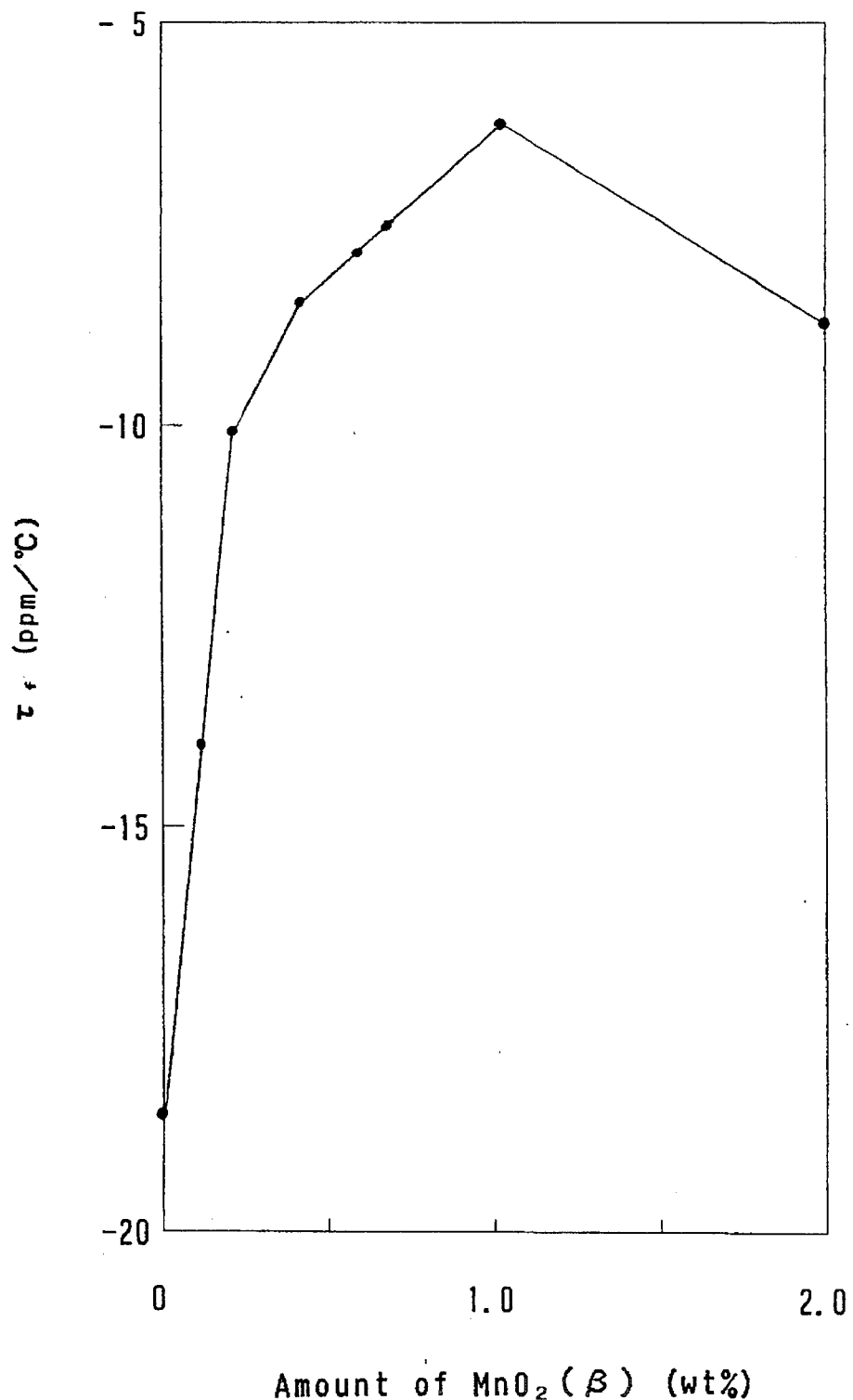
FIG. 21 is a graph showing a relation between the addition amount (β) of $MnO_2$ and τf in (the main ingredient represented by $Bi(Nb_{0.8}Ta_{0.2})O_4+0.4\%$ by weight of $V_2O_5$) and in case of 900° C. of sintering temperature.
Figure 22:
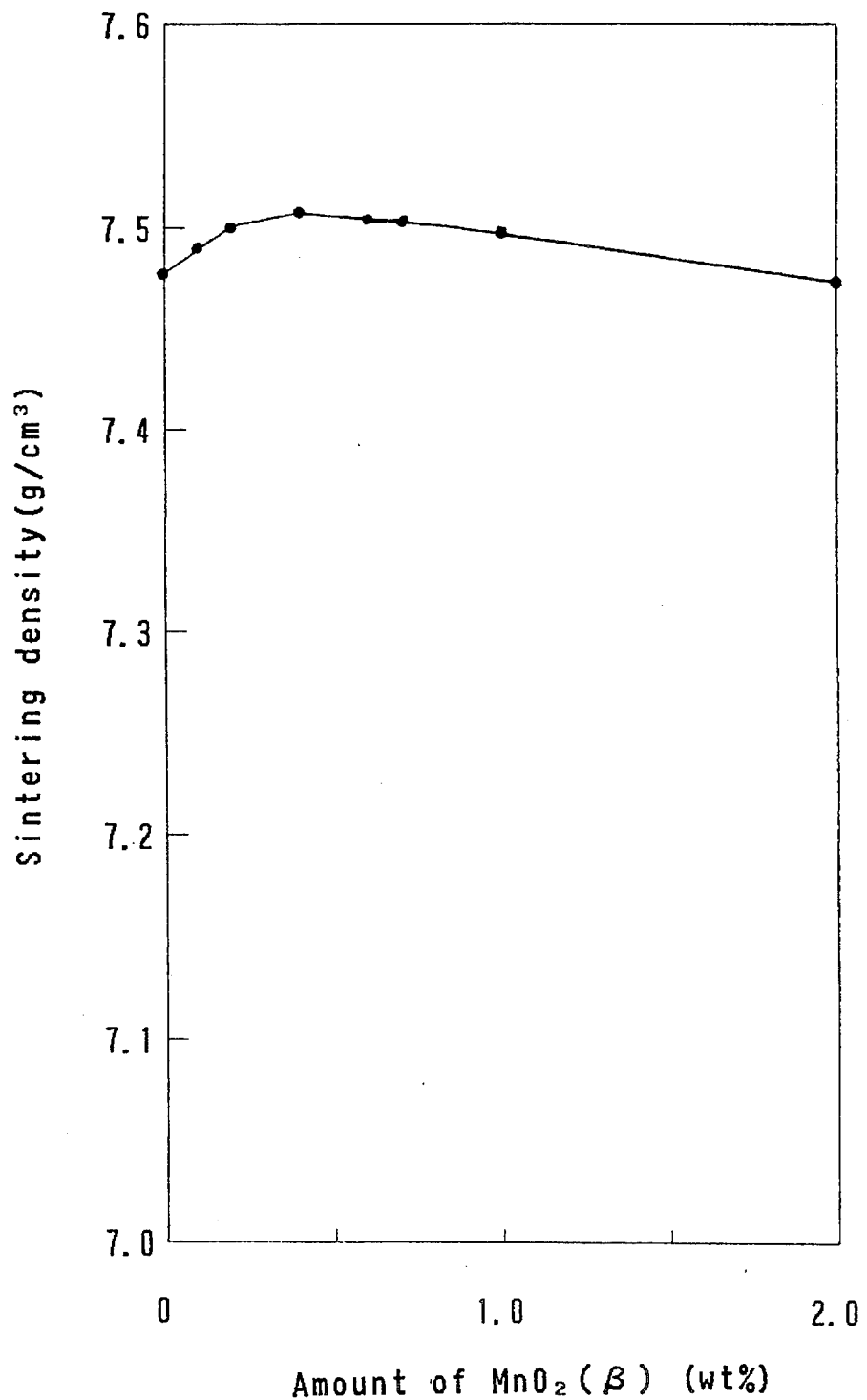
FIG. 22 is a graph showing a relation between the addition amount (β) of $MnO_2$ and the sintering density in (the main ingredient represented by $Bi(Nb_{0.8}Ta_{0.2})O_4+0.4\%$ by weight of $V_2O_5$) and in case of 900° C. of sintering temperature.
Figure 23:
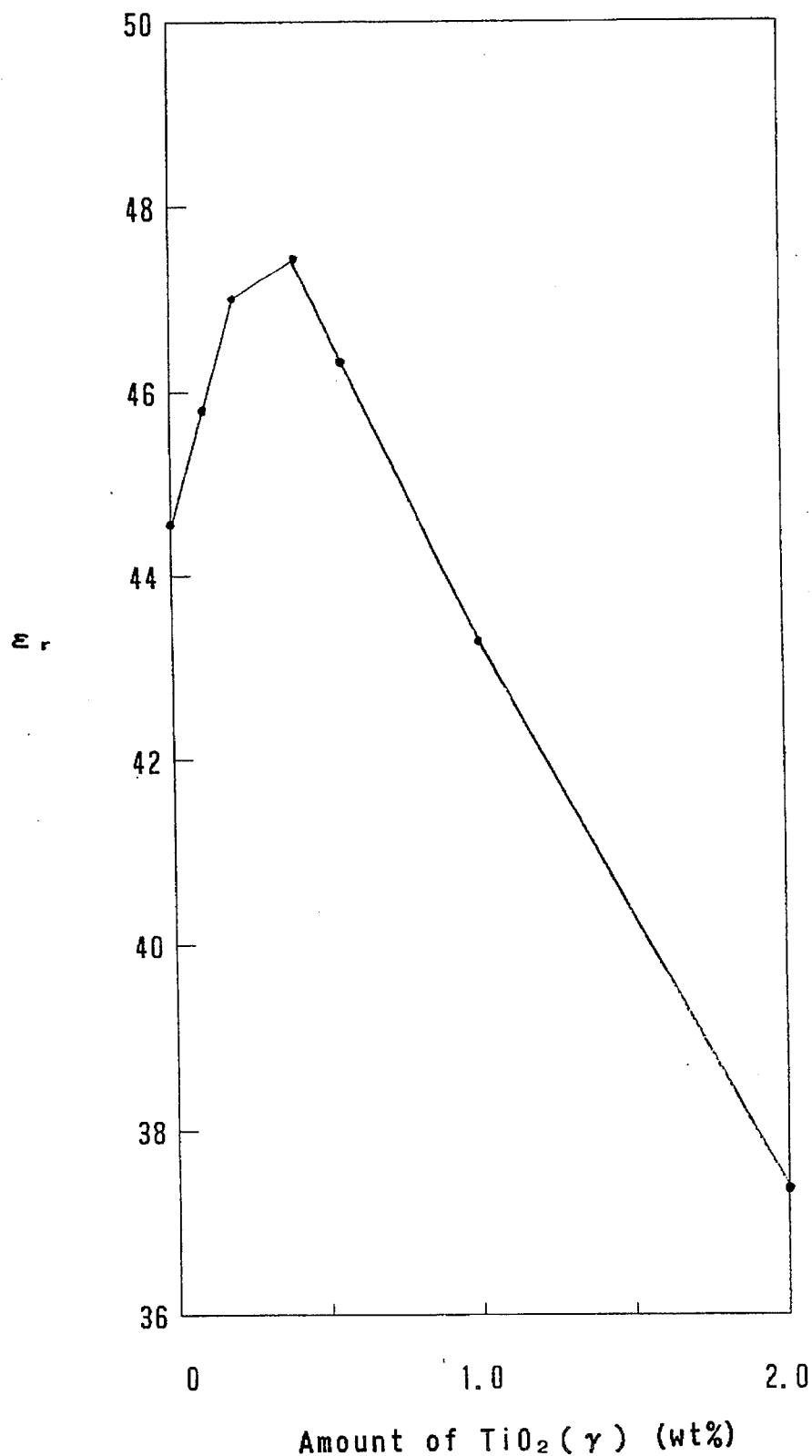
FIG. 23 is a graph showing a relation between the addition amount (γ) of $TiO_2$ and εr in (the main ingredient represented by $Bi(Nb_{0.8}Ta_{0.2})O_4+0.4\%$ by weight of $V_2O_5$) and in case of 900° C. of sintering temperature.
Figure 24:
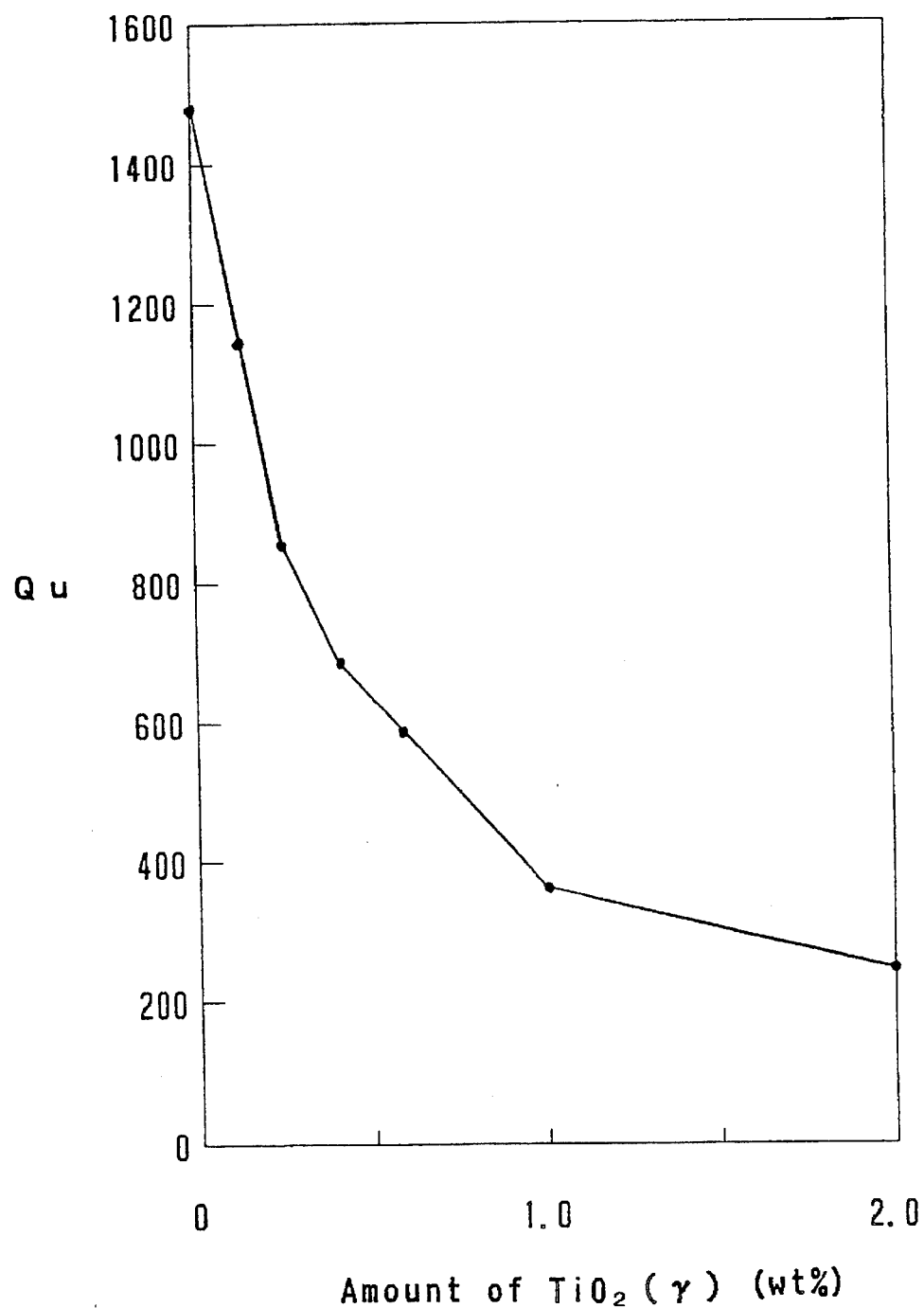
FIG. 24 is a graph showing a relation between the addition amount (γ) of $TiO_2$ and Qu in the ceramic composition and the sintering temperature in FIG. 23.

According to the results, τf is extremely poor in a case of not adding $MnO_2$ and it is improved greatly by the addition of $MnO_2$ by 0.2% by weight. However, although τf tends to the improve a slightly with further increase of the addition amount but shows no great change (in FIG. 17, a curve at β=0 is much different from others, and other curves show no so great difference. This can be seen clearly also in FIG. 21). Further, $\epsilon r$ is improved from about 45 to about 51 along with increase in the addition amount of $MnO_2$ irrespective of the sintering temperature (FIGS. 15 and 19). Further, although Qu tends to decrease along with increase in the addition amount of $MnO_2$ in a lower sintering temperature, it reaches a peak at the addition amount of 0.2% by weight as the sintering temperature goes higher and subsequently decreases along with increase the addition amount of $MnO_2$ (in FIG. 16, curves for β and β=0.2 intersect with each other between 875° C. and 900° C. and Qu at β=0.2 is higher in a high temperature region higher than 900° C. Further, such a trend is also shown in FIG. 20 for the sintering temperature at 900° C.).

From abovementioned results, it is preferred that x is from 0.2 to 0.9 (table 1 and 2), the addition amount of $V_2O_5$ is from 0.2 to 2.0 part by weight (table 4) and the addition amount of $MnO_2$ is from 0.1 to 0.6 wt % (table 4). In this case, $\epsilon r$ may be from 45 to 47, Qu may be from 970 to 1640 (at from 3.6 to 3.9 GHz) and τf may be from −14 to −5.5 ppm/°C.

On the other hand, the sintering density takes a particularly small value if $MnO_2$ is not added and the sintering temperature is as low as 850° C. In other cases where the sintering temperature is high, the sintering density is improve slightly by the addition amount of $MnO_2$ of 0.2% by weight at a higher sintering temperature and no remarkable changes is observed with addition amount of $MnO_2$. Further, the sintering density tends to lower as a whole, as the sintering temperature goes higher (this is shown clearly in FIGS. 18 and 22).

In this way, each of the characteristics changes variously along with the addition amount of $MnO_2$ and the sintering temperature, but each of the characteristics lies within a range of causing no practical problem so long as they are within a range of the present invention. It can be seen as a whole, that preferred dielectric ceramic compositions well balanced in each of the characteristics can be obtained, particularly, at a sintering temperature of 875° C. or 900° C. and with the addition amount of $MnO_2$ of 0.2 or 0.4 by weight.

Further, as can be seen from the results of Nos. 14 to 16, τf tends to increase toward the negative direction if x is as small as 0.2 in the present invention, but dielectric ceramic compositions having practically sufficient characteristics can be obtained in a wide range for x and the addition amount of $V_2O_5$.

Example 4

For the raw material in this example, $TiO_2$ powder (purity: 99.9%) was used instead of the PbO powder used in Example 2. Then, the starting materials were weighed and mixed in the same manner as in Example 2 so as to obtain a composition in which x in Bi(NbxTa1-x)O4 ranges from 0 to 1.0, the addition amount of $V_2O_5$ (α% by weight) ranges from 0 to 3.0 and the addition amount of $TiO_2$ (τ% by weight) ranges from 0 to 2.0.

Further, dielectric specimens of identical shape were prepared in same manner as Example 2 (Nos. 1 to 23 in Table 5) and performance evaluation ($\epsilon r$, Qu, τf and sintering density) was carried out. The resonance frequency upon measurement was as shown in Table 5 ($f_0$). The results are shown together in Table 5 and also shown in the graphs of FIGS. 23 to 38.

TABLE 5

| No. | Sinter. temp. (°C.) | x | $V_2O_5$ (α) (wt %) | $TiO_2$ (γ) (wt %) | $f_o$ (GHz) | $\epsilon_r$ | Qu | $\tau_f$ (ppm/°C.) | Sint. density (g/cm³) |
|---|---|---|---|---|---|---|---|---|---|
| 1 | 900 | 0.8 | 0.4 | 0 | 3.92 | 44.60 | 1485 | −18.47 | 7.48 |
| 2 | 900 | 0.8 | 0.4 | 0.1 | 3.40 | 45.92 | 1155 | −15.81 | 7.49 |
| 3 | 900 | 0.8 | 0.4 | 0.2 | 3.45 | 47.06 | 865 | −12.24 | 7.51 |
| 4 | 900 | 0.8 | 0.4 | 0.4 | 3.38 | 47.48 | 678 | −8.96 | 7.43 |
| 5 | 900 | 0.8 | 0.4 | 0.6 | 3.47 | 46.33 | 598 | −2.38 | 7.23 |
| 6 | 900 | 0.8 | 0.4 | 1.0 | 3.52 | 43.37 | 371 | 10.61 | 6.89 |
| 7 | 900 | 0.8 | 0.4 | 2.0 | 3.54 | 37.39 | 251 | 53.78 | 6.89 |
| 8 | 850 | 0.8 | 0.4 | 0.2 | Sintering is insufficient. | | | | |
| 9 | 875 | 0.8 | 0.4 | 0.2 | 3.89 | 45.43 | 909 | −12.27 | 7.36 |
| 10 | 925 | 0.8 | 0.4 | 0.2 | 3.40 | 47.16 | 838 | −10.81 | 7.52 |
| 11 | 950 | 0.8 | 0.4 | 0.2 | 3.53 | 47.70 | 785 | −11.76 | 7.52 |

TABLE 5-continued

| No. | Sinter. temp. (°C.) | x | V$_2$O$_5$ (α) (wt %) | TiO$_2$ (γ) (wt %) | f$_o$ (GHz) | ε$_r$ | Qu | τ$_f$ (ppm/°C.) | Sint. density (g/cm$^3$) |
|---|---|---|---|---|---|---|---|---|---|
| 12 | 900 | 0.8 | 0 | 0.2 | Sintering is insufficient. | | | | |
| 13 | 900 | 0.8 | 0.2 | 0.2 | 3.47 | 46.73 | 839 | −13.55 | 7.50 |
| 14 | 900 | 0.8 | 1.0 | 0.2 | 3.35 | 47.62 | 613 | −5.51 | 7.55 |
| 15 | 900 | 0.8 | 2.0 | 0.2 | 3.48 | 48.18 | 318 | −13.94 | 7.53 |
| 16 | 900 | 0.8 | 3.0 | 0.2 | 3.60 | 49.01 | 185 | −21.63 | 7.54 |
| 17 | 900 | 0 | 0.4 | 0.2 | 3.59 | 42.03 | 553 | −52.13 | 8.08 |
| 18 | 900 | 0.2 | 0.4 | 0.2 | 3.53 | 44.54 | 512 | −55.21 | 8.11 |
| 19 | 900 | 0.4 | 0.4 | 0.2 | 3.48 | 46.44 | 631 | −48.03 | 8.05 |
| 20 | 900 | 0.6 | 0.4 | 0.2 | 3.41 | 47.21 | 725 | −30.12 | 7.90 |
| 21 | 900 | 0.7 | 0.4 | 0.2 | 3.43 | 47.13 | 795 | −21.18 | 7.70 |
| 22 | 900 | 0.96 | 0.4 | 0.2 | 3.45 | 46.11 | 1010 | −0.11 | 7.15 |
| 23 | 900 | 1.0 | 0.4 | 0.2 | 3.23 | 45.86 | 1050 | 2.01 | 7.05 |

Figure 25:
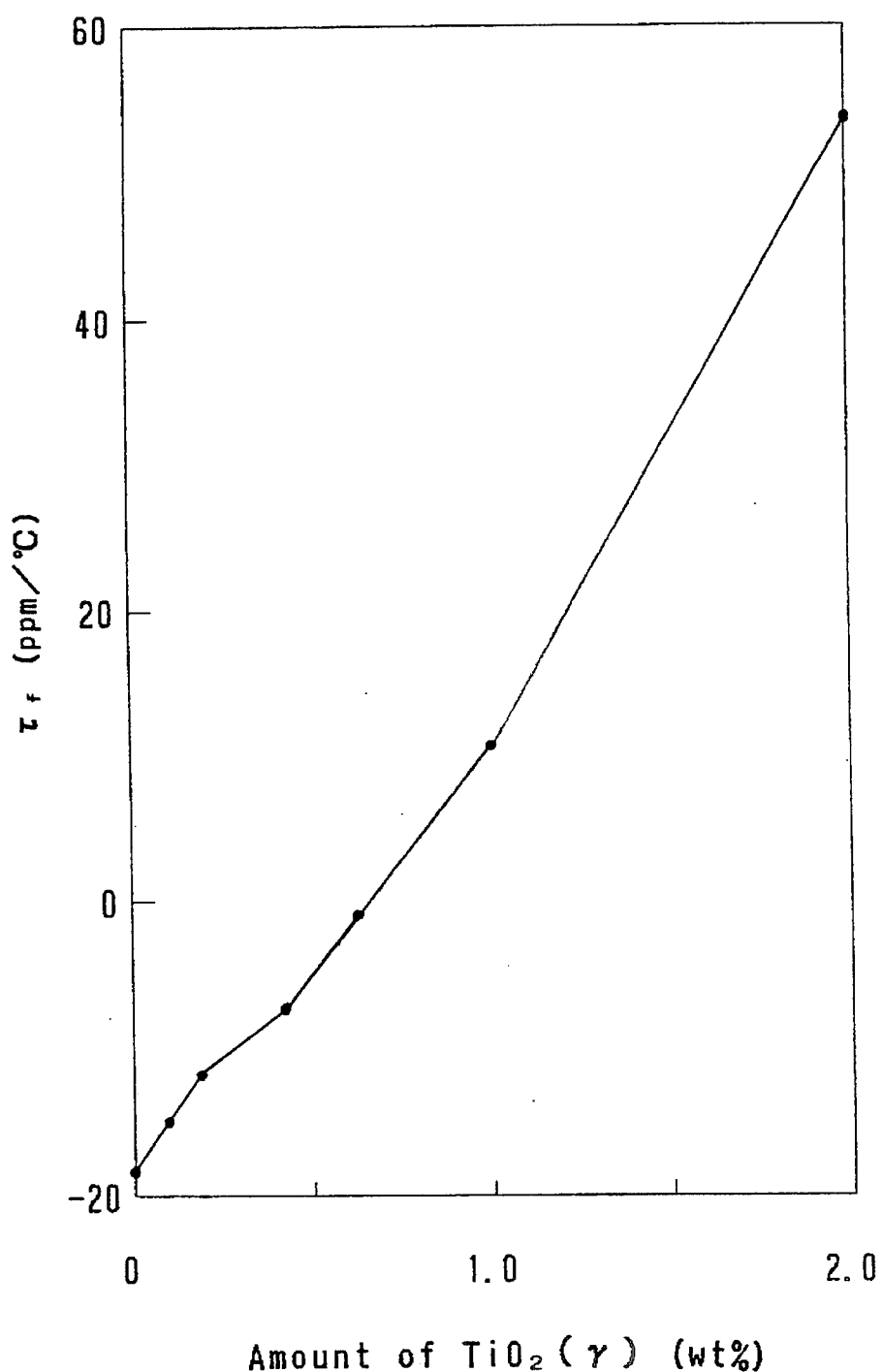
FIG. 25 is a graph showing a relation between the addition amount (γ) of $TiO_2$ and τf in the ceramic composition and the sintering temperature in FIG. 23.
Figure 26:
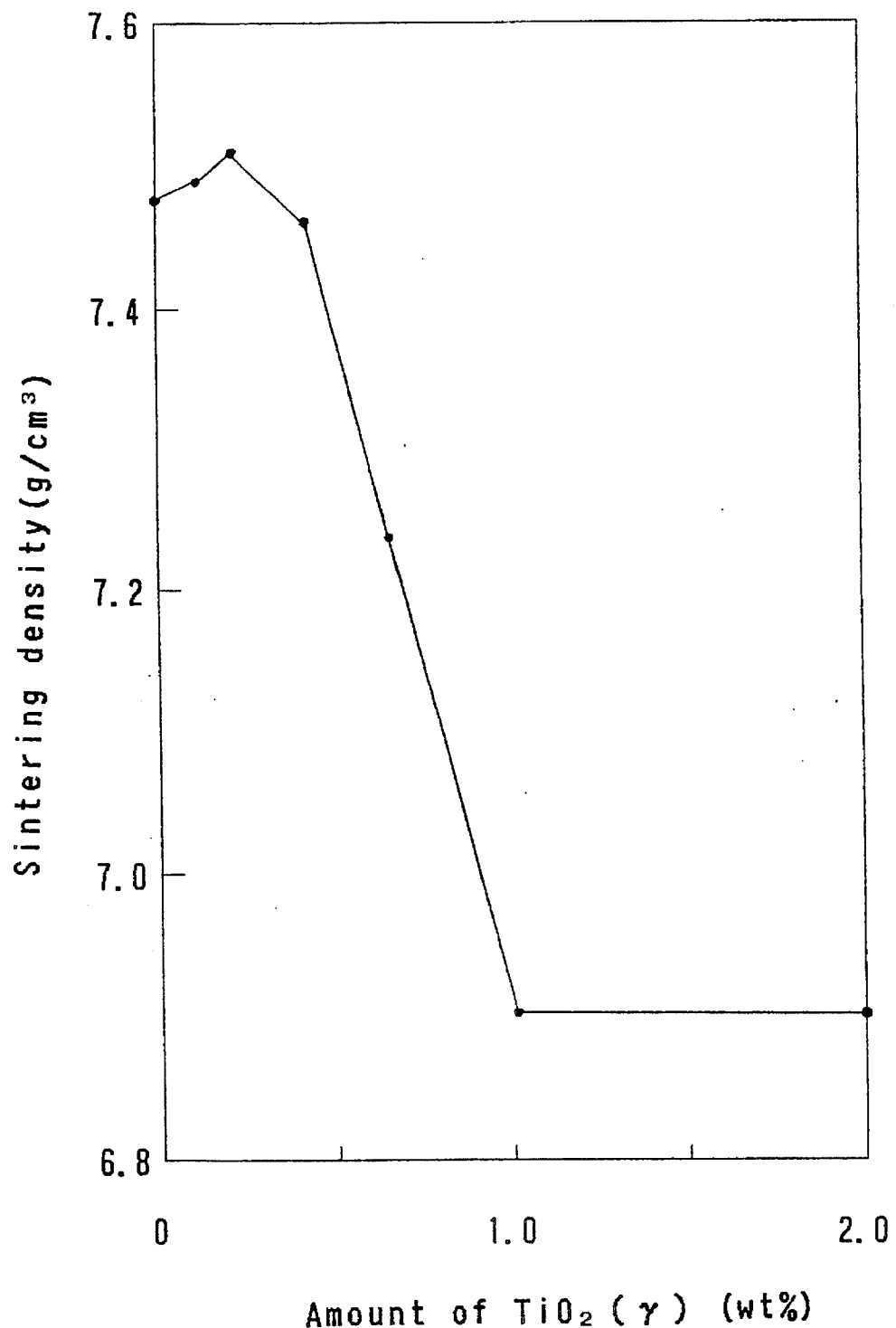
FIG. 26 is a graph showing a relation between the addition amount (γ) of $TiO_2$ and the sintering density in the ceramic composition and the sintering temperature in FIG. 23.
Figure 27:
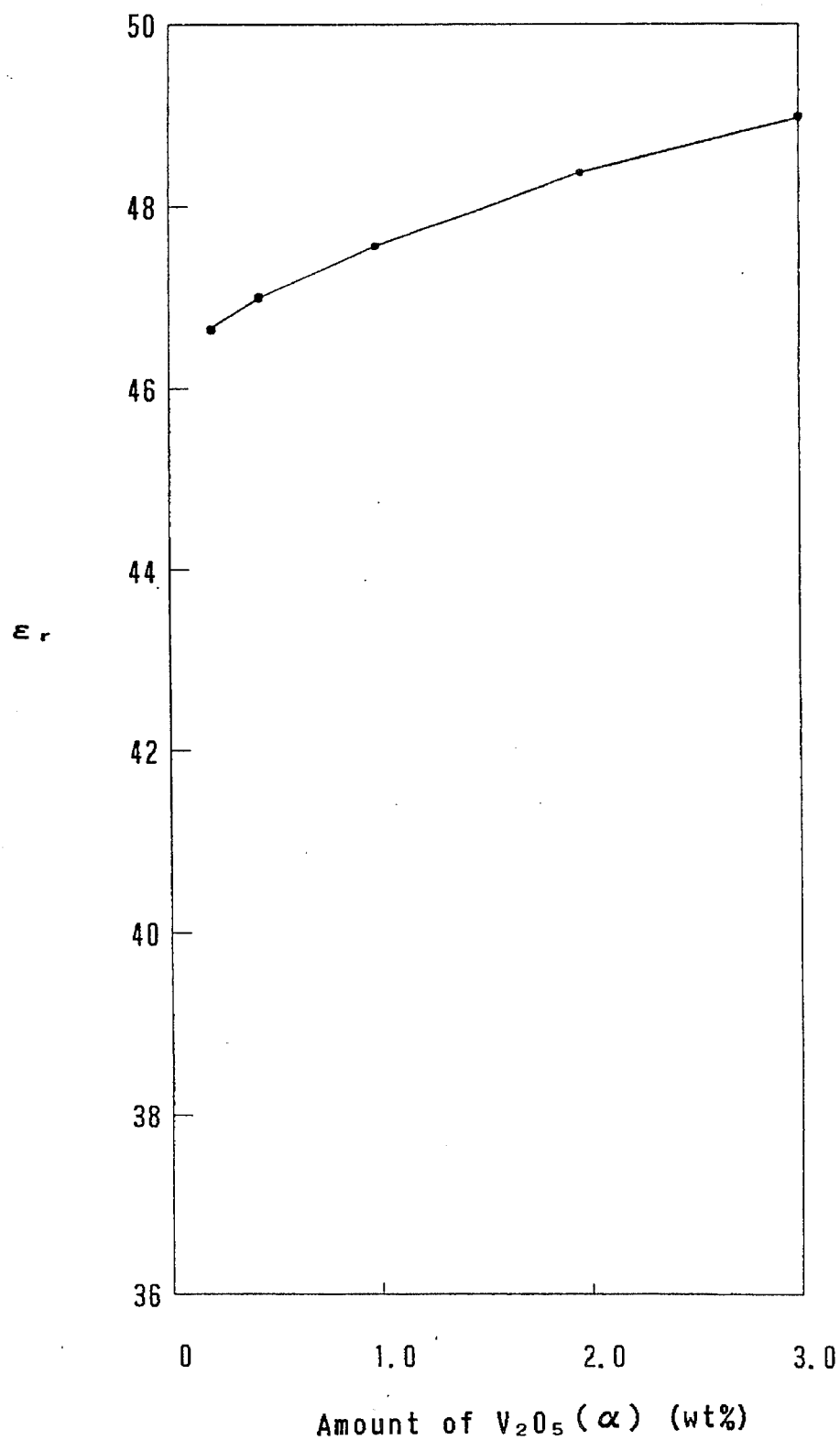
FIG. 27 is a graph showing a relation between the addition amount (α) of $V_2O_5$ and εr in (the main ingredient represented by $Bi(Nb_{0.8}Ta_{0.2})O_4+0.2\%$ by weight of $TiO_2$) and in case of 900° C. of sintering temperature.
Figure 28:
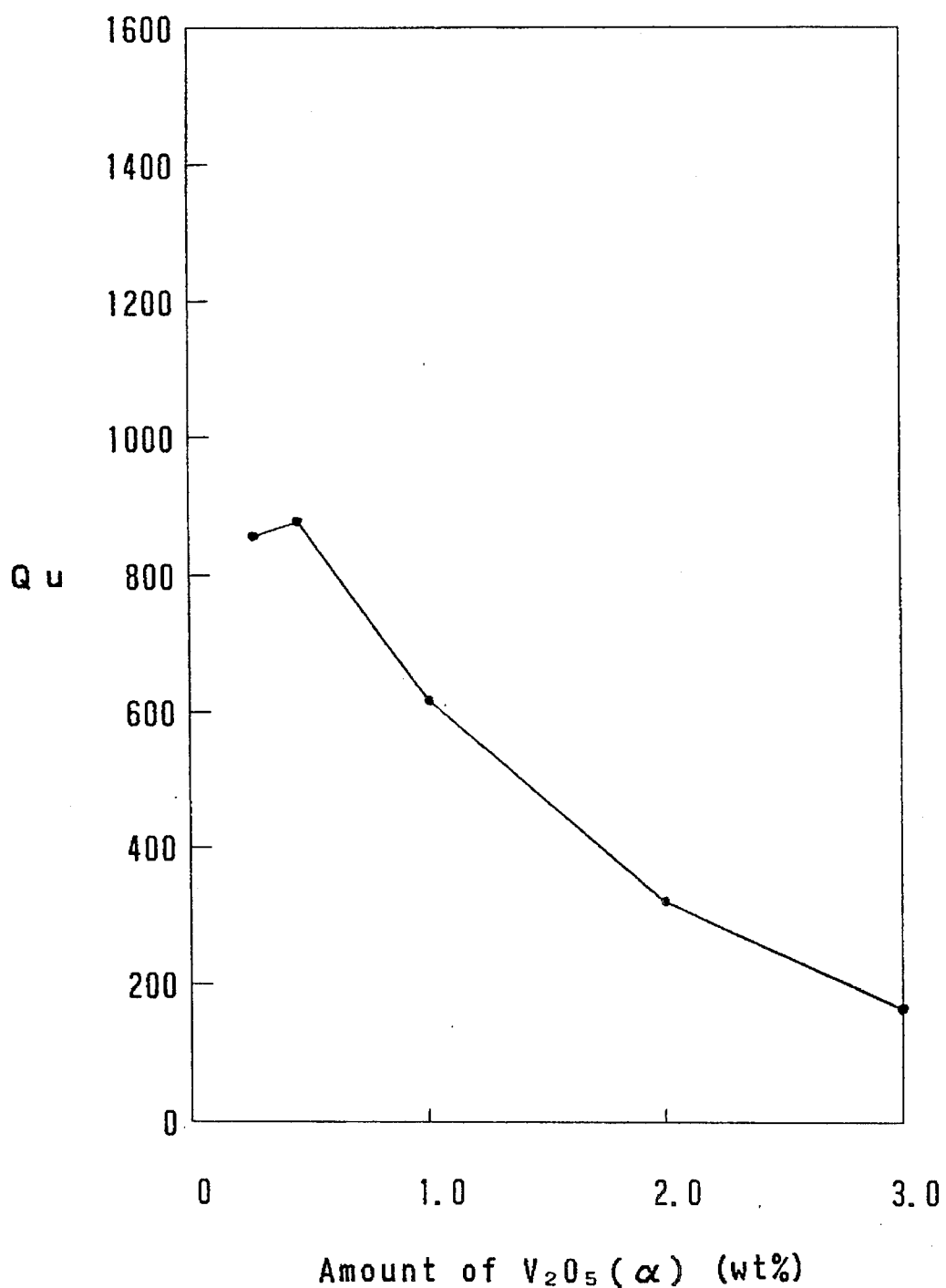
FIG. 28 is a graph showing a relation between the addition amount (α) of $V_2O_5$ and Qu in the ceramic composition and the sintering temperature in FIG. 27.
Figure 29:
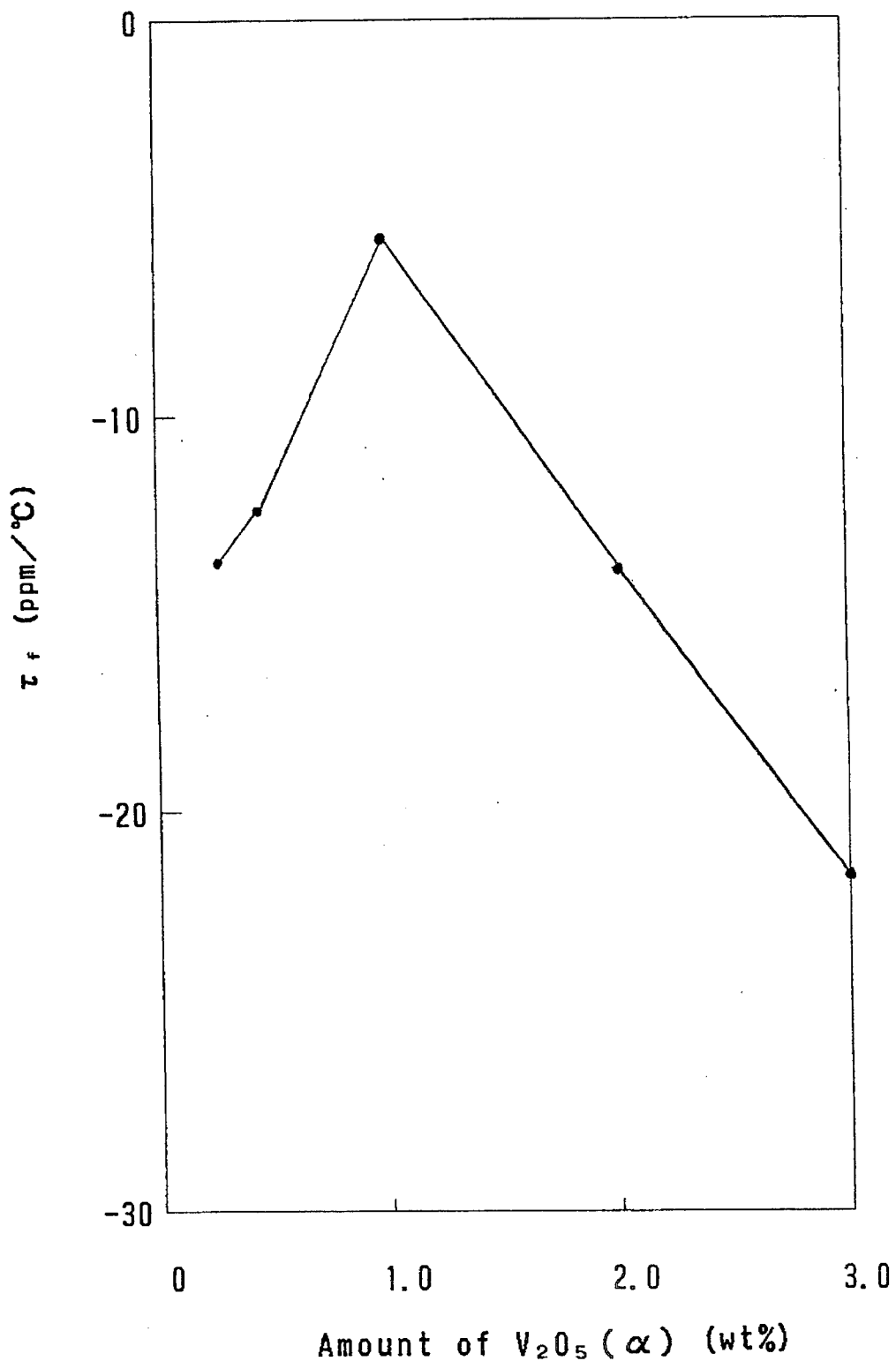
FIG. 29 is a graph showing a relation between the addition amount (α) of $V_2O_5$ and τf in the ceramic composition and the sintering temperature in FIG. 27.
Figure 30:
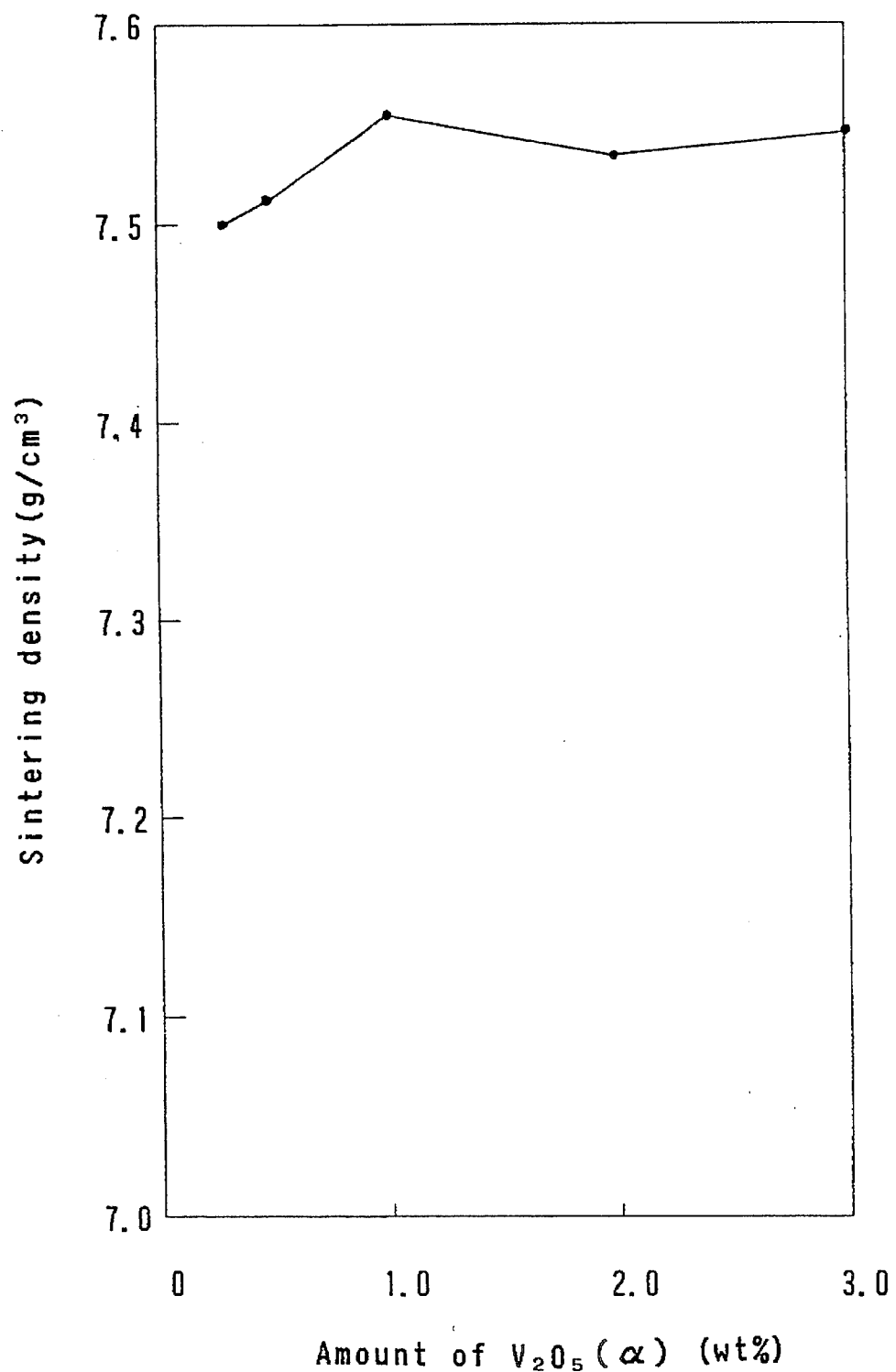
FIG. 30 is a graph showing a relation between the addition amount (α) of $V_2O_5$ and the sintering density in the ceramic composition and the sintering temperature in FIG. 27.
Figure 31:
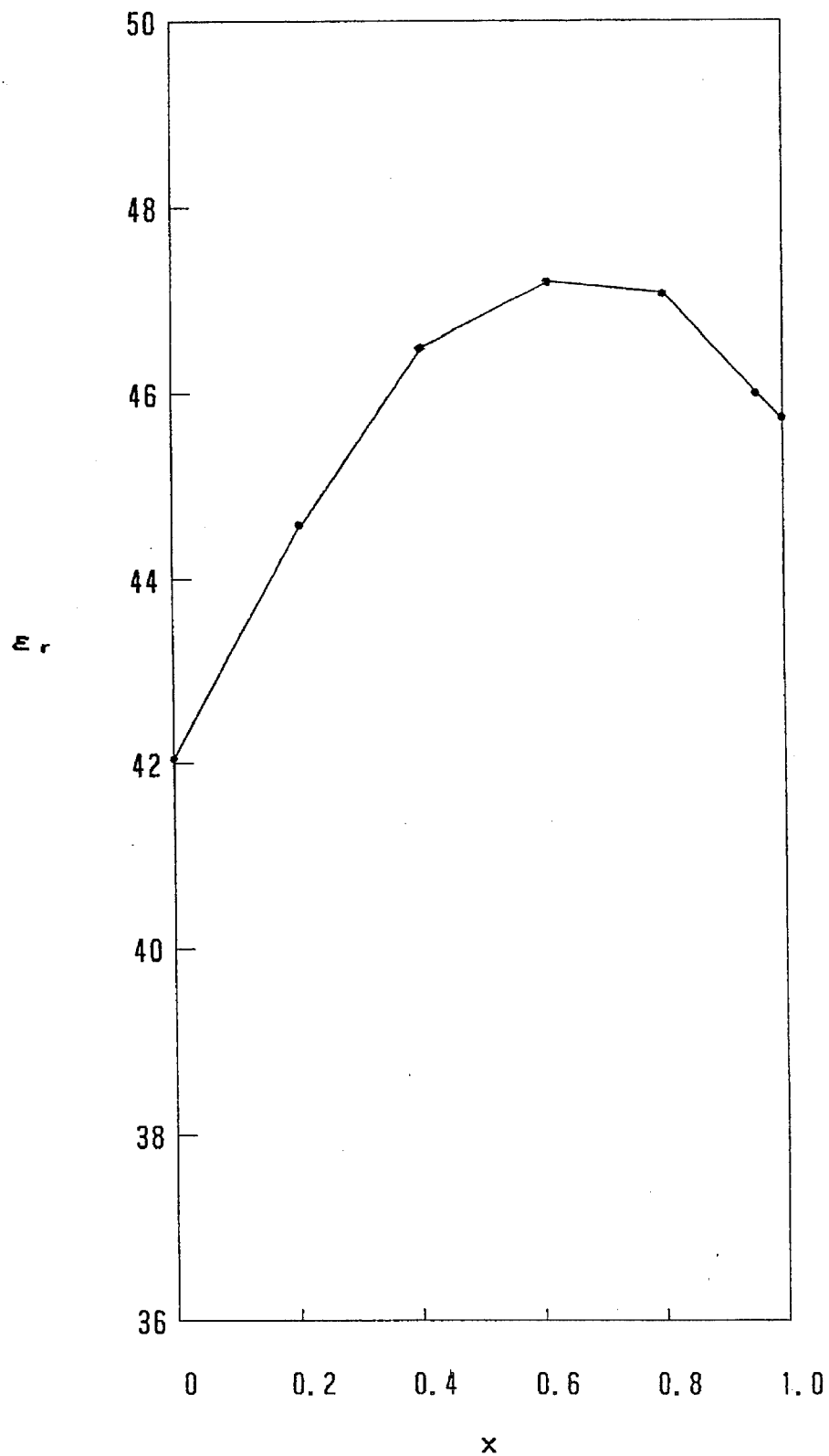
FIG. 31 is a graph showing a relation between x and εr in (the main ingredient represented by $Bi(Nb_x Ta_{1-x})O_4+0.4\%$ by weight of $V_2O_5+0.2\%$ by weight of $TiO_2$) and in case of 900° C. of sintering temperature.
Figure 32:
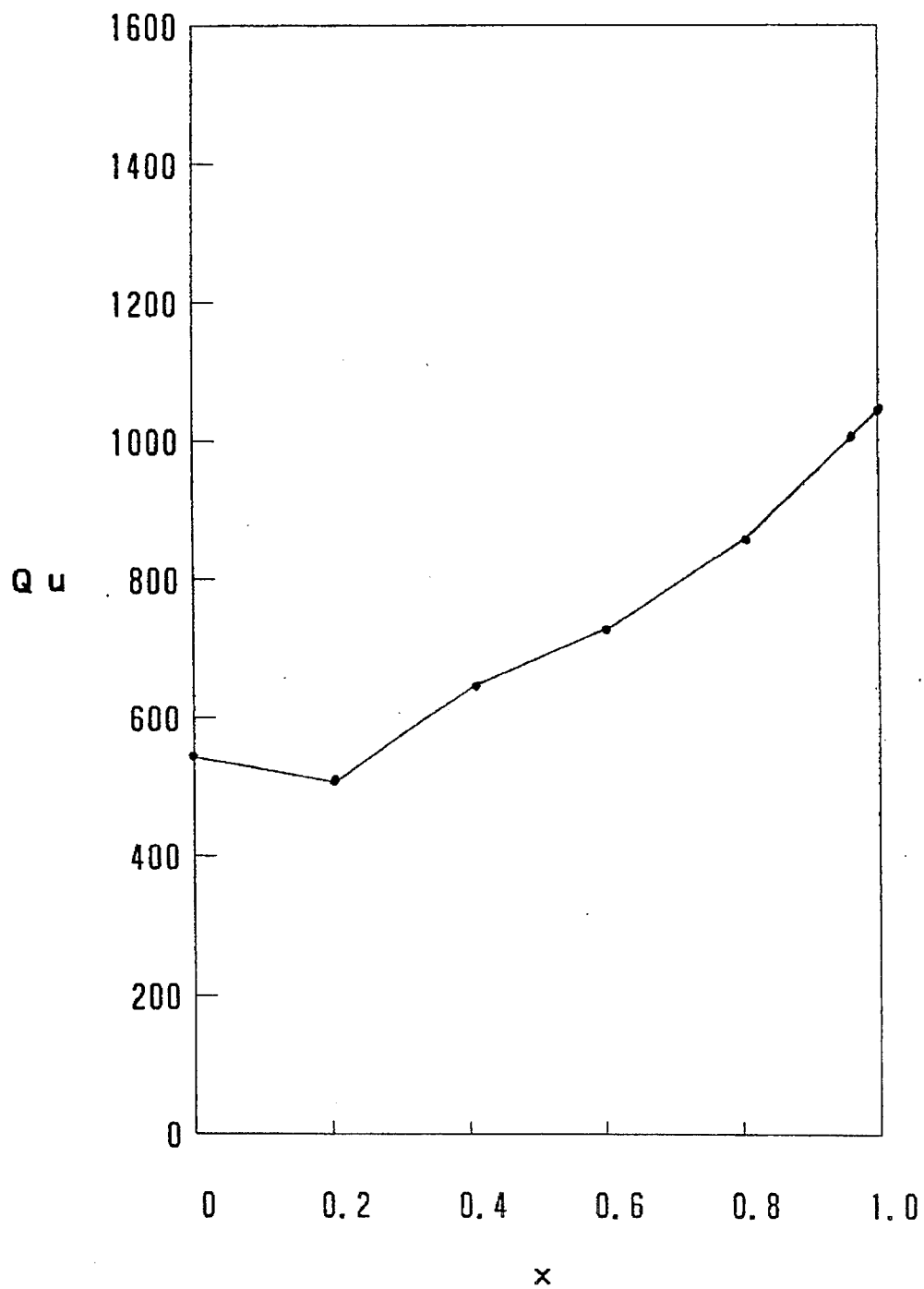
FIG. 32 is a graph showing a relation between x and Qu in the ceramic composition and the sintering temperature in FIG. 31.
Figure 33:
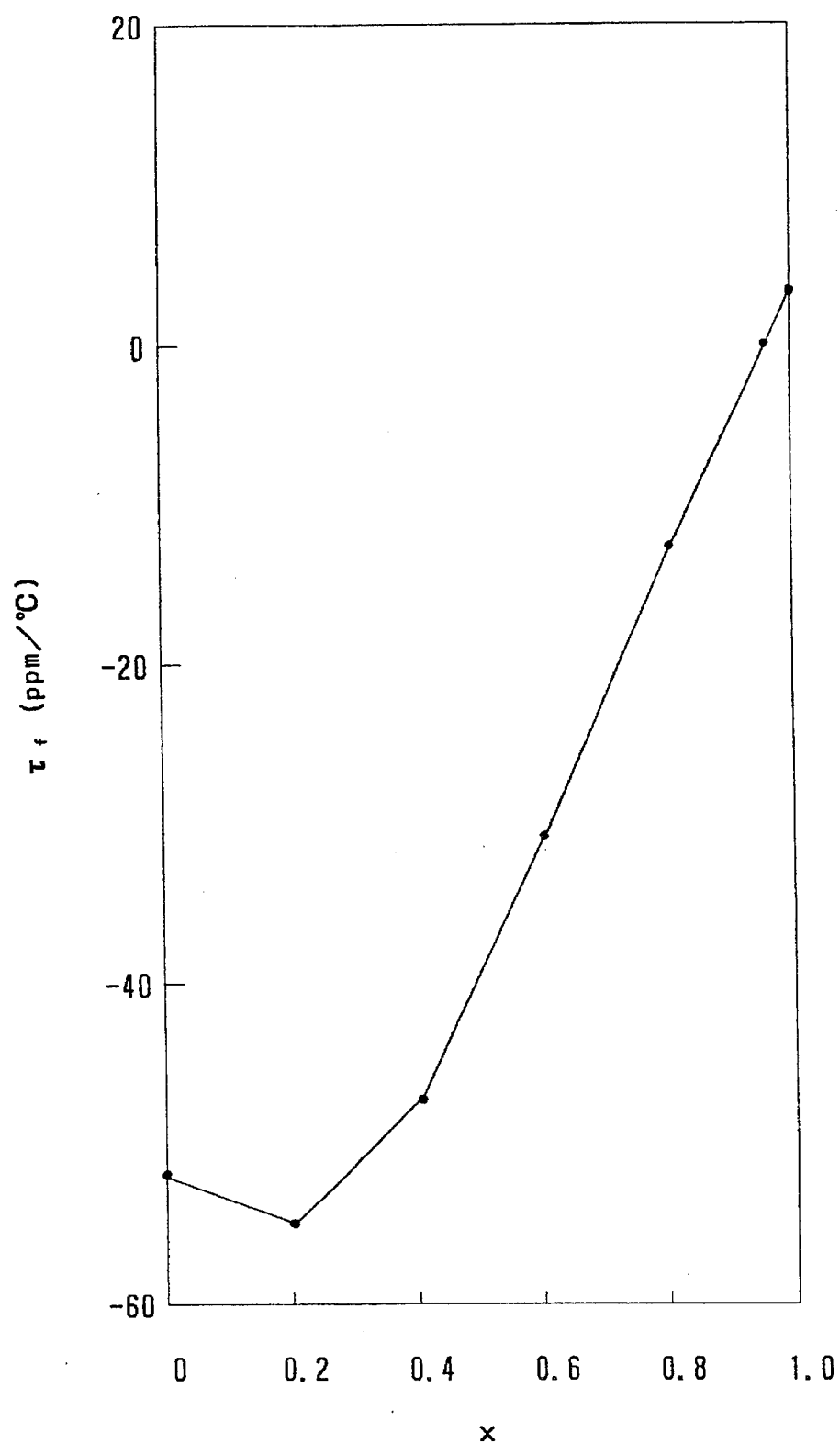
FIG. 33 is a graph showing a relation between x and τf in the ceramic composition and the sintering-temperature in FIG. 31.

The results show that τf improves greatly along with the addition amount of TiO$_2$ and τf can be controlled easily (FIG. 25). However, since εr and Qu decrease along with addition of TiO$_2$ (FIGS. 23 and 24), addition of a great amount of TiO$_2$ is not preferred.

Further, if V$_2$O$_5$ is not added (No. 12), the sintering is insufficient and measurement for each of the characteristics is impossible. Then, since εr increases (FIG. 27) and τf decreases (FIG. 29) by the addition, τf can be controlled. However, since Qu decreases by the addition (FIG. 28), addition of a great amount of V$_2$O$_5$ is not preferred.

Figure 34:
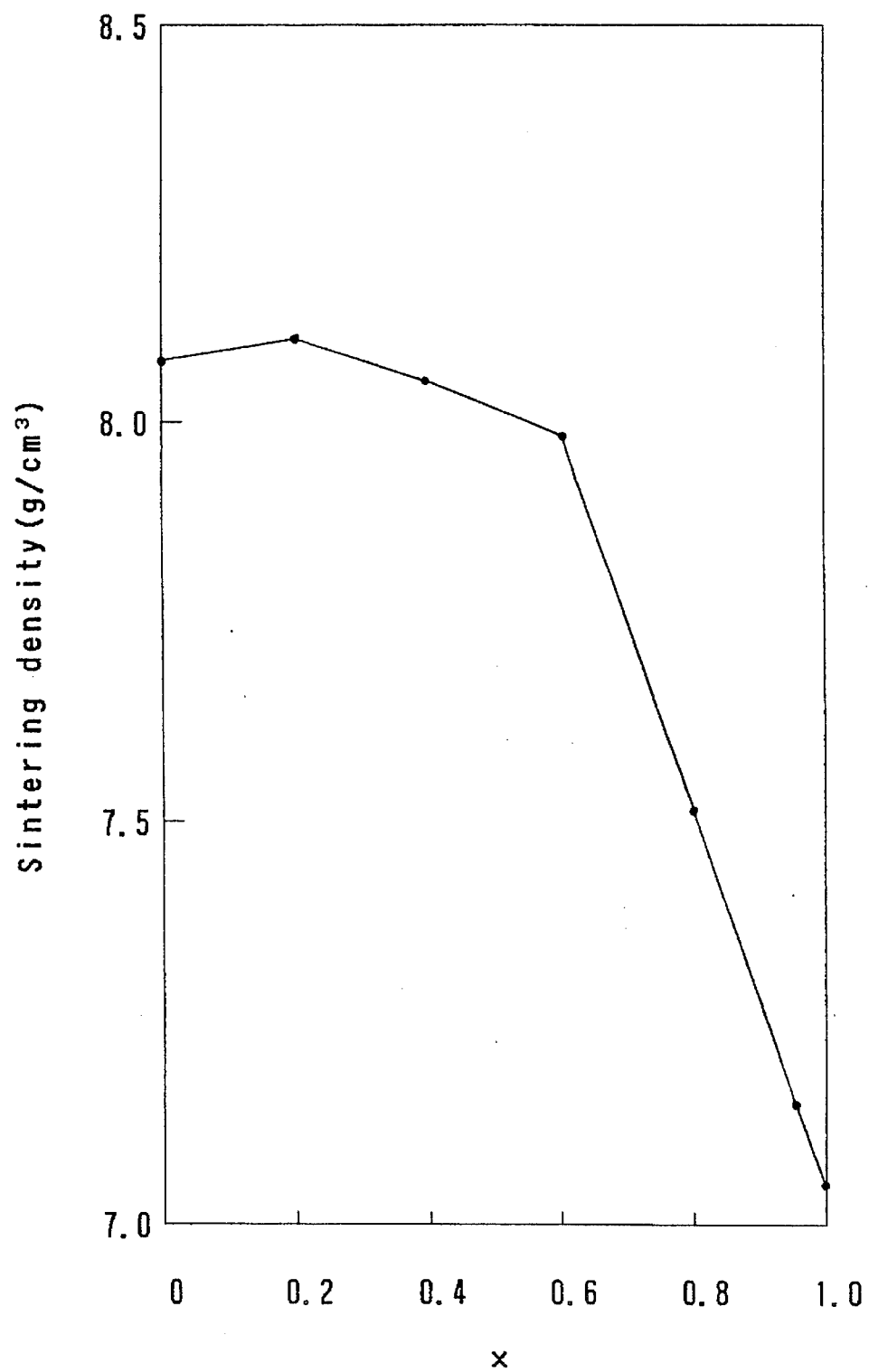
FIG. 34 is a graph showing a relation between x and the sintering density in the ceramic composition and the sintering temperature in FIG. 31.

Further, since τf increases along with increase for the value x in Bi(Nb$_x$Ta$_{1-x}$)O$_4$ (FIG. 33), τf can be controlled by the change of the value x. Further, since εr and Qu also increase along with this increase (FIGS. 31 and 32), although it is preferred in view of this physical property, the sintering density is lowered (FIG. 34). 7.0 kg/m$^3$ of sintering density can be ensured even if x is 1.0 (FIG. 34).

Figure 35:
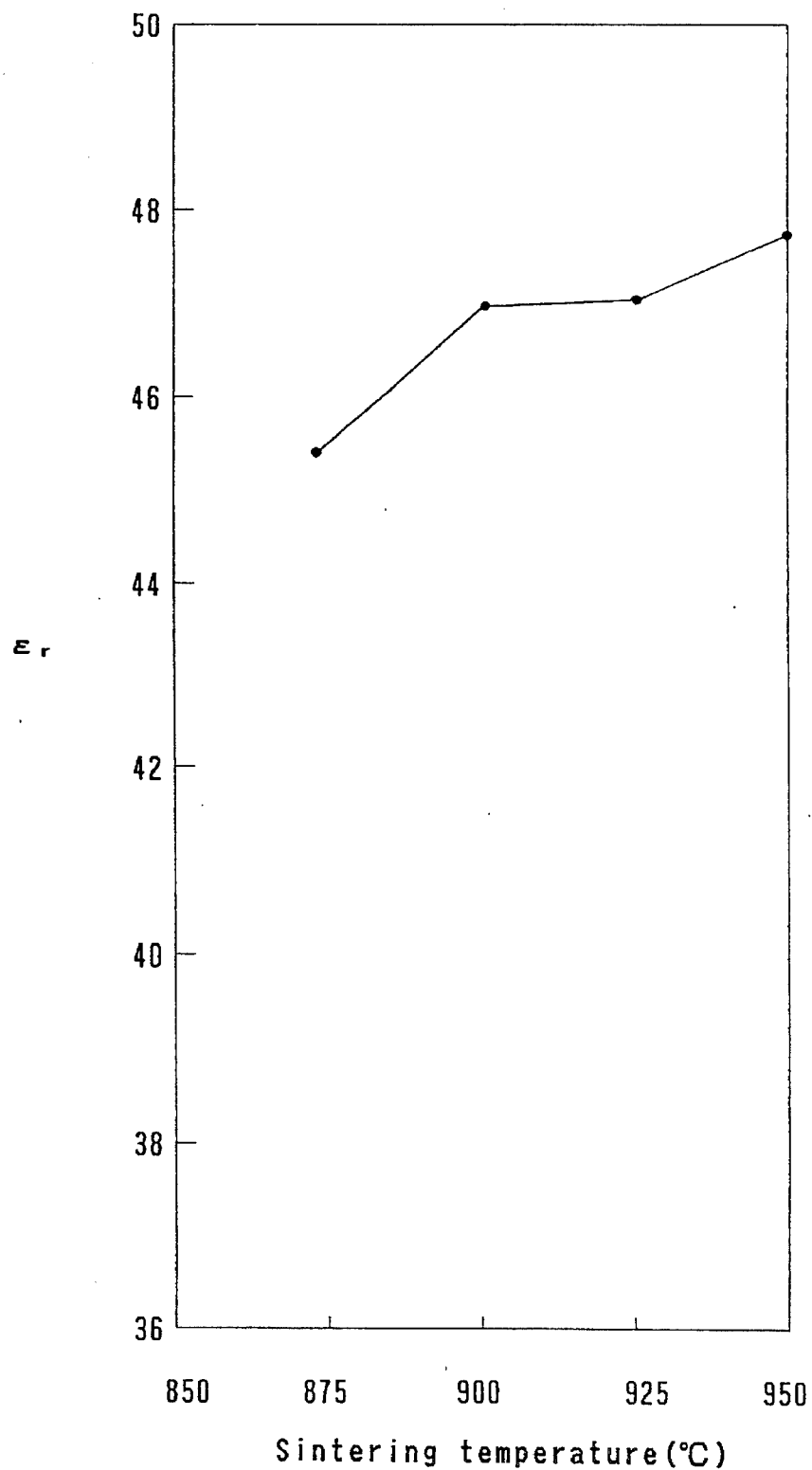
FIG. 35 is a graph showing a relation between the sintering temperature and εr in (the main ingredient represented by $Bi(Nb_{0.8}Ta_{0.2})O_4+0.4\%$ by weight of $V_2O_5+0.2\%$ by weight of $TiO_2$).
Figure 36:
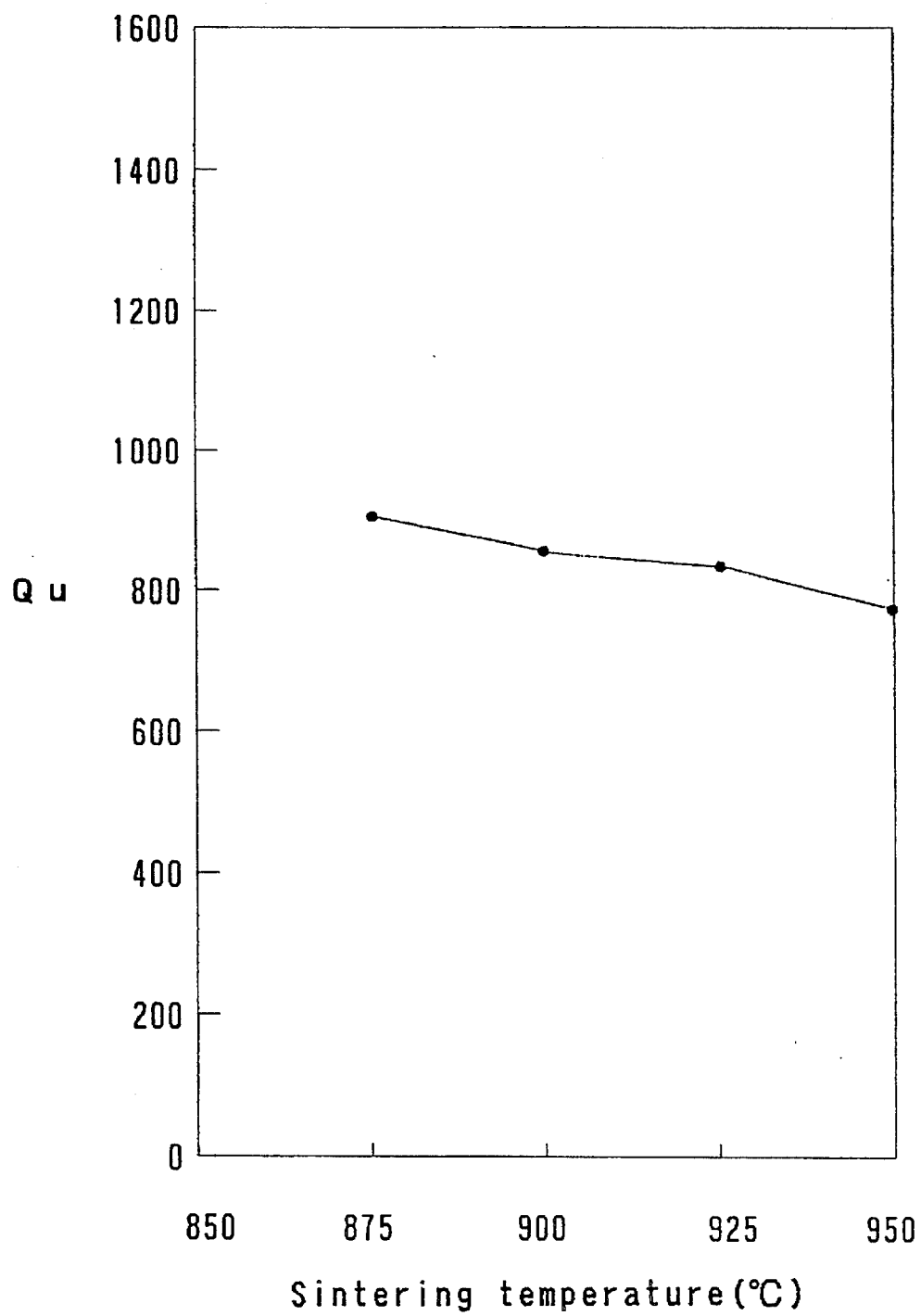
FIG. 36 is a graph showing a relation between the sintering temperature and Qu in the ceramic composition in FIG. 35.
Figure 37:
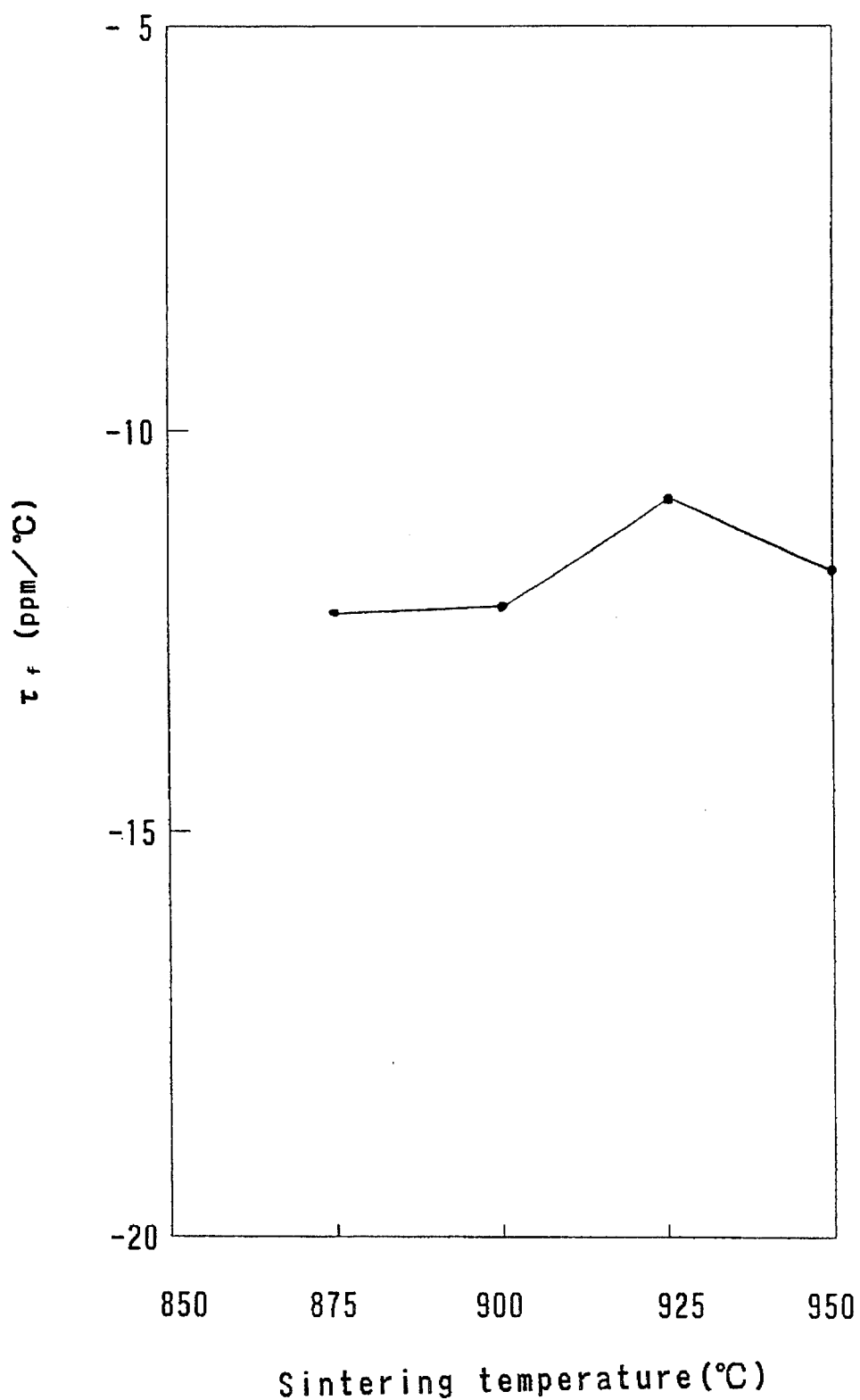
FIG. 37 is a graph showing a relation between the sintering temperature and τf in the ceramic composition in FIG. 35.
Figure 38:
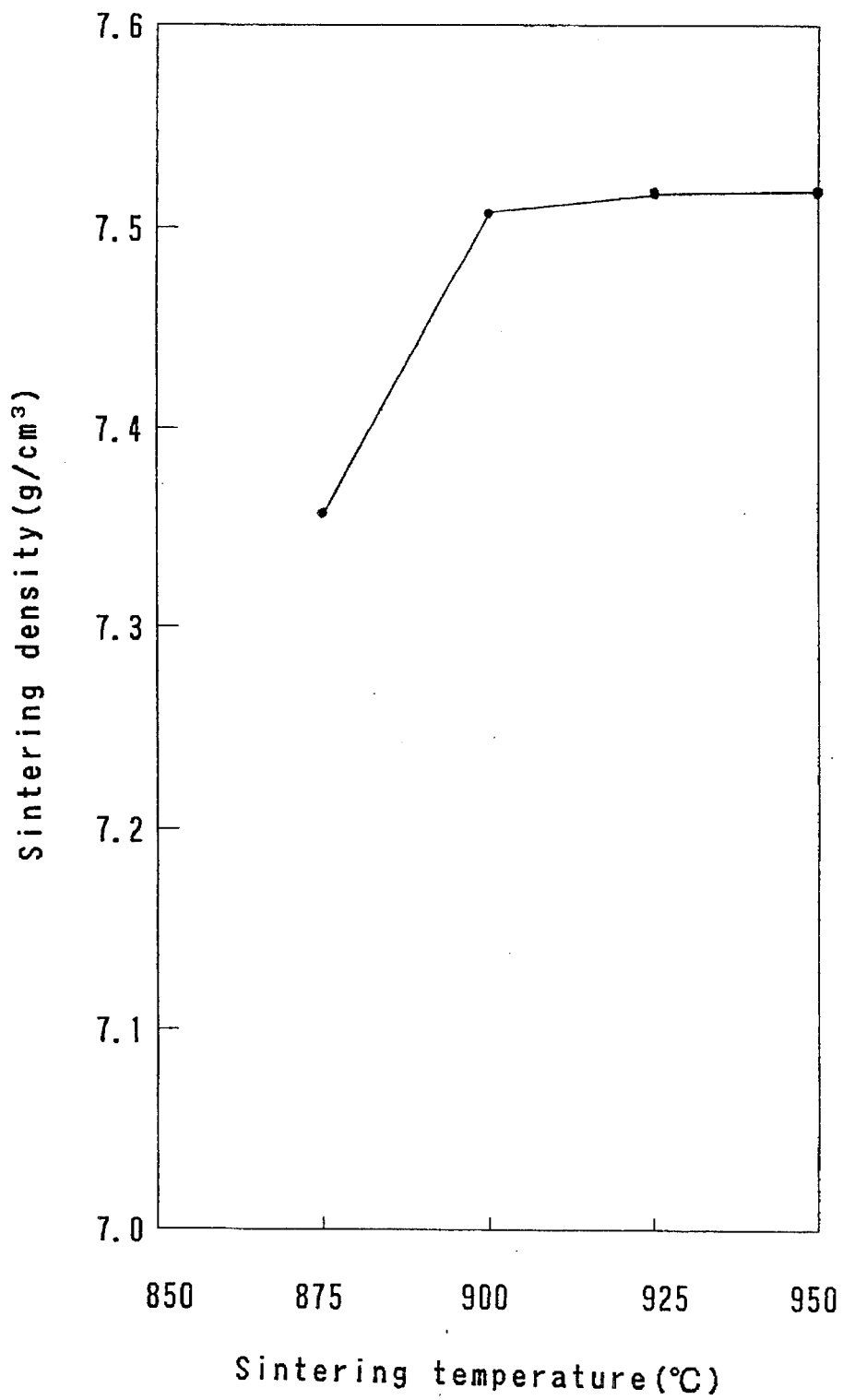
FIG. 38 is a graph showing a relation between the sintering temperature and the sintering density in the ceramic composition in FIG. 35.
Figure 39:
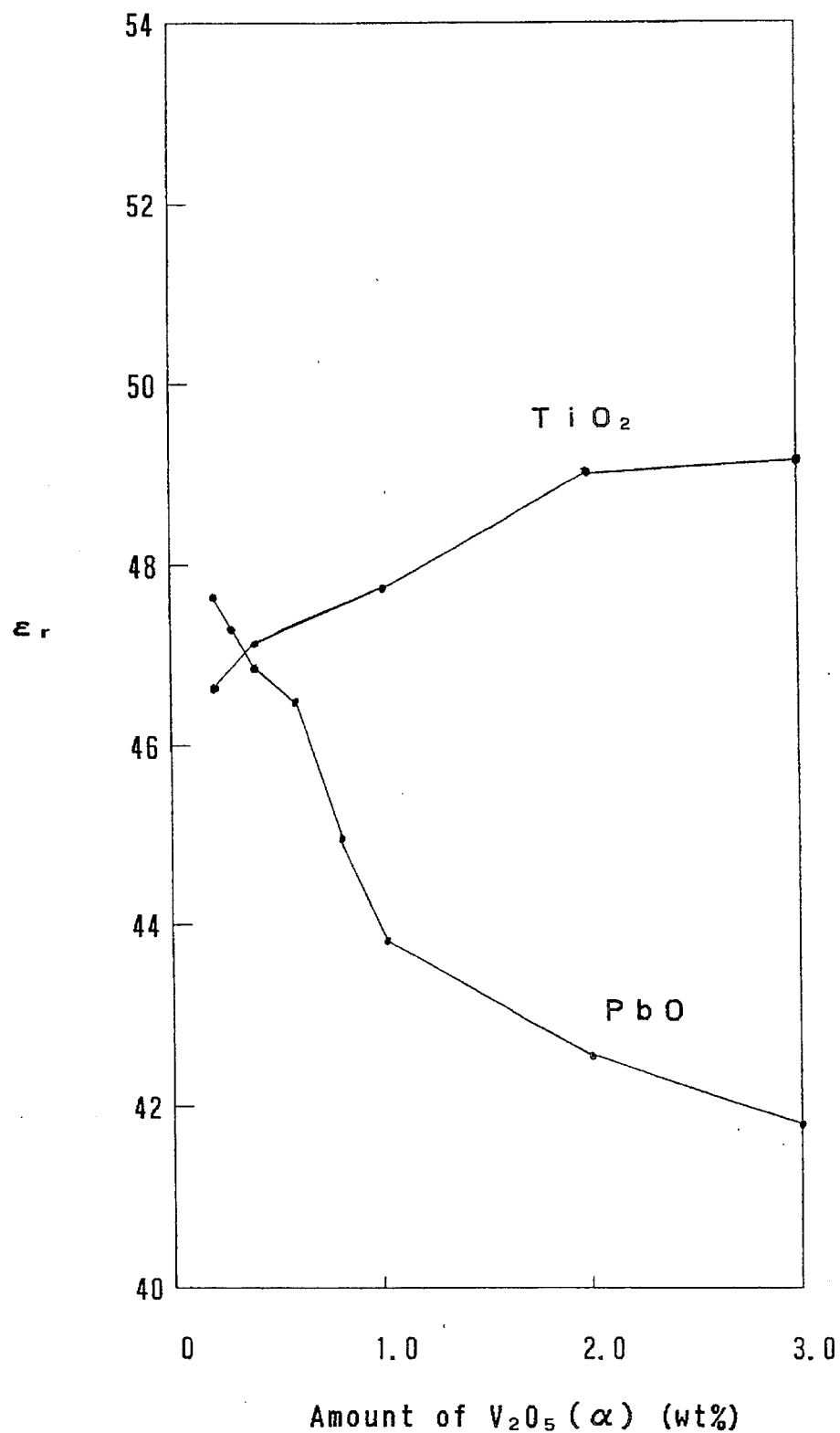
FIG. 39 is a graph showing a relation between the addition amount (α) of $V_2O_5$ and εr in (the main ingredient represented by $Bi(Nb_{0.8}Ta_{0.2})O_4+0.2\%$ by weight of $MnO_2+0.2\%$ by weight of $TiO_2$ (or PbO)) and in case of 900° C. of sintering temperature.
Figure 40:
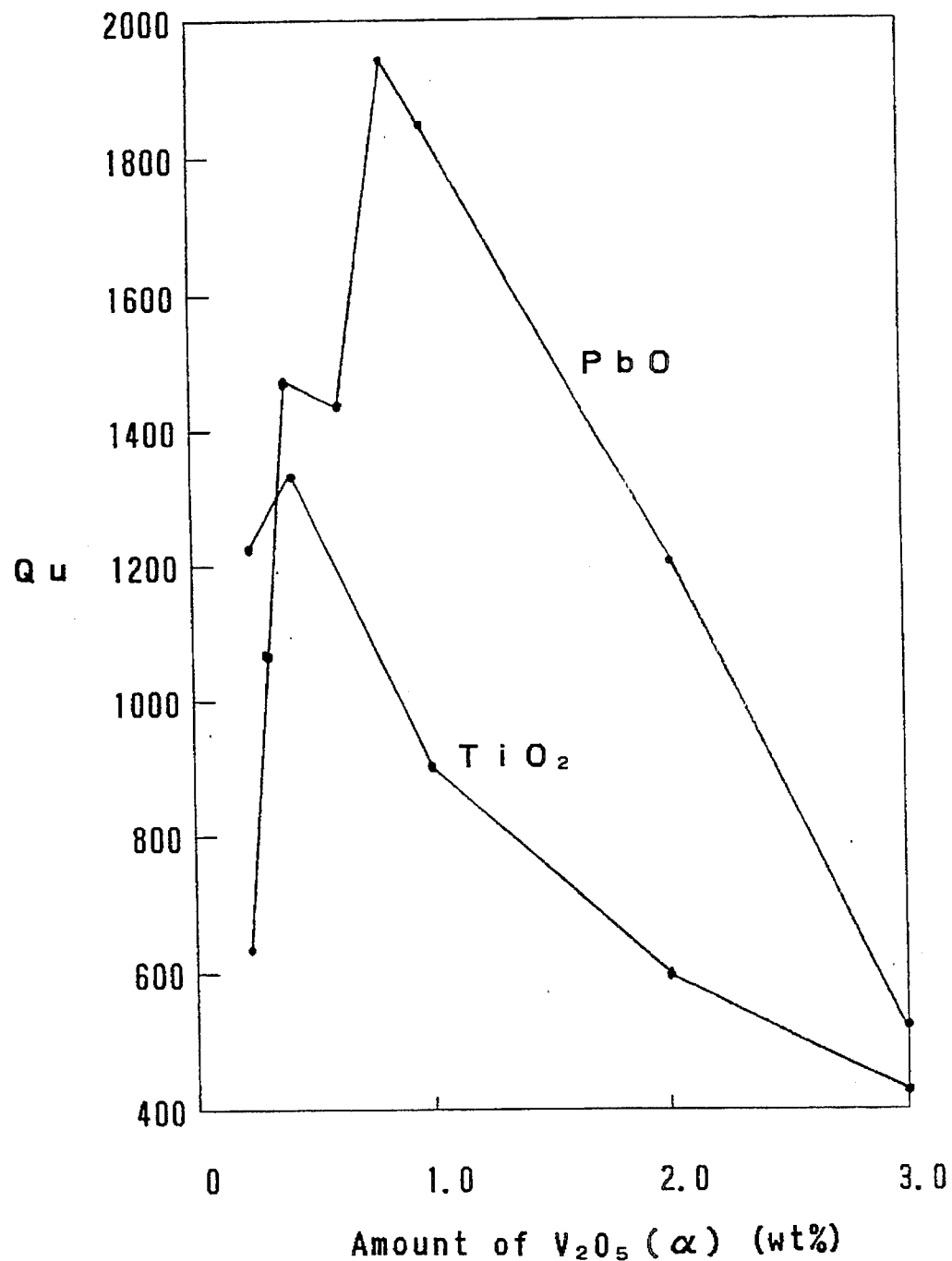
FIG. 40 is a graph showing a relation between the addition amount (α) of $V_2O_5$ and Qu in the ceramic composition and the sintering temperature in FIG. 39.
Figure 41:
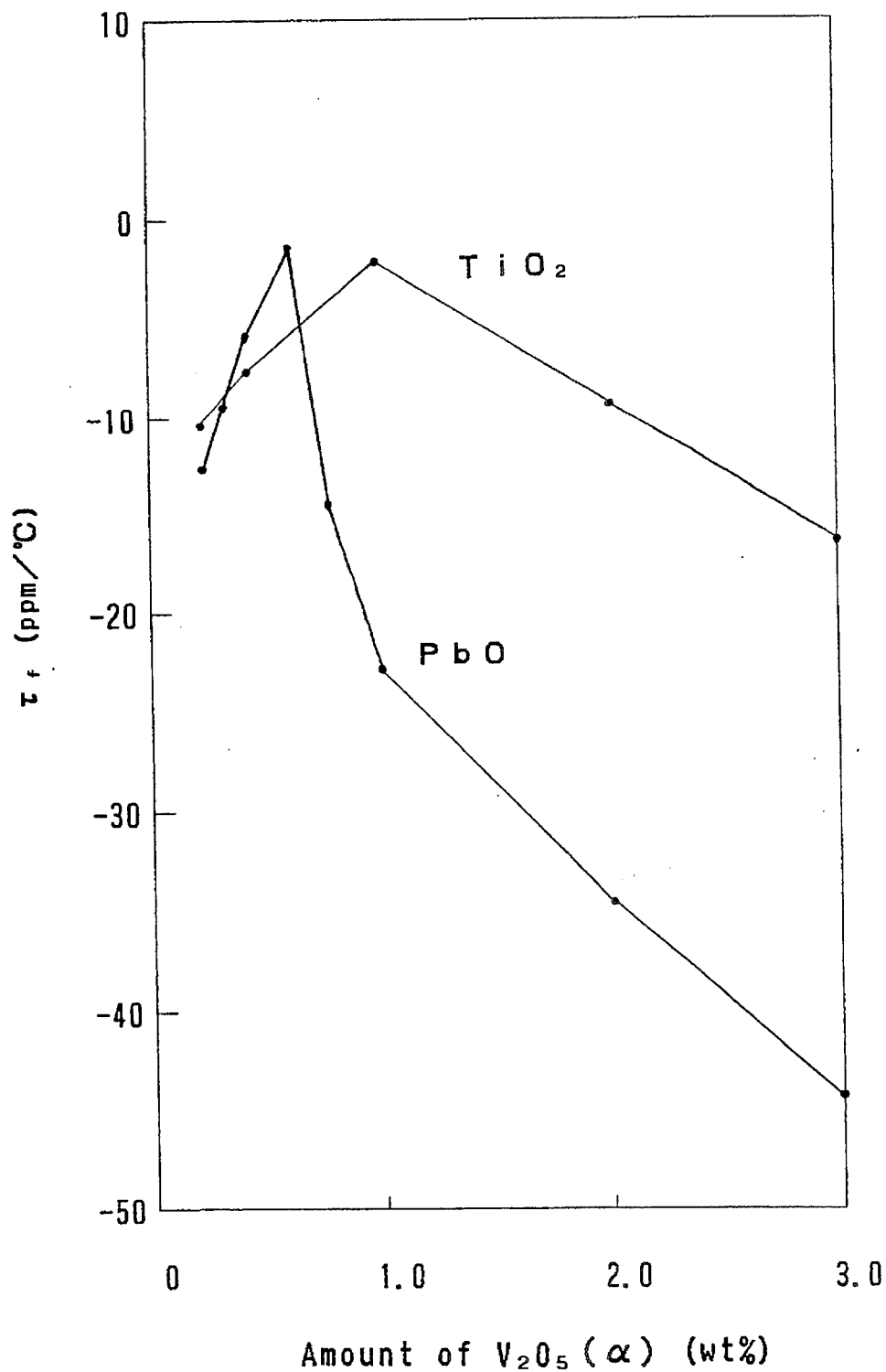
FIG. 41 is a graph showing a relation between the addition amount (α) of $V_2O_5$ and τf in the ceramic composition and the sintering temperature in FIG. 39.
Figure 42:
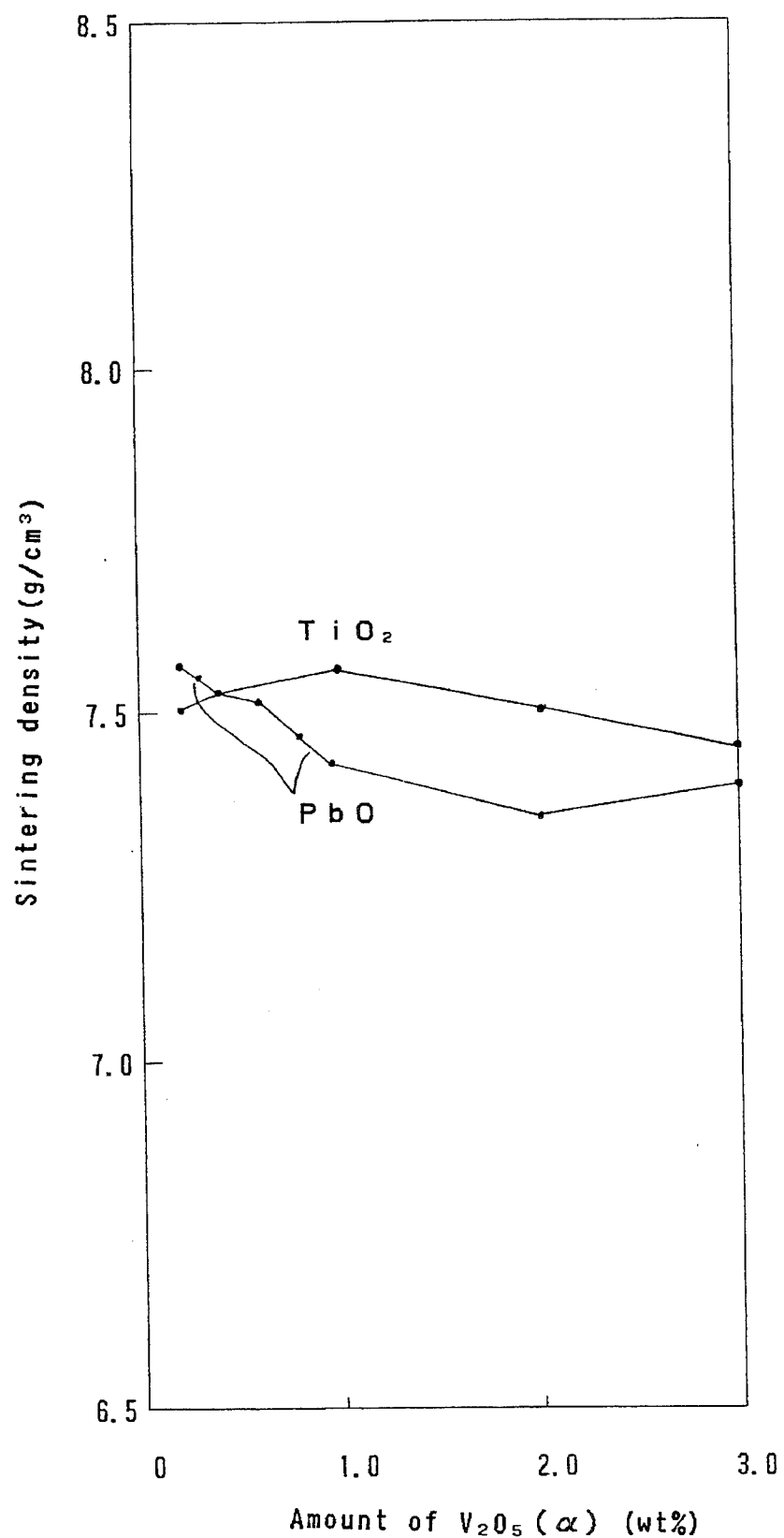
FIG. 42 is a graph showing a relation between the addition amount (α) of $V_2O_5$ and the sintering density in the ceramic composition and the sintering temperature in FIG. 39.

Further, if the sintering temperature is at 850° C. (No. 8 in Table 5), sintering is insufficient and measurement for each of the characteristics is impossible. On the other hand, at 875° to 950° C. (x=0.8, V$_2$O$_5$=0.4% by weight, TiO$_2$=0.2% by weight), the sintering density is as large as 7.36 to 7.52 kg/m$^3$ (FIG. 38) and the physical properties is are also stable (FIGS. 35–37).

As described above, while each of the physical properties changes variously in accordance with the addition amounts of V$_2$O$_5$ and TiO$_2$ and the sintering temperature, each of the characteristics lies within a range causing no practical problem so long as they are within a range of the present invention. For instance, in a case where x=0.6 to 0.96, V$_2$O$_5$=0.2 to 1.0% by weight and TiO$_2$=0.1 to 0.6% by weight, τf=−30 to 0 ppm/°C., Qu=610 to 1160, εr=42 to 48. In a case where x=0.8 to 0.96, V$_2$O$_5$=0.4 to 1.0% by weight and TiO$_2$=0.2 to 1.0% by weight, εr=43.3 to 47.7, Qu=370 to 910, τf=−13 to +11 ppm/°C. Particularly, in a case where x=0.8, V$_2$O$_5$ is 0.4% by weight, TiO$_2$=0.2 to 0.4% by weight, εr=45.4 to 47.7, Qu=510 to 910 and τf=−13 to −9 ppm/°C., showing excellent balance of performance.

As can be seen from the results of Nos. 18 to 20 in Table 5, although τf tends to increase toward the negative direction (−55 to −30 ppm/°C.) if x=as small as 0.2 to 0.6 in the present invention, εr is from 42.0 to 47.2 and Qu is from 510 to 730, which are practically sufficient characteristics.

Example 5

(1) Preparation of dielectric ceramic composition

As the raw material in this example, TiO$_2$ powder (purity: 99.9%) or PbO powder (purity: 99.5%) was further used in addition to the powder used in Example 3. Then, the raw materials were weighted and mixed in the same manner as in Example 3 so as to obtain a composition in which x in Bi(Nb$_x$Ta$_{1-x}$)O$_4$ varies from 0 to 1.0, the addition amount of V$_2$O$_5$ (α% by weight) varies from 0 to 3.0, the addition amount of MnO$_2$ (β% by weight) varies from 0 to 2.0 and the addition amount of TiO$_2$ (γ% by weight, shown in Table 6) varies from 0 to 2.0 and, further, the addition amount of PbO (δ% by weight, shown in Table 7) varies from 0 to 2.0, as shown in Table 6 and 7.

Further, in the same manner as in Example 3, dielectric specimens of identical shape (Nos. 1 to 27 in Table 6 and Nos. 1 to 29 in Table 7) were obtained and performance evaluation (εr, Qu, τf and sintering density) was carried out. The resonance frequency upon measurement was as shown in Tables 6 and 7 (f$_o$). The results are shown together in Tables 6 and 7 and also shown in the graphs of FIGS. 39 to 62.

(2) Effect of examples in V$_2$O$_5$—MnO$_2$—TiO$_2$ system composition

According to the results of Table 6 and FIGS. 39–50 and FIGS. 55 to 62, if V$_2$O$_5$ is not added (No. 12 in Table 6) sintering is insufficient and measurement for each of the characteristics is impossible. Then, since εr increases (FIG. 39) and τf decreases (FIGS. 41) along with addition, τf can be controlled. However, since Qu decreases along with addition (FIG. 40), addition of a great amount of V$_2$O$_5$ is not preferred.

TABLE 6

| No. | Sinter. temp. (°C.) | x | α (V$_2$O$_5$) (wt %) | β (MnO$_2$) (wt %) | γ (TiO$_2$) (wt %) | f$_o$ (GHz) | ε$_r$ | Qu | τ$_f$ (ppm/°C.) | Sint. density (g/cm$^3$) |
|---|---|---|---|---|---|---|---|---|---|---|
| 1 | 900 | 0.8 | 0.4 | 0.2 | 0 | 3.86 | 45.74 | 1662 | −10.16 | 7.50 |
| 2 | 900 | 0.8 | 0.4 | 0.2 | 0.1 | 3.40 | 46.40 | 1493 | −8.81 | 7.51 |
| 3 | 900 | 0.8 | 0.4 | 0.2 | 0.2 | 3.35 | 47.06 | 1325 | −7.46 | 7.53 |

TABLE 6-continued

| No. | Sinter. temp. (°C.) | x | α (V$_2$O$_5$) (wt %) | β (MnO$_2$) (wt %) | γ (TiO$_2$) (wt %) | f$_o$ (GHz) | ε$_r$ | Qu | τ$_f$ (ppm/°C.) | Sint. density (g/cm$^3$) |
|---|---|---|---|---|---|---|---|---|---|---|
| 4 | 900 | 0.8 | 0.4 | 0.2 | 0.4 | 3.38 | 48.57 | 747 | −1.17 | 7.50 |
| 5 | 900 | 0.8 | 0.4 | 0.2 | 0.7 | 3.36 | 48.91 | 632 | 6.48 | 7.36 |
| 6 | 900 | 0.8 | 0.4 | 0.2 | 1.0 | 3.24 | 49.25 | 517 | 14.13 | 7.22 |
| 7 | 900 | 0.8 | 0.4 | 0.2 | 2.0 | 3.42 | 46.81 | 255 | 50.22 | 6.67 |
| 8 | 850 | 0.8 | 0.4 | 0.2 | 0.2 | 3.15 | 46.33 | 1618 | −6.59 | 7.30 |
| 9 | 875 | 0.8 | 0.4 | 0.2 | 0.2 | 3.19 | 46.92 | 1461 | −6.78 | 7.52 |
| 10 | 925 | 0.8 | 0.4 | 0.2 | 0.2 | 3.33 | 46.94 | 1319 | −6.30 | 7.52 |
| 11 | 950 | 0.8 | 0.4 | 0.2 | 0.2 | 3.31 | 47.20 | 1282 | −5.44 | 7.51 |
| 12 | 900 | 0.8 | 0 | 0.2 | 0.2 | | Sintering is insufficient. | | | |
| 13 | 900 | 0.8 | 0.2 | 0.2 | 0.2 | 3.41 | 46.63 | 1227 | −10.91 | 7.50 |
| 14 | 900 | 0.8 | 1.0 | 0.2 | 0.2 | 3.35 | 47.88 | 893 | −2.45 | 7.56 |
| 15 | 900 | 0.8 | 2.0 | 0.2 | 0.2 | 3.43 | 48.91 | 598 | −9.03 | 7.50 |
| 16 | 900 | 0.8 | 3.0 | 0.2 | 0.2 | 3.41 | 49.04 | 417 | −16.79 | 7.45 |
| 17 | 900 | 0.8 | 0.4 | 0 | 0.2 | 3.45 | 47.06 | 865 | −12.24 | 7.51 |
| 18 | 900 | 0.8 | 0.4 | 0.4 | 0.2 | 3.31 | 47.23 | 1438 | −6.03 | 7.50 |
| 19 | 900 | 0.8 | 0.4 | 1.0 | 0.2 | 3.44 | 47.46 | 903 | −11.10 | 7.50 |
| 20 | 900 | 0.8 | 0.4 | 1.5 | 0.2 | 3.41 | 47.18 | 760 | −11.46 | 7.46 |
| 21 | 900 | 0.8 | 0.4 | 2.0 | 0.2 | 3.40 | 46.89 | 618 | −11.83 | 7.41 |
| 22 | 900 | 0 | 0.4 | 0.2 | 0.2 | 3.31 | 44.18 | 884 | −48.23 | 8.08 |
| 23 | 900 | 0.2 | 0.4 | 0.2 | 0.2 | 3.24 | 45.90 | 1023 | −49.58 | 8.13 |
| 24 | 900 | 0.4 | 0.4 | 0.2 | 0.2 | 3.43 | 47.16 | 1211 | −44.35 | 7.98 |
| 25 | 900 | 0.6 | 0.4 | 0.2 | 0.2 | 3.41 | 47.51 | 1203 | −25.11 | 7.73 |
| 26 | 900 | 0.96 | 0.4 | 0.2 | 0.2 | 3.27 | 46.02 | 1389 | 3.51 | 7.21 |
| 27 | 900 | 1.0 | 0.4 | 0.2 | 0.2 | 3.40 | 45.74 | 1415 | 6.34 | 7.05 |

TABLE 7

| No. | Sinter. temp. (°C.) | x | α (V$_2$O$_5$) (wt %) | β (MnO$_2$) (wt %) | δ (PbO) (wt %) | f$_o$ (GHz) | ε$_r$ | Qu | τ$_f$ (ppm/°C.) | Sint. density (g/cm$^3$) |
|---|---|---|---|---|---|---|---|---|---|---|
| 1 | 900 | 0.8 | 0 | 0.2 | 0.2 | | Sintering is insufficient. | | | 7.57 |
| 2 | 900 | 0.8 | 0.2 | 0.2 | 0.2 | 3.45 | 47.80 | 641 | −12.90 | 7.57 |
| 3 | 900 | 0.8 | 0.3 | 0.2 | 0.2 | 3.44 | 47.30 | 1050 | −9.60 | 7.55 |
| 4 | 900 | 0.8 | 0.4 | 0.2 | 0.2 | 3.47 | 46.81 | 1465 | −6.28 | 7.53 |
| 5 | 900 | 0.8 | 0.6 | 0.2 | 0.2 | 3.42 | 46.53 | 1430 | −1.75 | 7.51 |
| 6 | 900 | 0.8 | 0.8 | 0.2 | 0.2 | 3.47 | 44.88 | 1952 | −14.46 | 7.46 |
| 7 | 900 | 0.8 | 1.0 | 0.2 | 0.2 | 3.45 | 43.75 | 1842 | −23.14 | 7.42 |
| 8 | 900 | 0.8 | 2.0 | 0.2 | 0.2 | 3.46 | 42.49 | 1204 | −35.03 | 7.35 |
| 9 | 900 | 0.8 | 3.0 | 0.2 | 0.2 | 3.40 | 41.80 | 513 | −44.12 | 7.40 |
| 10 | 850 | 0.8 | 0.4 | 0.2 | 0.2 | 3.50 | 46.98 | 1523 | −16.24 | 7.48 |
| 11 | 875 | 0.8 | 0.4 | 0.2 | 0.2 | 3.39 | 47.13 | 1468 | −11.74 | 7.55 |
| 12 | 925 | 0.8 | 0.4 | 0.2 | 0.2 | 3.48 | 46.89 | 1388 | −13.43 | 7.50 |
| 13 | 950 | 0.8 | 0.4 | 0.2 | 0.2 | 3.45 | 47.04 | 1399 | −10.02 | 7.52 |
| 14 | 900 | 0.8 | 0.4 | 0 | 0.2 | 3.40 | 45.35 | 1604 | −18.04 | 7.50 |
| 15 | 900 | 0.8 | 0.4 | 0.1 | 0.2 | 3.46 | 46.58 | 1520 | −15.47 | 7.53 |
| 16 | 900 | 0.8 | 0.4 | 0.4 | 0.2 | 3.35 | 47.86 | 1351 | −2.07 | 7.52 |
| 17 | 900 | 0.8 | 0.4 | 1.0 | 0.2 | 3.46 | 48.51 | 1047 | −5.34 | 7.50 |
| 18 | 900 | 0.8 | 0.4 | 2.0 | 0.2 | 3.45 | 49.10 | 798 | −12.95 | 7.53 |
| 19 | 900 | 0.8 | 0.4 | 0.2 | 0 | 3.86 | 45.74 | 1662 | −10.16 | 7.50 |
| 20 | 900 | 0.8 | 0.4 | 0.2 | 0.4 | 3.65 | 47.39 | 1293 | −13.24 | 7.49 |
| 21 | 900 | 0.8 | 0.4 | 0.2 | 0.5 | 3.36 | 47.42 | 1203 | −15.70 | 7.49 |
| 22 | 900 | 0.8 | 0.4 | 0.2 | 1.0 | 3.54 | 48.48 | 753 | −28.00 | 7.48 |
| 23 | 900 | 0.8 | 0.4 | 0.2 | 2.0 | 3.32 | 49.25 | 490 | −49.57 | 7.45 |
| 24 | 900 | 0 | 0.4 | 0.2 | 0.2 | 3.45 | 43.81 | 1050 | −44.03 | 8.07 |
| 25 | 900 | 0.2 | 0.4 | 0.2 | 0.2 | 3.41 | 45.99 | 1223 | −48.15 | 8.09 |
| 26 | 900 | 0.4 | 0.4 | 0.2 | 0.2 | 3.40 | 46.75 | 1335 | −39.95 | 8.00 |
| 27 | 900 | 0.6 | 0.4 | 0.2 | 0.2 | 3.47 | 47.01 | 1421 | −23.42 | 7.75 |
| 28 | 900 | 0.96 | 0.4 | 0.2 | 0.2 | 3.40 | 45.89 | 1503 | 3.98 | 7.12 |
| 29 | 900 | 1.0 | 0.4 | 0.2 | 0.2 | 3.49 | 45.50 | 1530 | 5.15 | 7.04 |

Figure 43:
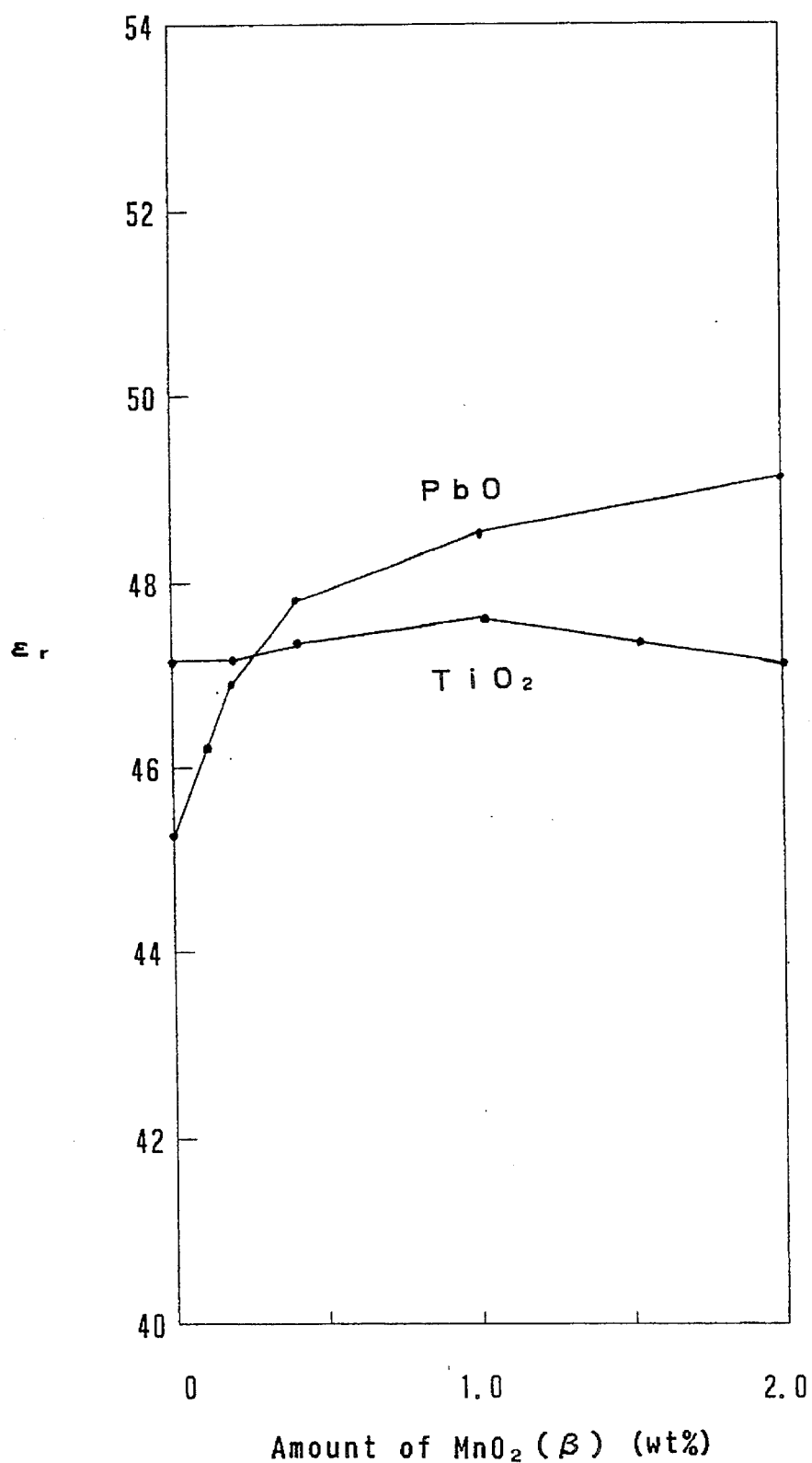
FIG. 43 is a graph showing a relation between the addition amount (β) of $MnO_2$ and εr in (the main ingredient represented by $Bi(Nb_{0.8}Ta_{0.2})O_4+0.4\%$ by weight of $V_2O_5+0.2\%$ by weight of $TiO_2$ (or PbO)) and in case of 900° C. of sintering temperature.

Further, since Qu increases along with addition of MnO$_2$ up to 0.4% by weight, the addition is effective, but addition of a great amount (1 and 2% by weight) is not preferred because Qu decreases greatly (FIG. 43).

Figure 49:
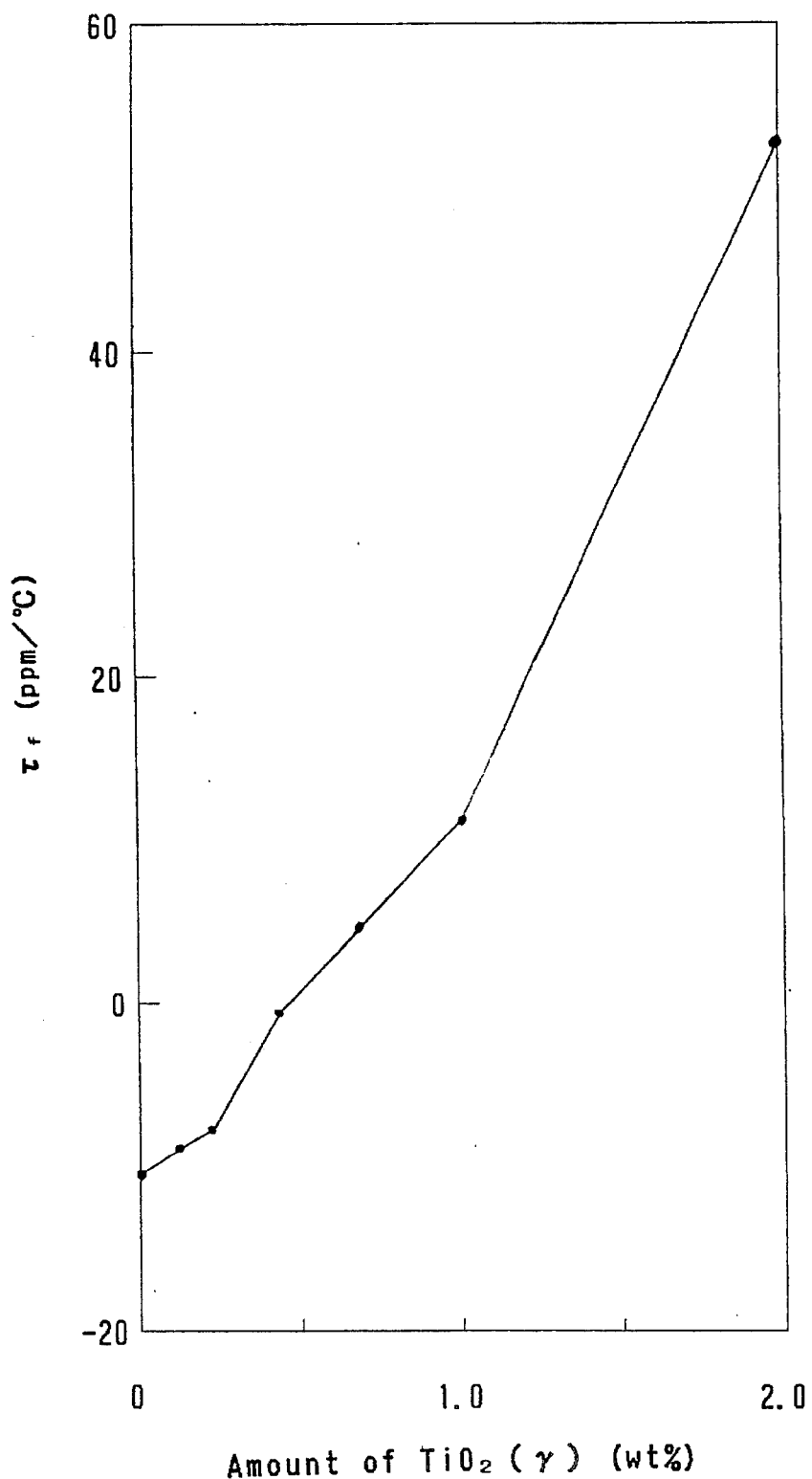
FIG. 49 is a graph showing a relation between the addition amount (γ) of $TiO_2$ and τf in the ceramic composition and the sintering temperature in FIG. 47.
Figure 50:
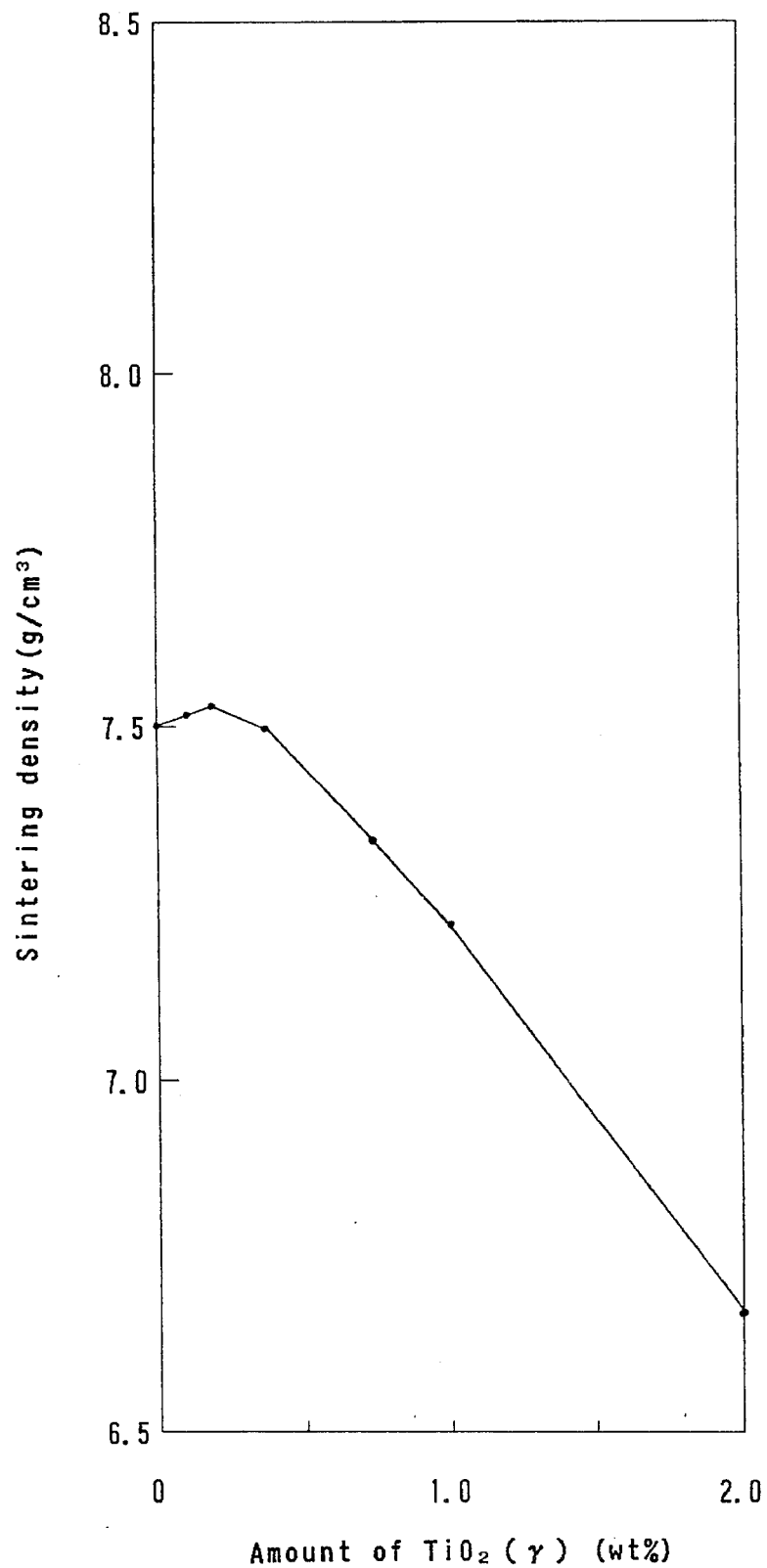
FIG. 50 is a graph showing a relation between the addition amount (γ) of $TiO_2$ and the sintering density in the ceramic composition and the sintering temperature in FIG. 47.

It is shown that τf is improved greatly by addition of TiO$_2$ and τf can be controlled easily (FIG. 49)

Figure 47:
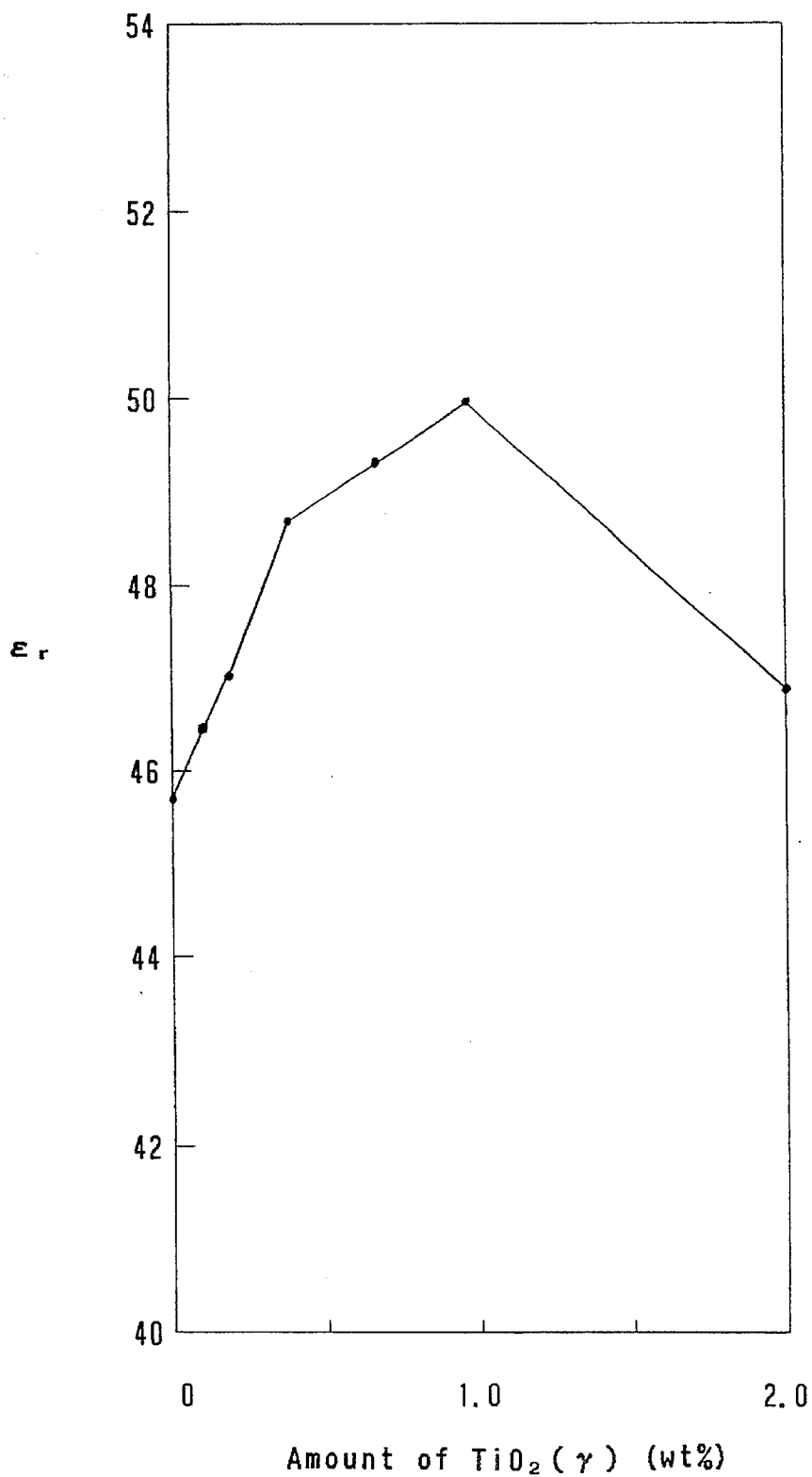
FIG. 47 is a graph showing a relation between the addition amount (γ) of $TiO_2$ and εr in (the main ingredient represented by $Bi(Nb_{0.8}Ta_{0.2})O_4+0.4\%$ by weight of $V_2O_5+0.2\%$ by weight of $MnO_2$) and in case of 900° C. of sintering temperature.
Figure 48:
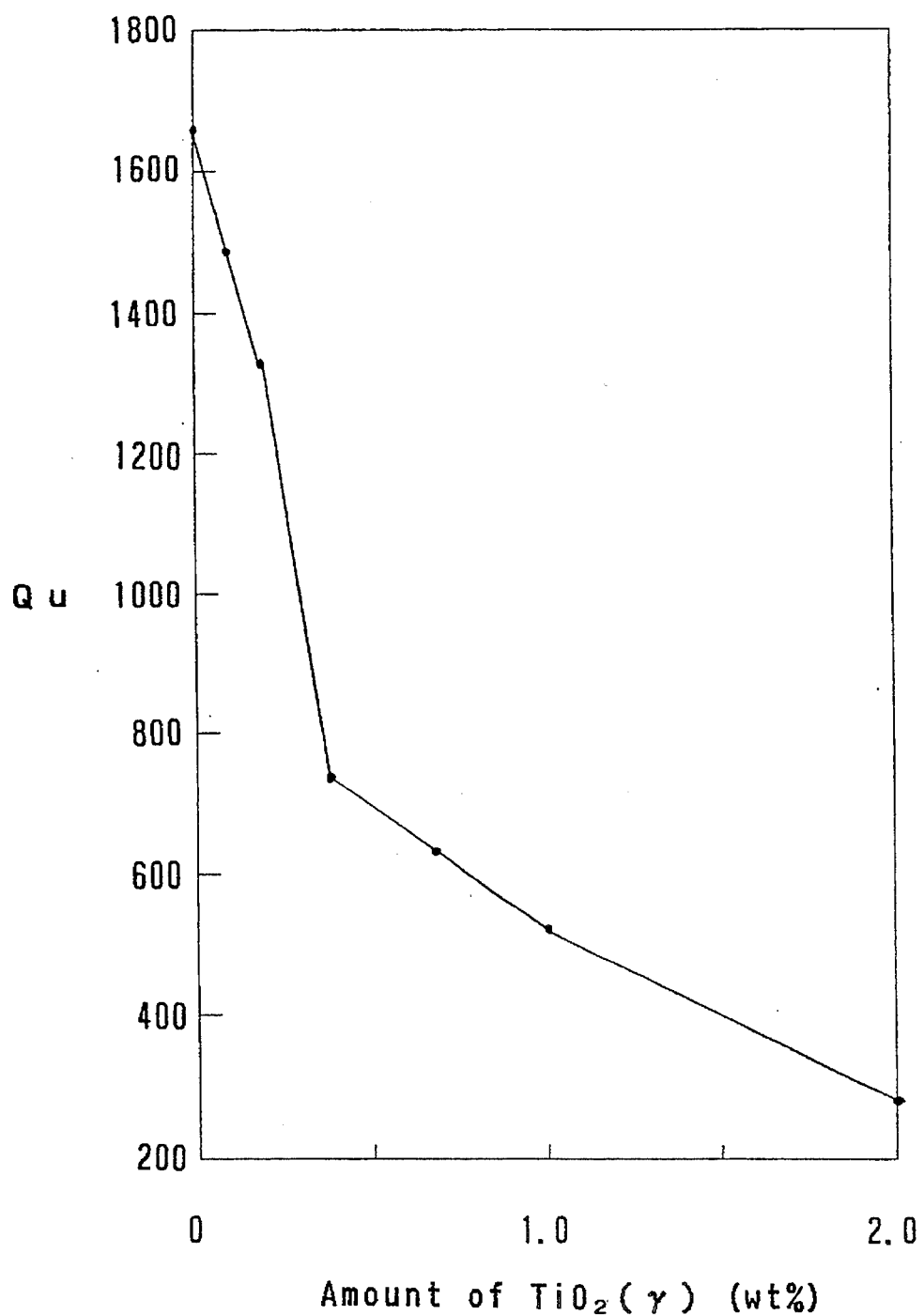
FIG. 48 is a graph showing a relation between the addition amount (γ) of $TiO_2$ and Qu in the ceramic composition and the sintering temperature in FIG. 47.

Further, addition of TiO$_2$ up to 1.0% by weight is preferred since εr increases (FIG. 47). Further, since Qu decreases by the addition of TiO$_2$ and, particularly, Qu decreases remarkably as 747 at 0.4% by weight, addition of a great amount of TiO$_2$ is not preferred (FIG. 48).

Figure 58:
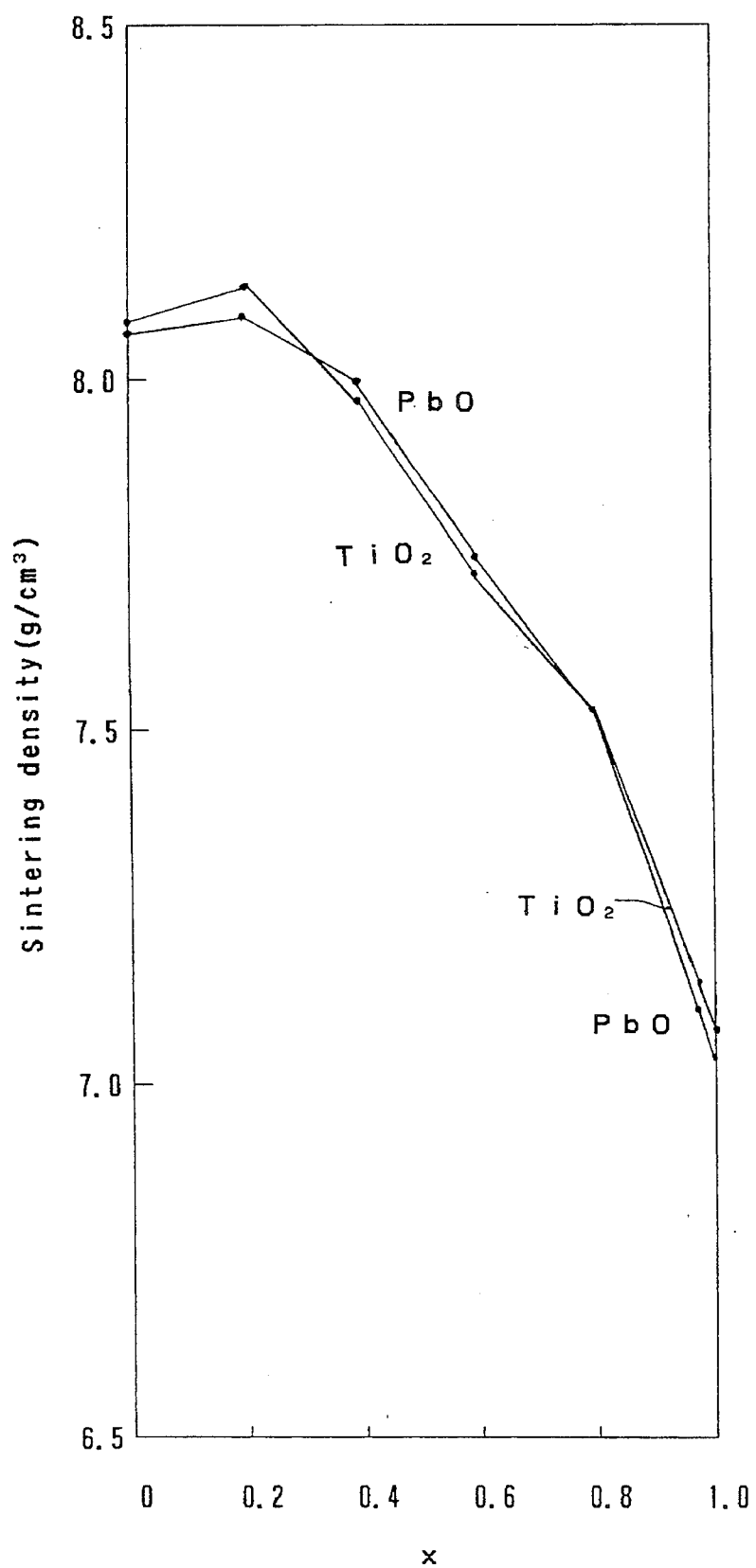
FIG. 58 is a graph showing a relation between x and the sintering density in the ceramic composition and the sintering temperature in FIG. 55.
Figure 59:
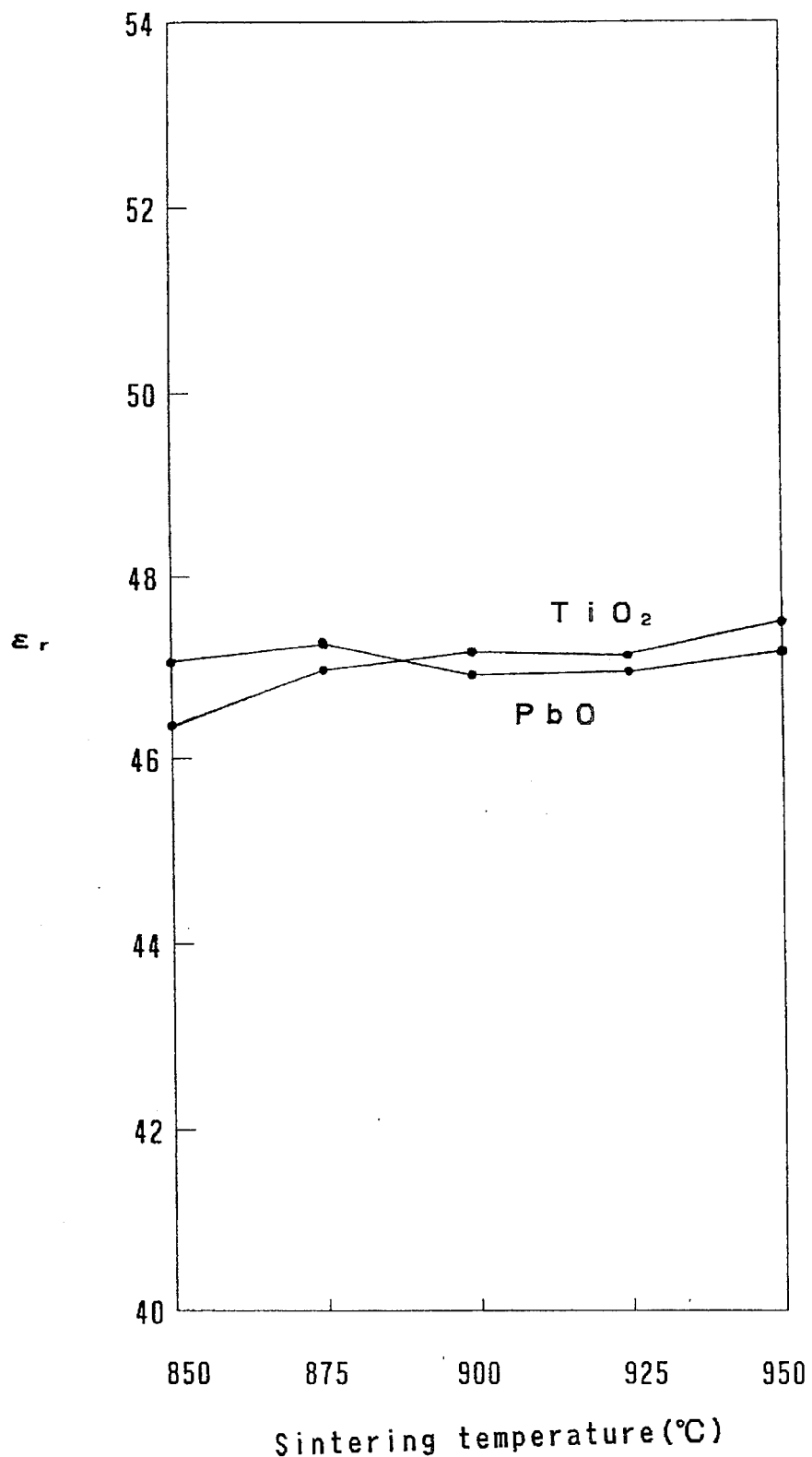
FIG. 59 is a graph showing a relation between the sintering temperature and εr in (the main ingredient represented by $Bi(Nb_{0.8}Ta_{0.2})O_4+0.4\%$ by weight of $V_2O_5+0.2\%$ by weight of $MnO_2+0.2\%$ by weight of $TiO_2$ (or PbO)).
Figure 60:
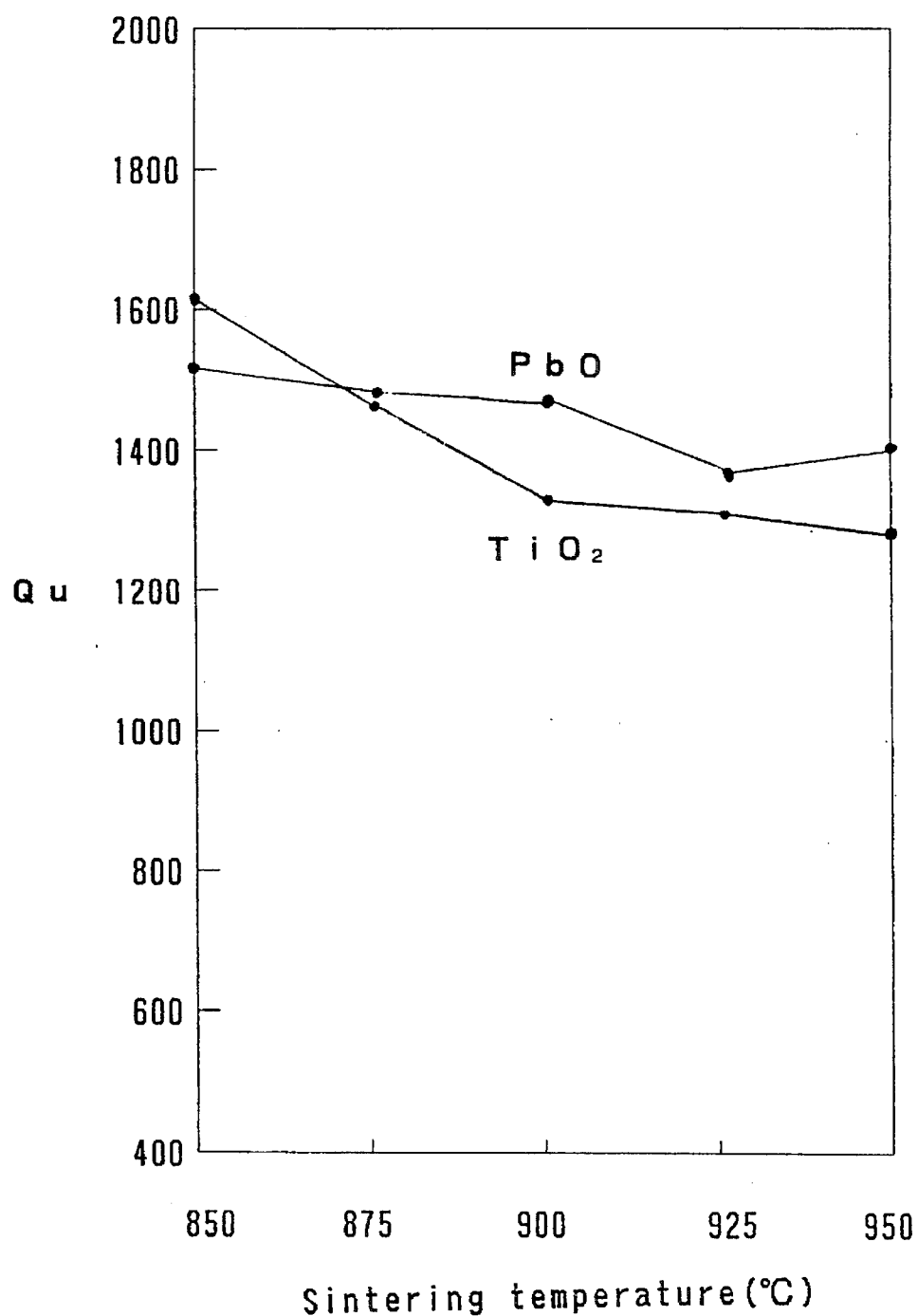
FIG. 60 is a graph showing a relation between the sintering temperature and Qu in the ceramic composition in FIG. 59.
Figure 61:
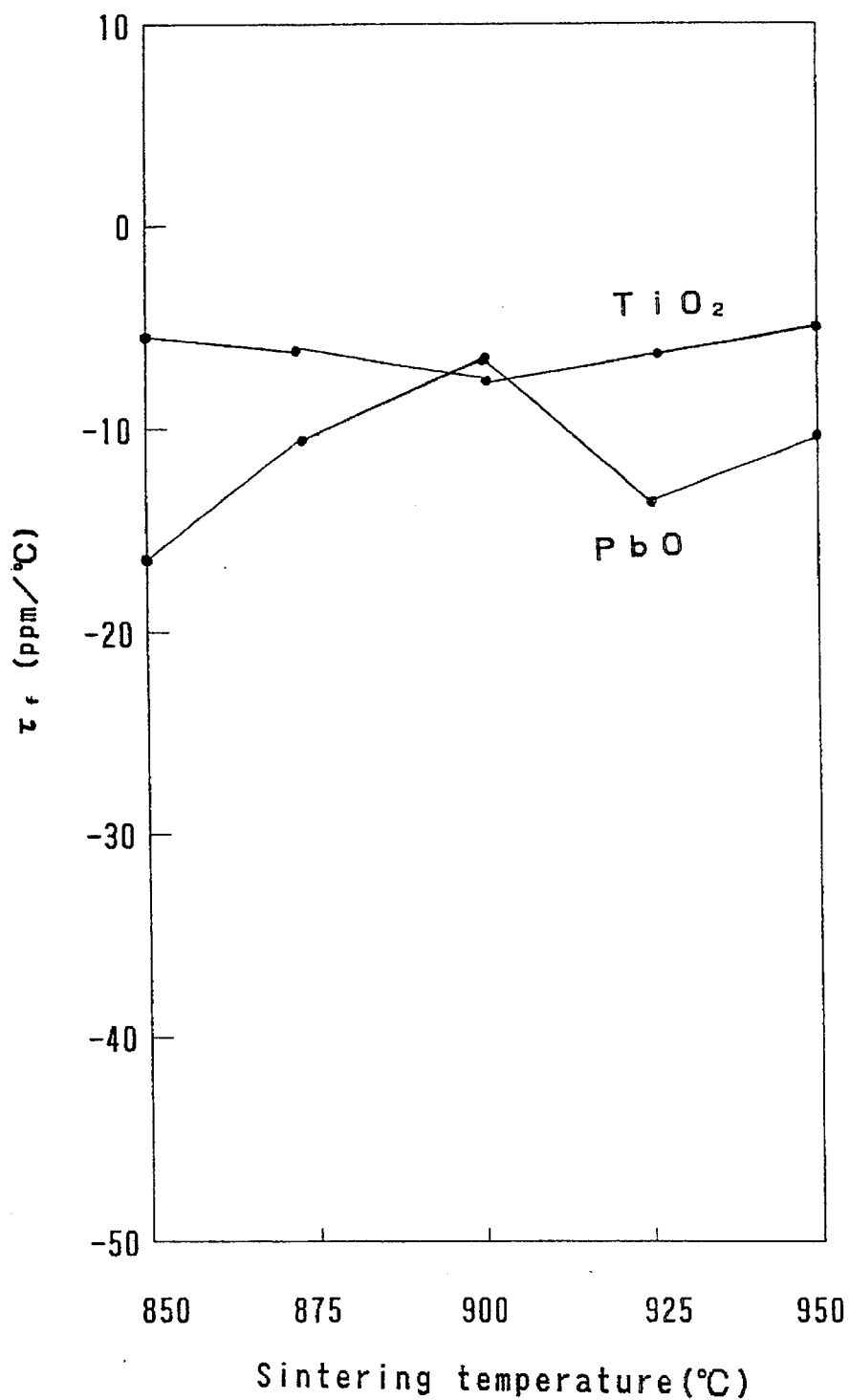
FIG. 61 is a graph showing a relation between the sintering temperature and τf in the ceramic composition in FIG. 59.
Figure 62:
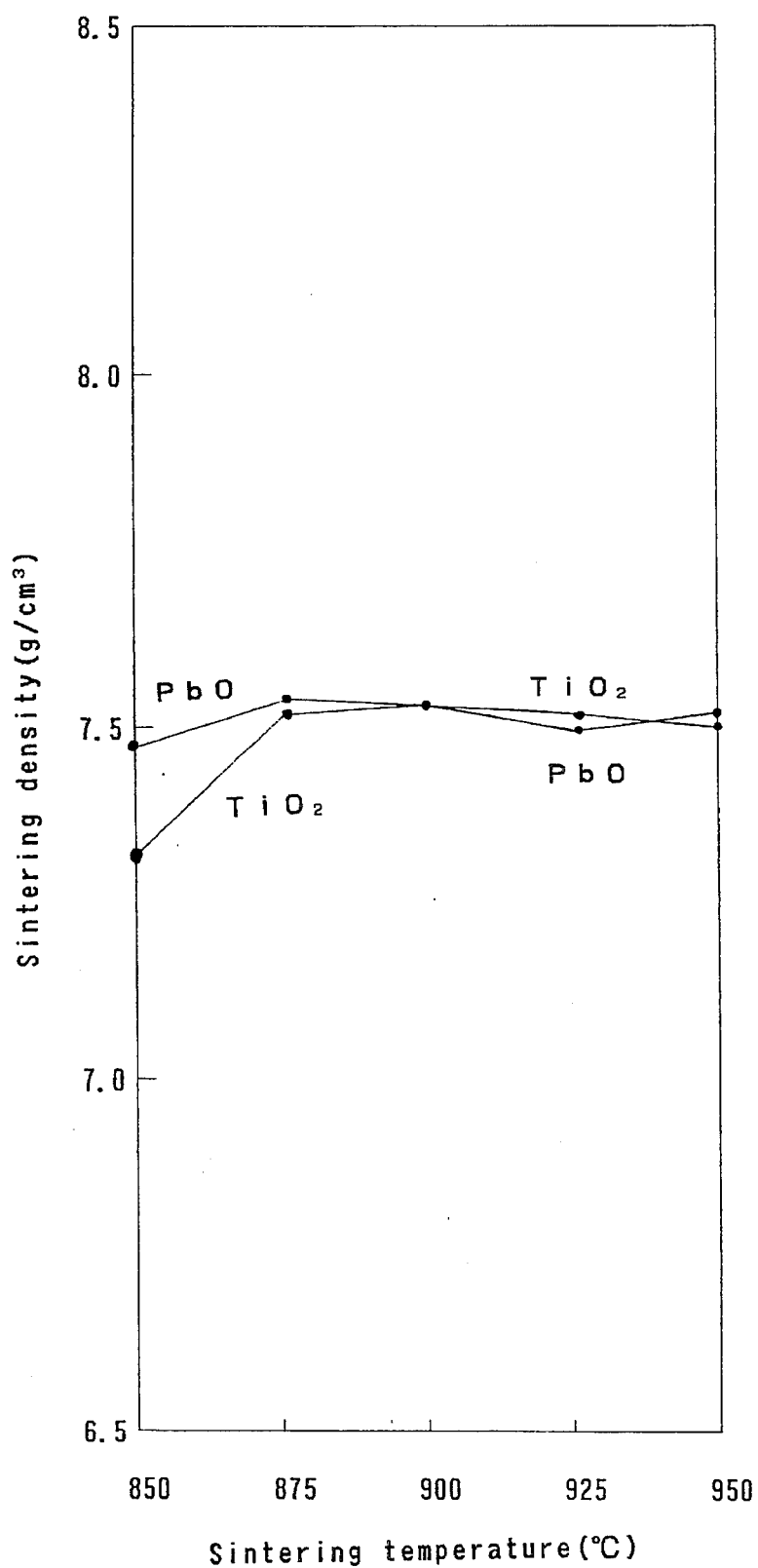
FIG. 62 is a graph showing a relation between the sintering temperature and the sintering density in the ceramic composition in FIG. 59.

Further, since τf increases along with increase of the value x in Bi(NbxTa1-x)O$_4$ (FIG. 57), τf can be controlled by the change of the x. Further, since Qu increases along with increase of x (FIG. 56) and εr also increases with x up to 0.6 (FIG. 55), it is preferred in view of this physical property, but the sintering density is lowered (FIG. 58). Further, 7.05 kg/m$^3$ of the sintering density can be insured even if x is 1.0 (No. 27, FIG. 58).

Further, sintering is sufficient even at a sintering temperature of 850° C. (No. 8 in Table 6) and the sintering density is as great as 7.30 to 7.51 kg/m$^3$ at 850°–950° C. (x=0.8, V$_2$O$_5$=0.4% by weight, MnO$_2$=0.2% by weight and TiO$_2$= 0.2% by weight) (Nos. 8 to 11 in Table 6, FIG. 62), and physical properties are also stable (FIGS. 59 to 62).

As described above, each of the characteristics changes variously in accordance with the kind of each of the additives, the addition amount thereof and the sintering temperature and well balanced practical performances as shown below are given, for example, with the range of the following compositions according to the results of this example (Table 6).

(1) At V$_2$O$_5$: 0.2 to 1.0% by weight, Mn$_2$, TiO$_2$: both 0.2% by weight and x: 0.8, εr: 46.6 to 47.9, Qu: 890 to 1300, τf: −10.91 to −2.45 ppm/°C.

(2) At V$_2$O$_5$: 0.4% by weight, MnO$_2$, TiO$_2$: both 0.2% by weight and x: 0.8, εr: 47.1, Qu: 1325, τf: −7.46 ppm/°C.

(3) At MnO$_2$: 0.2–1.0% by weight, V$_2$O$_5$: 0.4% by weight, TiO$_2$: 0.2% by weight and x: 0.8, εr: 47.0 to 47.5, Qu: 900 to 1440, τf: −11.1 to −6.0 ppm/°C.

(4) At TiO$_2$: less than 0.4% by weight, V$_2$O$_5$: 0.4% by weight, MnO$_2$: 0.2% by weight and x: 0.8, εr: 45.7 to 48.6, Qu: 750 to 1660, τf: −10.2 to −1.1 ppm/°C.

(5) At TiO$_2$: 0.1 to 0.2% by weight, V$_2$O$_5$: 0.4% by weight, MnO$_2$: 0.2% by weight and x: 0.8, εr: 46.4 to 47.1, Qu: 1320 to 1490, τf: −8.8 to −7.5 ppm/°C.

(6) At V$_2$O$_5$: 0.2 to 1.0% by weight, MnO$_2$: not more than 1.0% by weight, TiO$_2$: not more than 0.4% by weight and x: 0.8 to 0.96, τf: −12 to +7 ppm/°C., Qu: 800 to 1600, and εr: 45 to 50.

(3) Effect of the example in V$_2$O$_5$—MnO$_2$—PbO system composition

According to the results of Table 7 and FIGS. 39 to 46 and FIGS. 51 to 62, if V$_{2O5}$ is not added (No. 1 in Table 7), sintering is insufficient and measurement for each of the characteristics is impossible. Then, since τf and Qu change by the addition (each in FIGS. 41 and 40), τf and Qu can be controlled. Particularly, since τf increases along with the addition up to 0.6% and Qu increases along with addition up to 0.8% by weight, such addition is preferred.

Figure 44:
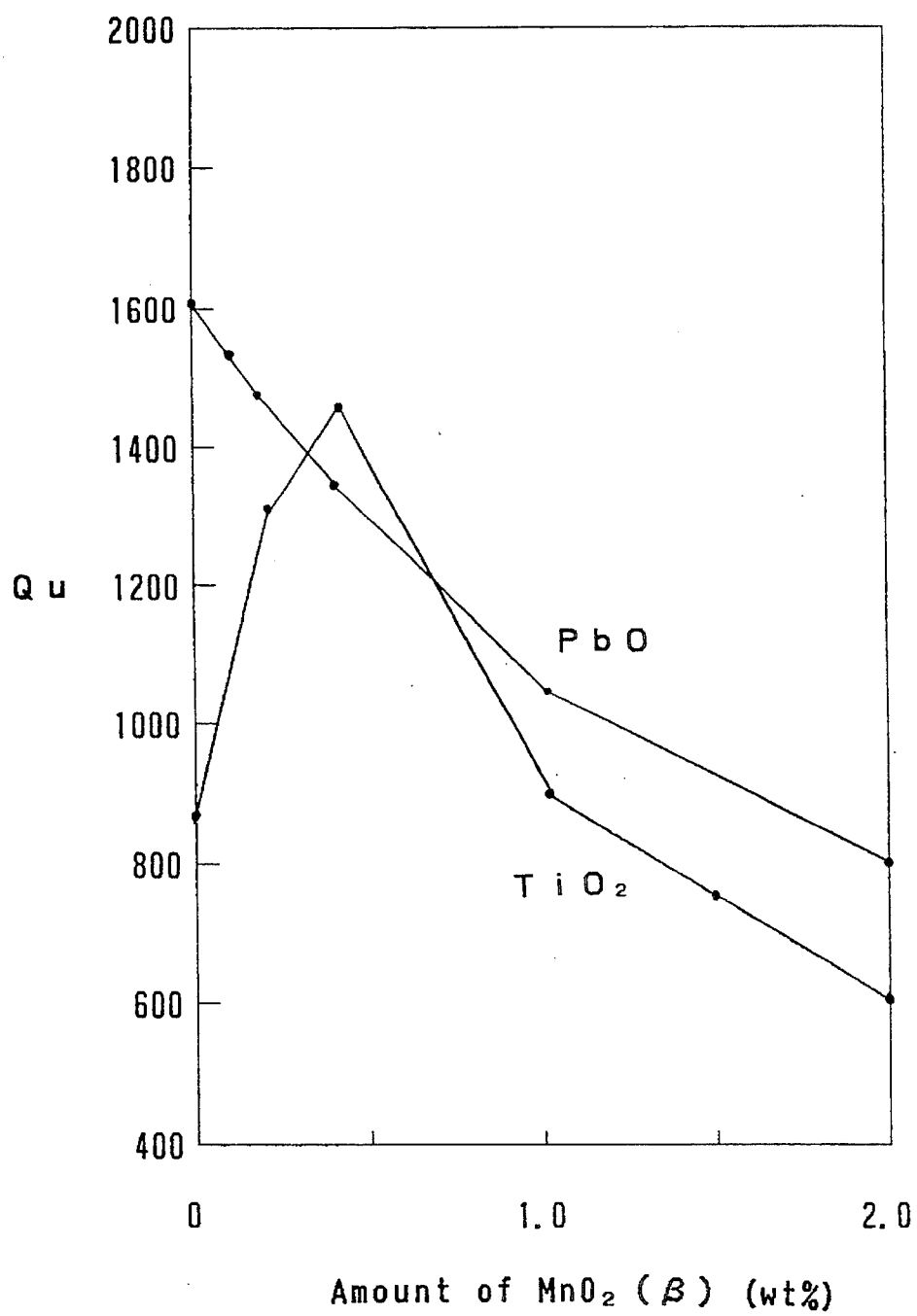
FIG. 44 is a graph showing a relation between the addition amount (β) of $MnO_2$ and Qu in the ceramic composition and the sintering temperature in FIG. 43.
Figure 45:
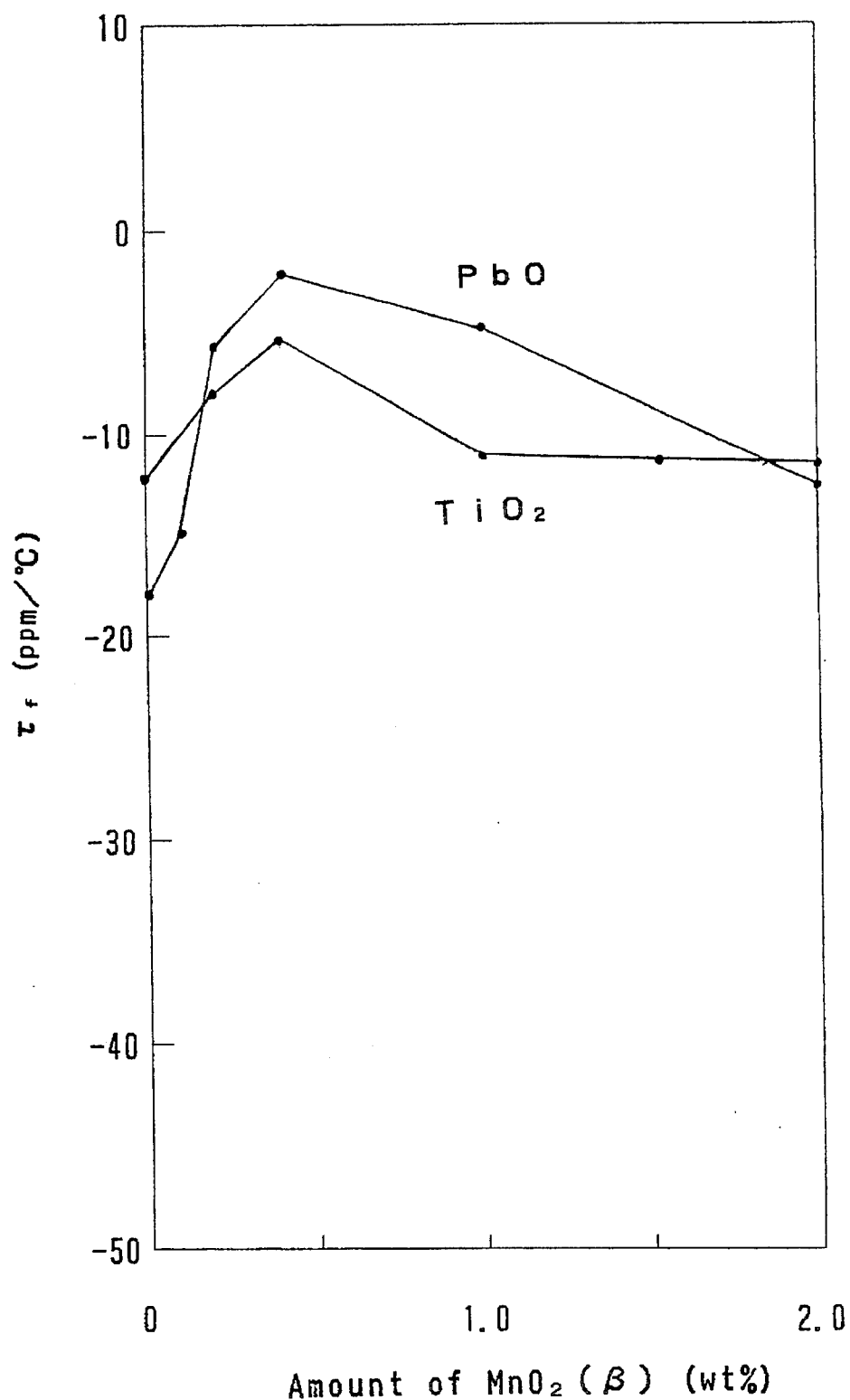
FIG. 45 is a graph showing a relation between the addition amount (β) of $MnO_2$ and τf in the ceramic composition and the sintering temperature in FIG. 43.
Figure 46:
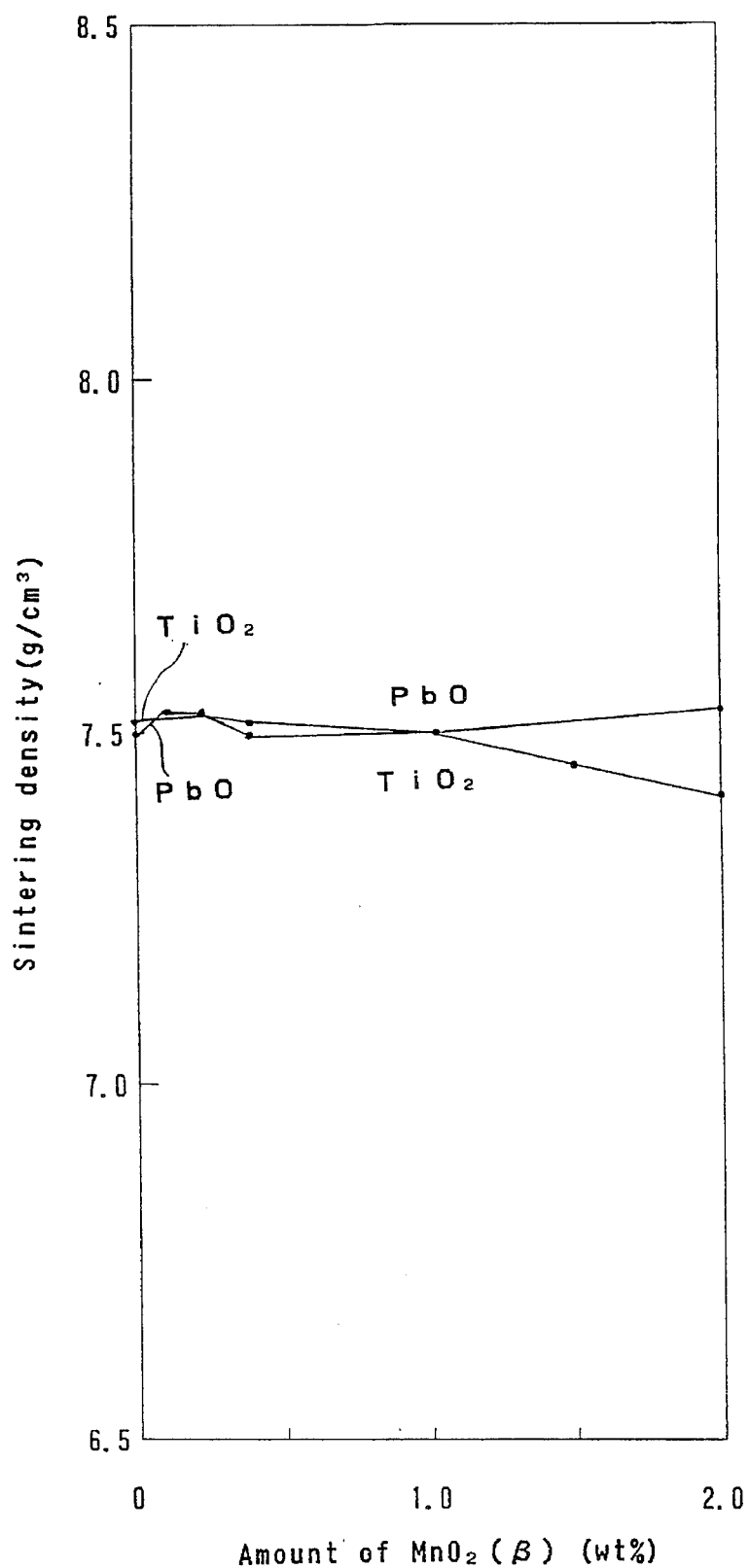
FIG. 46 is a graph showing a relation between the addition amount (β) of $MnO_2$ and the sintering density in the ceramic composition and the sintering temperature in FIG. 43.

Further, εr increases along with addition of MnO$_2$ (FIG. 43). Further, τf increases along with addition up to 0.4% by weight (FIG. 45). Since Qu decreases by the addition, a great amount of addition is not preferred (FIG. 44).

Figure 51:
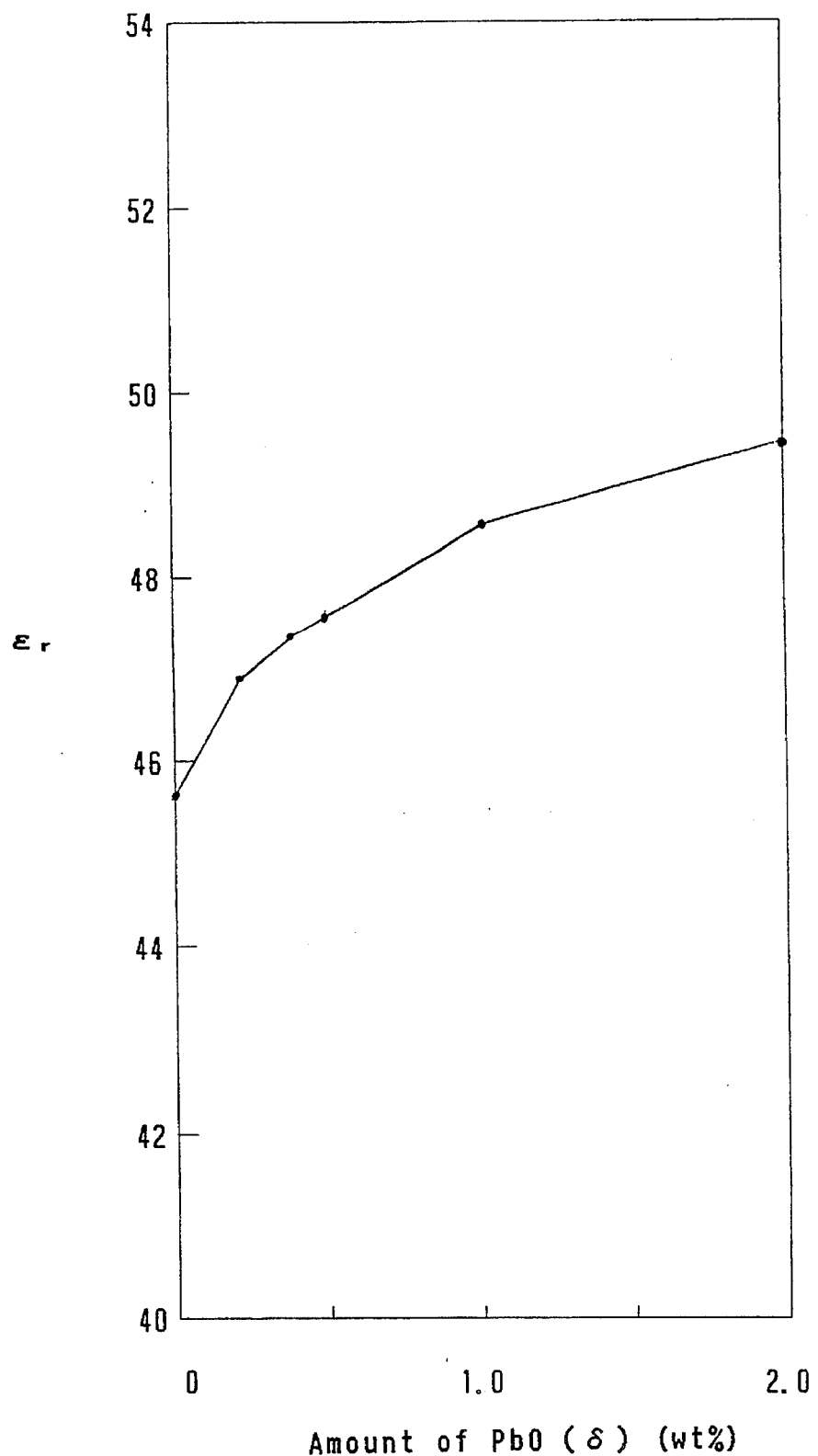
FIG. 51 is a graph showing a relation between the addition amount (δ) of PbO and εr in (the main ingredient represented by $Bi(Nb_{0.8}Ta_{0.2})O_4+0.4\%$ by weight of $V_2O_5+0.2\%$ by weight of $MnO_2$) and in case of 900° C. of sintering temperature.
Figure 52:
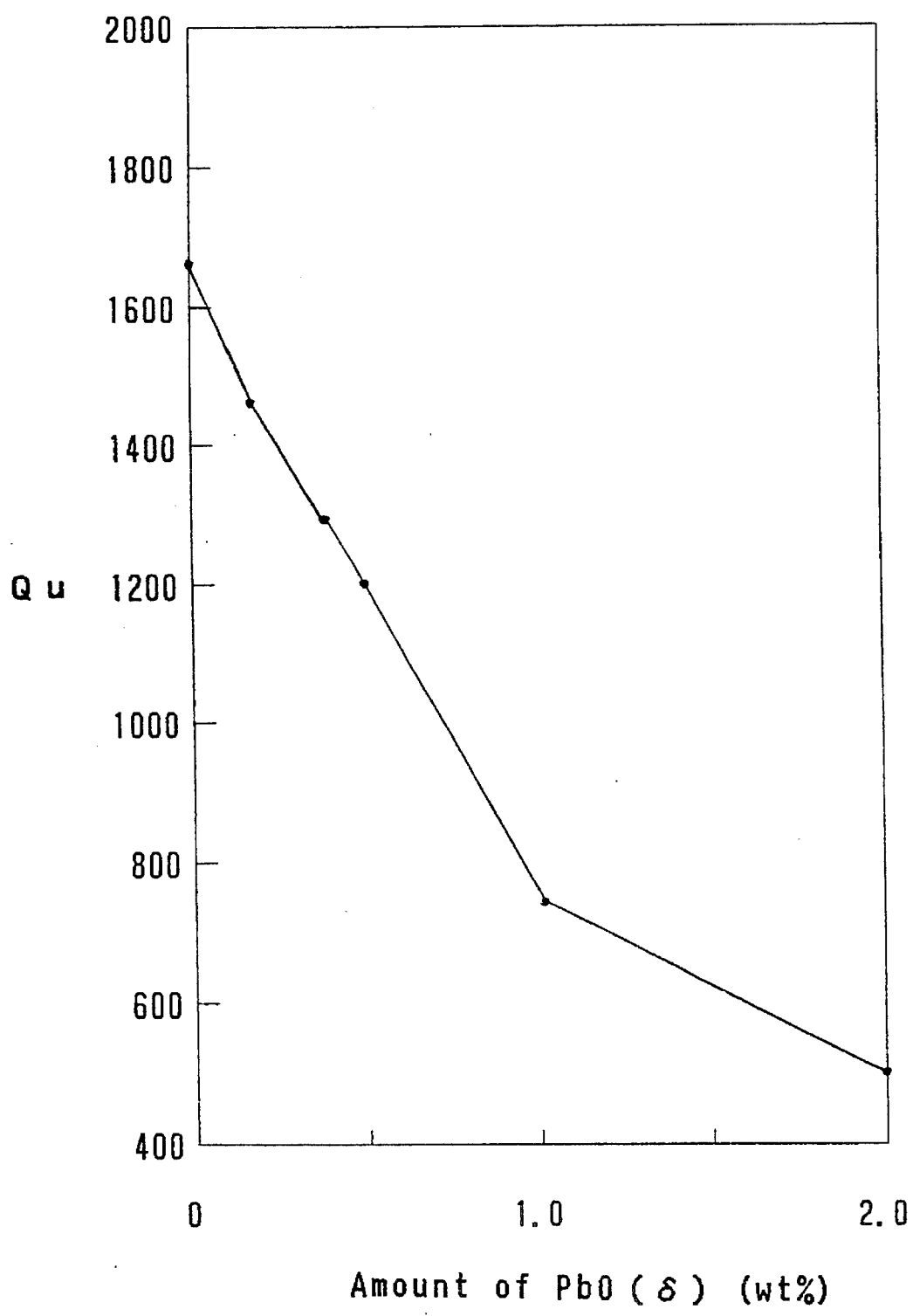
FIG. 52 is a graph showing a relation between the addition amount (δ) of PhO and Qu in the ceramic composition and the sintering temperature in FIG. 51.
Figure 53:
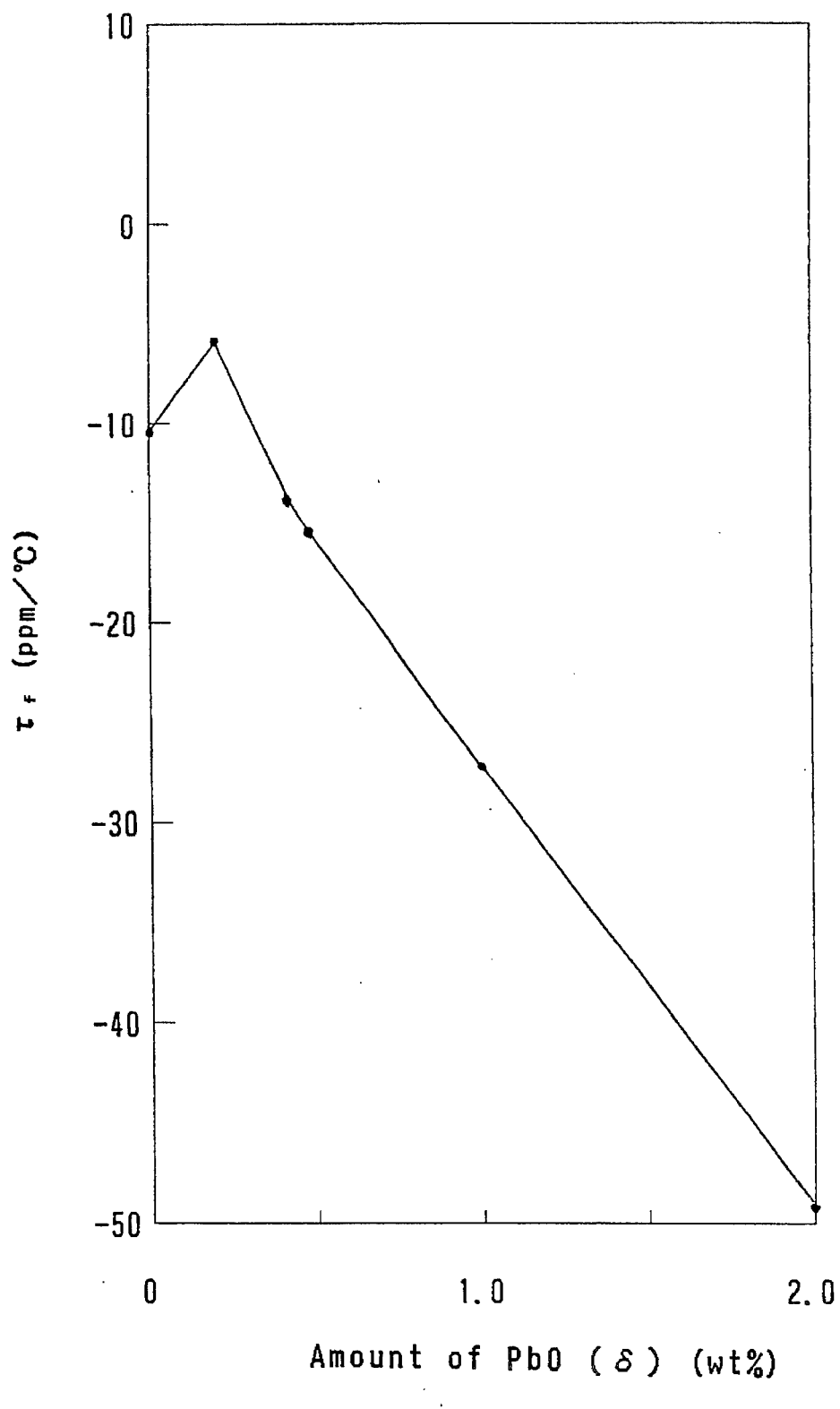
FIG. 53 is a graph showing a relation between the addition amount (δ) of PbO and τf in the ceramic composition and the sintering temperature in FIG. 51.
Figure 54:
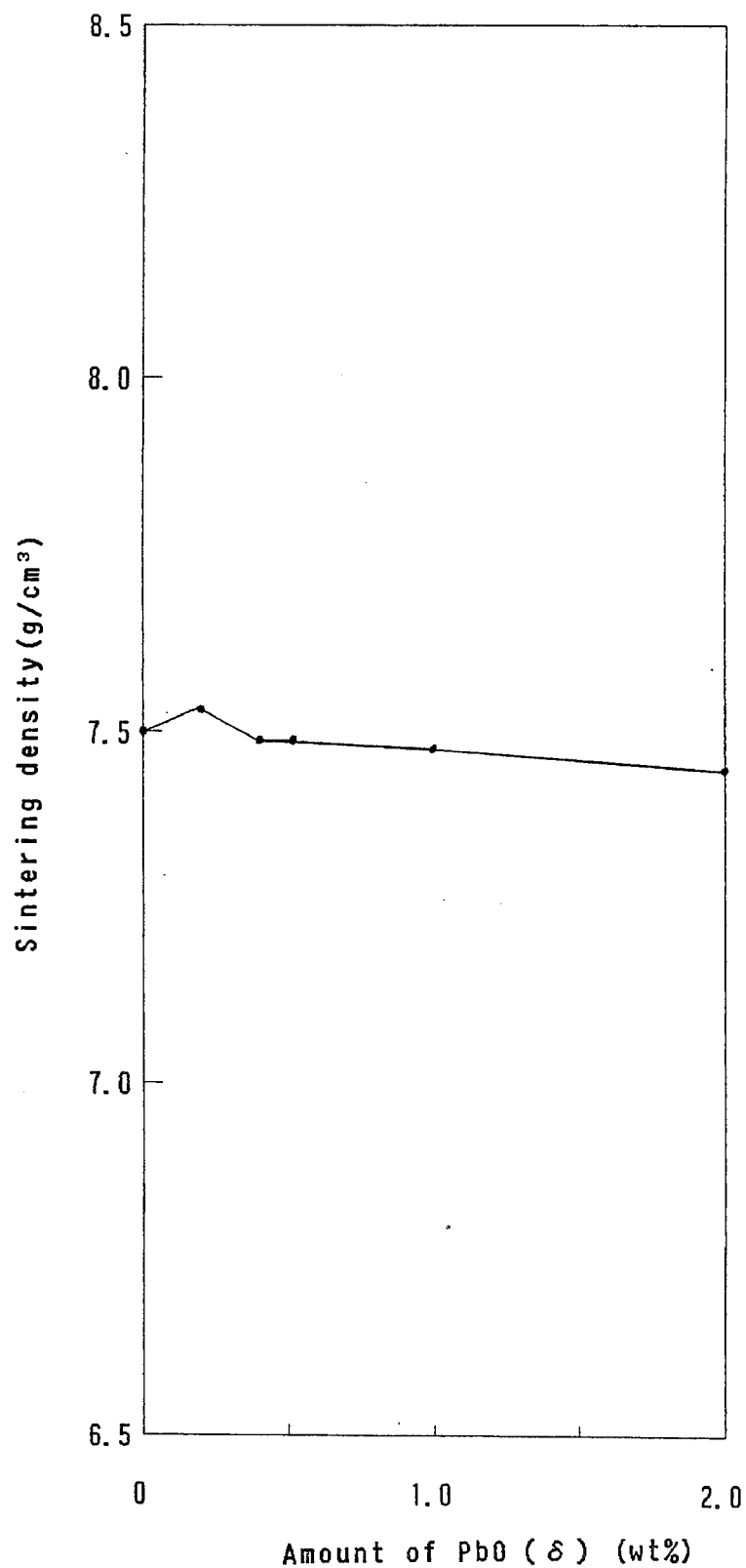
FIG. 54 is a graph showing a relation between the addition amount (δ) of PbO and the sintering density in the ceramic composition and the sintering temperature in FIG. 51.
Figure 55:
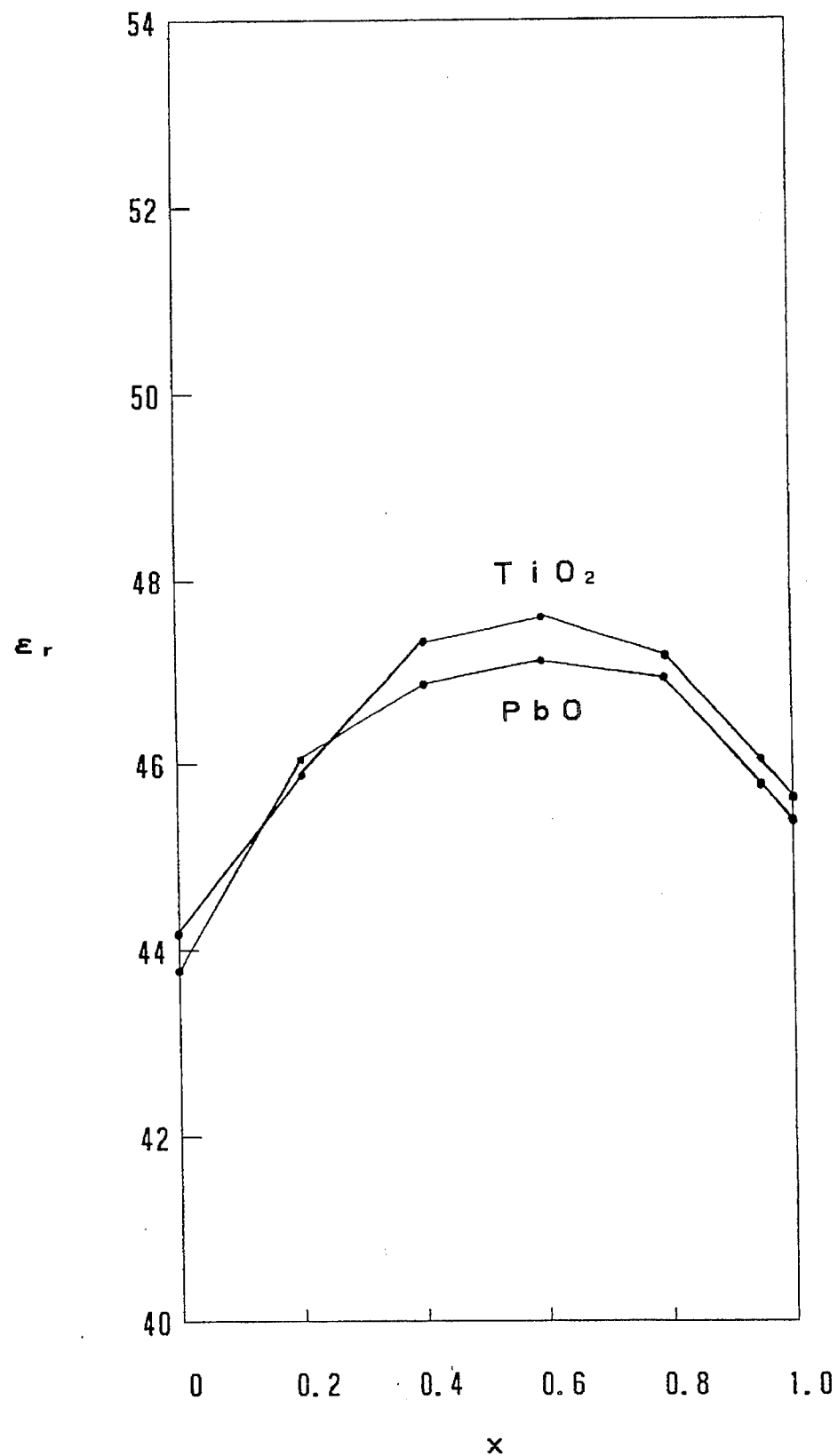
FIG. 55 is a graph showing a relation between x and εr in (the main ingredient represented by $Bi(Nb_x Ta_{1-x})O_4+0.4\%$ by weight of $V_2O_5+0.2\%$ by weight of $MnO_2+0.2\%$ by weight of $TiO_2$ (or PhO)) and in case of 900° C. of sintering temperature.

Since τf changes along with addition of PbO (mainly in the negative direction), it shows that τf can be controlled easily (FIG. 53). Further, since εr increases with the addition, it is preferred (FIG. 51). Since Qu decreases with the addition, a great amount of addition is not preferred (FIG. 52).

Figure 56:
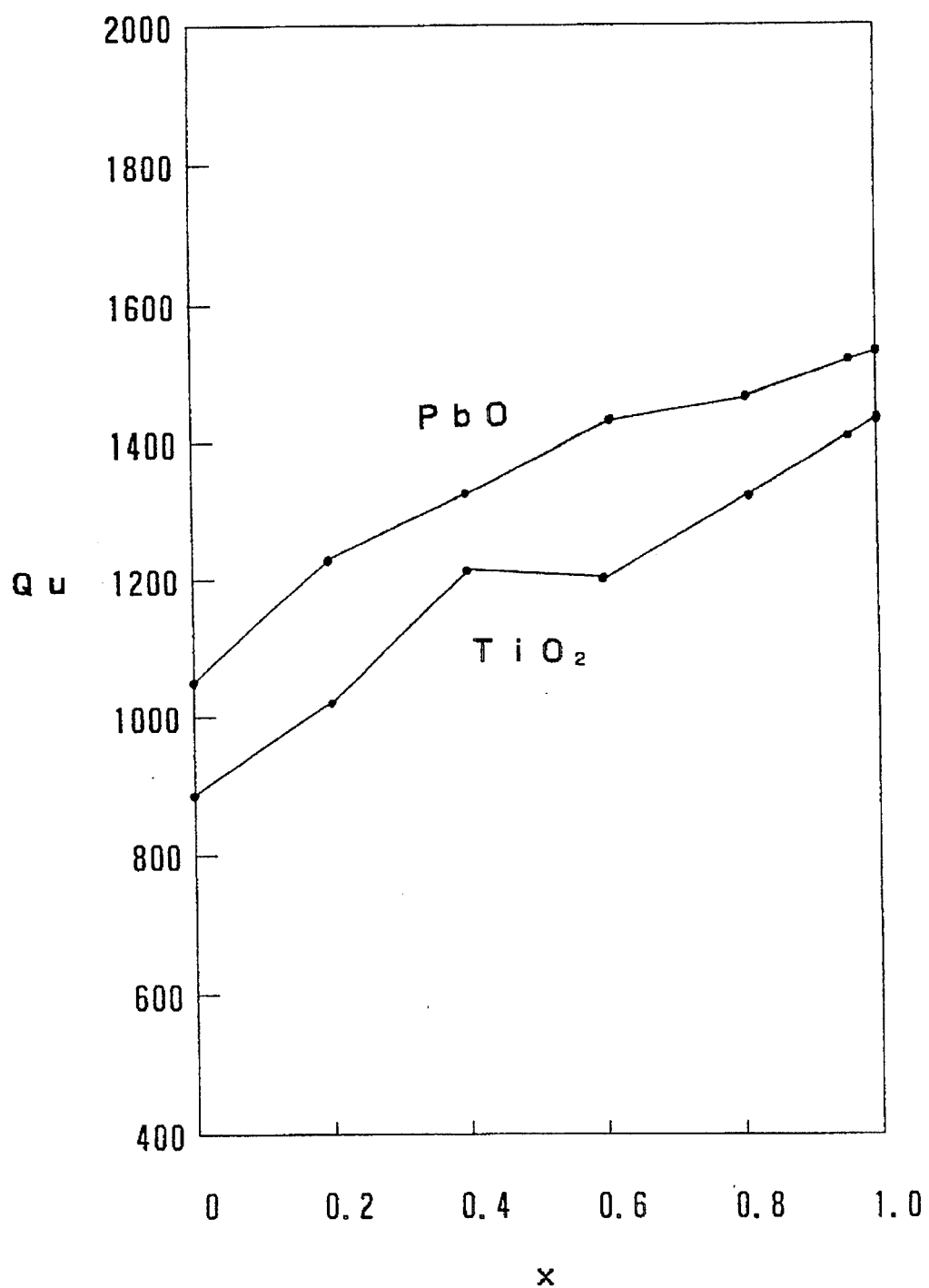
FIG. 56 is a graph showing a relation between x and Qu in the ceramic composition and the sintering temperature in FIG. 55.
Figure 57:
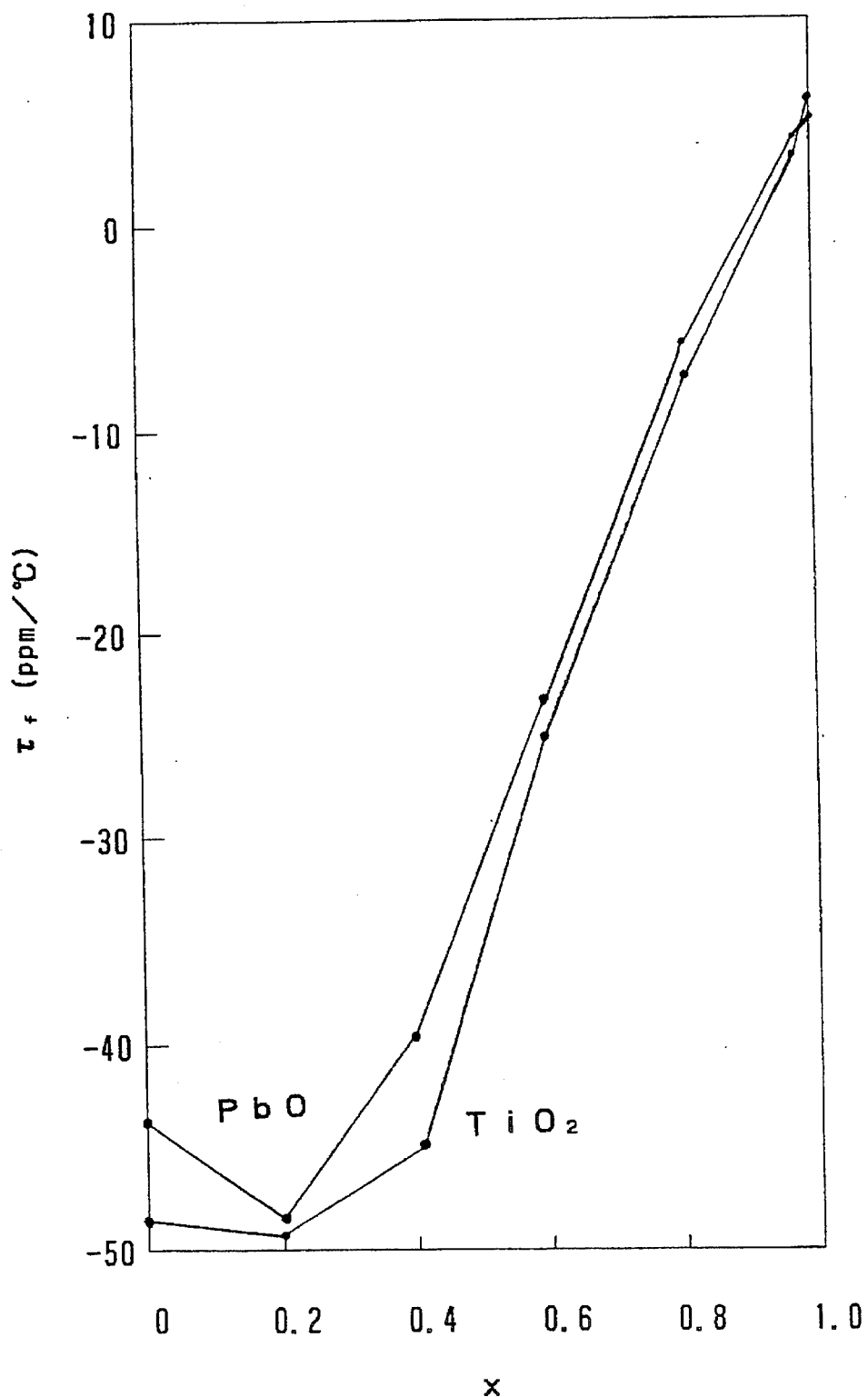
FIG. 57 is a graph showing a relation between x and τf in the ceramic composition and the sintering temperature in FIG. 55.

Further, since τf changes greatly along with increase of the value x in Bi(NbxTa1-x)O$_4$ (mainly changes in the positive direction) (FIG. 57), τf can be controlled by the change of the value x. Further, since Qu increases along with increases of the value x, it is preferred (FIG. 56). While the sintering density tends to lower with the addition, 7.04 kg/m$^3$ of the sintering density can be ensured even x is 1.0 (No. 29 in Table 7, FIG. 54).

Further, referring to the sintering temperature, sufficient sintering is attained at 850° to 950° C. (FIG. 62) and physical properties are also stable (FIGS. 59–62). Like that in the V$_2$O$_5$—MnO$_2$—TiO$_2$ system composition.

As described above, while each of the characteristics changes variously in accordance with the kind of each of the additives, the addition amount thereof and the sintering temperature, the following well balanced practical performances is shown, for example, within a compositional range shown below according to the results of this example (Table 7).

For instance, the V$_2$O$_5$—MnO$_2$—PbO system compositions exhibit the following well balanced practical performances.

(1) At V$_2$O$_5$: 0.4 to 0.8% by weight, MnO$_2$ and PbO: both 0.2% by weight and x: 0.8, εr: 44.9 to 46.8, Qu: 1460 to 1950, τf: −14.5 to −1.7 ppm/°C.

(2) At V$_2$O$_5$: 0.6% by weight, MnO$_2$ and PbO: both 0.2% by weight and x: 0.8, εr: 46.5, Ou: 1430, τf: −1.75 ppm/°C.

(3) At MnO$_2$: 0.2 to 0.4% by weight, V$_2$O$_5$: 0.4% by weight, PbO: 0.2% by weight and x: 0.8, εr: 46.8 to 47.9, Qu: 1351 to 1465, τf: −6.3 to −2.1 ppm/°C.

(4) At PbO: 0.2 to 0.4% by weight, V$_2$O$_5$: 0.4% by weight, MnO$_2$: 0.2% by weight and x: 0.8, εr: 46.8 to 47.4, Qu: 1293 to 1465, τf: −13.2 to −6.3 ppm/°C.

(5) At V$_2$O$_5$: 0.3 to 0.8% by weight, MnO$_2$: 0.1 to 1.0% by weight, PbO: not more than 0.4% by weight and x: 0.8 to 0.96, τf: −15 to +4 ppm/°C., Qu: 1000 to 2000 and εr: 44 to 49.

The present invention is not restricted to the concrete examples as described above but variously modified embodiment can be made within a scope of the present invention in accordance with the purpose and application uses thereof.

What is claimed is:

1. A microwave dielectric ceramic composition comprising a composition represented by xBi$_2$O$_3$-(1-x) (yNb$_2$O$_5$-(1-y)Ta$_2$O$_5$) in which 0.45≦x≦0.55 and 0<y<1.0 as a main ingredient, to which not more than 0.8 parts by weight (not including 0 part by weight) of V$_2$O$_5$ is added and incorporated based on 100 parts by weight of xBi$_2$O$_3$-(1-x) (yNb$_2$O$_5$-(1-y)Ta$_2$O$_5$).

2. A microwave dielectric ceramic composition as defined in claim 1, wherein x is from 0.47 to 0.53, y is from 0.4 to 0.9, the addition amount of V$_2$O$_5$ is from 0.4 to 0.6 parts by weight.

3. A microwave dielectric ceramic composition as defined in claim 1 or 2, wherein the specific dielectric constant (hereinafter simply referred to as εr) is from 42.9 to 47.7, an unload Q (at 3.7 to 4.4 GHz, hereinafter simply referred to as Qu) is from 790 to 1490 and the temperature coefficient of a resonance frequency (hereinafter simply referred to as τf) is from −46.4 to 16.2 ppm/°C.

4. A microwave dielectric ceramic composition comprising a composition represented by Bi(NbxTa1-x)O$_4$ in which 0<x≦0.96 as a main ingredient, to which not more than 5% by weight (not including 0% by weight) of V$_2$O$_5$ and not more than 2% by weight (not including 0% by weight) of PbO are added and incorporated based on 100% by weight of Bi(NbxTa1-x)O$_4$.

5. A microwave dielectric ceramic composition as defined in claim 4, wherein x is from 0.2 to 0.9, the addition amount of V$_2$O$_5$ is from 0.2 to 2.0% by weight and the addition amount of PbO is from 0.2 to 0.6% by weight.

6. A microwave dielectric ceramic composition as defined in claim 4 or 5, wherein εr is from 45 to 48, Qu (at 3.6 to 4.0 GHz) is from 960 to 1640 and τf is from −47 to −36 ppm/°C.

7. A microwave dielectric ceramic composition comprising a composition represented by $Bi(Nb_xTa1-x)O_4$ in which $0<x\leq 0.96$ as a main ingredient, to which not more than 5% by weight (not including 0% by weight) of $V_2O_5$ and not more than 2% by weight (not including 0% by weight) of $MnO_2$ are added and incorporated based on 100% by weight of $Bi(Nb_xTa1-x)O_4$.

8. A microwave dielectric ceramic composition as defined in claim 7, wherein x is from 0.2 to 0.9, the addition amount of $V_2O_5$ is from 0.2 to 2.0% by weight and the addition amount of $MnO_2$ is from 0.1 to 0.6% by weight.

9. A microwave dielectric ceramic composition as defined in claim 7 or 8, wherein $\epsilon r$ is from 45 to 47, Qu (at 3.6 to 3.9 GHz) is from 970 to 1640 and $\tau f$ is from −14 to −5.5 ppm/°C.

10. A microwave dielectric ceramic composition comprising a composition represented by $Bi(Nb_xTa1-x)O_4$ in which $0<x\leq 0.96$ as a main ingredient, to which not more than 2% by weight (not including 0% by weight) of $V_2O_5$ and not more than 1% by weight (not including 0% by weight) of $TiO_2$ are added and incorporated based on 100% by weight of $Bi(Nb_xTa1-x)O_4$.

11. A microwave dielectric ceramic composition as defined in claim 10, wherein x is from 0.6 to 0.96, the addition amount of $V_2O_5$ is from 0.2 to 1.0% by weight and the addition amount of $TiO_2$ is from 0.1 to 0.6% by weight.

12. A microwave dielectric ceramic composition as defined in claim 10 or 11, wherein $\tau f$ is from −30 to 0 ppm/°C. and Qu (at 3.3 to 3.9 GHz) is from 510 to 1160 and $\epsilon r$ is from 42 to 48.

13. A microwave dielectric ceramic composition comprising a composition represented by $Bi(Nb_xTa1-x)O_4$ in which $0<x\leq 0.96$ as a main ingredient, to which not more than 2% by weight (not including 0% by weight) of $V_2O_5$ and not more than 2% by weight (not including 0% by weight) of $MnO_2$, and not more than 0.7% by weight (not including 0% by weight) of $TiO_2$ are added and incorporated based on 100% by weight of $Bi(Nb_xTa1-x)O_4$.

14. A microwave dielectric ceramic composition as defined in claim 13, wherein the addition amount of $V_2O_5$ is from 0.2 to 1.0% by weight, the addition amount of $MnO_2$ is not more than 1.0% by weight and addition amount of $TiO_2$ is not more than 0.4% by weight and x is from 0.8 to 0.96.

15. A microwave dielectric ceramic composition as defined in claim 13 or 14, wherein $\tau f$ is from −12 to +7 ppm/°C., Qu is from 800 to 1600 and $\epsilon r$ is from 45 to 50.

16. A microwave dielectric ceramic composition comprising a composition represented by $Bi(Nb_xTa1-x)O_4$ in which $0<x\leq 0.96$ as a main ingredient, to which 0.2 to 1% by weight of $V_2O_5$, not more than 1% by weight (not including 0% by weight) of $MnO_2$ and not more than 0.5% by weight (not including 0% by weight) of PbO are added and incorporated based on 100% by weight of $Bi(Nb_xTa1-x)O_4$.

17. A microwave dielectric ceramic composition as defined in claim 16, wherein the addition amount of $V_2O_5$ is from 0.3 to 0.8% by weight, the addition amount of $MnO_2$ is 0.1 to 1.0% by weight and the addition amount of PbO is not more than 0.4% by weight and x is from 0.8 to 0.96.

18. A microwave dielectric ceramic composition as defined in claim 16 or 17, wherein $\tau f$ is from −15 to +4 ppm/°C., Qu is from 1000 to 2000 and $\epsilon r$ is from 44 to 49.

* * * * *

UNITED STATES PATENT AND TRADEMARK OFFICE
CERTIFICATE OF CORRECTION

PATENT NO. : 5,489,559
DATED : February 6, 1996
INVENTOR(S) : Katagiri et al.

It is certified that error appears in the above-indentified patent and that said Letters Patent is hereby corrected as shown below:

Claim 16, column 28, line 19, change "$V_2O_{hd\ 5}$," to --$V_2O_5$--.

Abstract, lines 13, 17 and 20, change "An another" to --Another--.

Signed and Sealed this

Fourth Day of June, 1996

Attest:

BRUCE LEHMAN

Attesting Officer     Commissioner of Patents and Trademarks